(12) United States Patent
Vityaz

(10) Patent No.: US 11,257,066 B2
(45) Date of Patent: Feb. 22, 2022

(54) AUTOMATED DIGITAL METHOD AND SYSTEM OF PROVIDING OR SHARING ACCESS

(71) Applicant: Middleware, Inc., Wilmington, DE (US)

(72) Inventor: Oleksandr Vityaz, Dnipro (UA)

(73) Assignee: Middleware, Inc., Wilmington, DE (US)

(*) Notice: Subject to any disclaimer, the term of this patent is extended or adjusted under 35 U.S.C. 154(b) by 0 days.

(21) Appl. No.: 16/774,284

(22) Filed: Jan. 28, 2020

(65) Prior Publication Data

US 2020/0167761 A1      May 28, 2020

Related U.S. Application Data

(63) Continuation-in-part of application No. 16/519,337, filed on Jul. 23, 2019, which is a continuation of
(Continued)

(51) Int. Cl.
   *G06Q 20/32*     (2012.01)
   *G06Q 20/34*     (2012.01)
   (Continued)

(52) U.S. Cl.
   CPC ..... *G06Q 20/3278* (2013.01); *G06F 21/6245* (2013.01); *G06Q 20/10* (2013.01);
   (Continued)

(58) Field of Classification Search
   None
   See application file for complete search history.

(56) References Cited

U.S. PATENT DOCUMENTS

| | | |
|---|---|---|
| 5,677,955 A | 10/1997 | Doggett et al. |
| 5,832,089 A | 11/1998 | Kravitz et al. |

(Continued)

OTHER PUBLICATIONS

U.S. Non-Final Office Action dated Jan. 7, 2021 cited in U.S. Appl. No. 16/519,337, 45 pgs.

(Continued)

*Primary Examiner* — Joseph W. King
(74) *Attorney, Agent, or Firm* — Bekiares Eliezer LLP

(57) ABSTRACT

Methods, systems, and computer-readable media herein disclose providing or sharing access to an asset. A request for sharing the asset from a consuming party may be received. The asset may be verified as a registered asset. The request may be sent for approval by a provisioning party. The request may include details about a transaction for which sharing the asset has been requested and a specification of the asset requested for sharing. Approval may be provided with restriction parameters. In turn, a first digital token may be generated. A request for the transaction may be received from the consuming party. Transaction details may be verified against the restriction parameters. A second digital token associated with the asset from an asset custodian may be received. A request to perform the transaction may be sent to the asset custodian. A confirmation of a processed transaction from the asset custodian may be received.

19 Claims, 14 Drawing Sheets

Related U.S. Application Data application No. 15/721,401, filed on Sep. 29, 2017, now Pat. No. 10,776,772.

(60) Provisional application No. 62/401,968, filed on Sep. 30, 2016, provisional application No. 62/404,802, filed on Oct. 6, 2016.

(51) Int. Cl.
*G06F 21/62* (2013.01)
*G06Q 20/10* (2012.01)

(52) U.S. Cl.
CPC .......... *G06Q 20/105* (2013.01); *G06Q 20/34* (2013.01); *G06Q 20/351* (2013.01)

(56) References Cited

U.S. PATENT DOCUMENTS

| | | | |
|---|---|---|---|
| 5,963,647 | A | 10/1999 | Downing et al. |
| 6,000,832 | A | 12/1999 | Franklin et al. |
| 6,065,675 | A | 5/2000 | Teicher |
| 6,317,745 | B1 | 11/2001 | Thomas et al. |
| 6,754,484 | B1 | 6/2004 | Hiltunen et al. |
| 6,975,937 | B1 | 12/2005 | Kantarjiev et al. |
| 7,107,247 | B2 | 9/2006 | Kinoshita et al. |
| 7,289,964 | B1 | 10/2007 | Bowman-Amuah |
| 7,370,013 | B1 | 5/2008 | Aziz et al. |
| 7,395,241 | B1 | 7/2008 | Cook et al. |
| 7,461,265 | B2 | 12/2008 | Ellmore |
| 7,487,127 | B2 | 2/2009 | Weichert et al. |
| 7,641,109 | B2 | 1/2010 | Seifert et al. |
| 7,711,603 | B2 | 5/2010 | Vanker et al. |
| 7,780,075 | B2 | 8/2010 | Cooper et al. |
| 7,840,486 | B2 | 11/2010 | D'Agostino |
| 7,870,065 | B2 | 1/2011 | Gutierrez-Shires |
| 7,895,122 | B2 | 2/2011 | Flitcroft et al. |
| 7,945,512 | B2 | 5/2011 | Scipioni et al. |
| 8,015,084 | B1 | 9/2011 | Hirka et al. |
| 8,682,802 | B1 | 3/2014 | Kannanari |
| 8,713,454 | B2 | 4/2014 | Sriraghavan et al. |
| 8,870,659 | B2 | 10/2014 | House et al. |
| 9,053,165 | B2 | 6/2015 | van Rossum |
| 9,060,036 | B2 | 6/2015 | Diab et al. |
| 9,110,711 | B2 | 8/2015 | Abdelaziz et al. |
| 9,159,048 | B2 | 10/2015 | Goodwin et al. |
| 9,286,603 | B2 | 3/2016 | Fung et al. |
| 9,330,145 | B2 | 5/2016 | Satyanarayanan |
| 9,336,278 | B2 | 5/2016 | Procopio et al. |
| 9,350,824 | B2 | 5/2016 | Rajakarunanayake et al. |
| 9,351,193 | B2 | 5/2016 | Raleigh et al. |
| 9,354,796 | B2 | 5/2016 | Puckett |
| 9,768,969 | B2 | 9/2017 | Weinstein et al. |
| 9,818,139 | B1 | 11/2017 | Shekhar et al. |
| 9,912,816 | B2 | 3/2018 | Ristock et al. |
| 10,776,772 | B2 | 9/2020 | Vityaz |
| 10,853,855 | B2 * | 12/2020 | John .................. G06Q 20/40 |
| 2001/0047285 | A1 | 11/2001 | Borders et al. |
| 2002/0082962 | A1 | 6/2002 | Farris et al. |
| 2003/0126083 | A1 | 7/2003 | Seifert et al. |
| 2003/0163432 | A1 | 8/2003 | Cannon, Jr. |
| 2005/0027580 | A1 | 2/2005 | Crici et al. |
| 2005/0091161 | A1 | 4/2005 | Gustin et al. |
| 2005/0108155 | A1 | 5/2005 | Gallagher et al. |
| 2005/0169461 | A1 | 8/2005 | Canard et al. |
| 2005/0222961 | A1 | 10/2005 | Staib et al. |
| 2006/0064378 | A1 | 3/2006 | Clementz et al. |
| 2006/0149667 | A1 | 7/2006 | Barry |
| 2006/0173793 | A1 | 8/2006 | Glass |
| 2006/0191999 | A1 | 8/2006 | Stoutenburg et al. |
| 2006/0195567 | A1 | 8/2006 | Mody et al. |
| 2006/0259359 | A1 | 11/2006 | Gogel |
| 2007/0045395 | A1 | 3/2007 | Corona et al. |
| 2007/0050291 | A1 | 3/2007 | Avazian et al. |
| 2007/0078760 | A1 | 4/2007 | Conaty et al. |
| 2007/0288247 | A1 | 12/2007 | Mackay |
| 2008/0000964 | A1 | 1/2008 | Flake et al. |
| 2008/0004949 | A1 | 1/2008 | Flake et al. |
| 2008/0052182 | A1 | 2/2008 | Marshall |
| 2008/0052206 | A1 | 2/2008 | Edwards et al. |
| 2008/0082444 | A1 | 4/2008 | Keohane et al. |
| 2008/0103786 | A1 | 5/2008 | Zhang et al. |
| 2008/0133390 | A1 | 6/2008 | Scipioni |
| 2008/0140568 | A1 | 6/2008 | Henry |
| 2008/0162348 | A1 | 7/2008 | Lee et al. |
| 2008/0228637 | A1 | 9/2008 | Scipioni et al. |
| 2008/0228638 | A1 | 9/2008 | Scipioni et al. |
| 2009/0043696 | A1 | 2/2009 | Ornce et al. |
| 2009/0150294 | A1 | 6/2009 | March et al. |
| 2009/0210347 | A1 | 8/2009 | Sarcanin |
| 2009/0327099 | A1 | 12/2009 | Patel et al. |
| 2010/0023450 | A1 | 1/2010 | Scipioni |
| 2010/0161485 | A1 | 6/2010 | Bulawa et al. |
| 2010/0205095 | A1 | 8/2010 | Ostrovsky |
| 2010/0299259 | A1 | 11/2010 | Walker et al. |
| 2010/0312617 | A1 | 12/2010 | Cowen |
| 2011/0112970 | A1 | 5/2011 | Yu |
| 2011/0202462 | A1 | 8/2011 | Keenan |
| 2011/0243553 | A1 | 10/2011 | Russell |
| 2012/0310827 | A1 | 12/2012 | Gibson, III |
| 2013/0006782 | A1 | 1/2013 | Schwarzkopf et al. |
| 2013/0275301 | A1 | 10/2013 | Lehman et al. |
| 2014/0236831 | A1 | 8/2014 | Flitcroft et al. |
| 2014/0237562 | A1 | 8/2014 | Nandakumar |
| 2015/0127547 | A1 * | 5/2015 | Powell .................. G06Q 20/385 705/67 |
| 2016/0224977 | A1 | 8/2016 | Sabba et al. |
| 2016/0342992 | A1 | 11/2016 | Lee |
| 2017/0300907 | A1 | 10/2017 | Shanmugam |
| 2018/0144335 | A1 | 5/2018 | Vityaz |
| 2020/0051060 | A1 | 2/2020 | Vityaz |

OTHER PUBLICATIONS

Copending U.S. Appl. No. 16/519,337, filed Jul. 23, 2019 entitled "Automated Digital Method and System of Providing or Sharing Access".

Foltz et al., "Sharing Smart Card Authenticated Sessions Using Proxies," Jan. 2016, Institute for Defnce Analyses, 22 pgs.

All You Need to Know About Tokenization (Visa Security Tokenization Infographic), 1 pg.

U.S. Non-Final Office Action dated Apr. 3, 2019 cited in U.S. Appl. No. 15/721,401, 26 pgs.

U.S. Final Office Action dated Oct. 22, 2019 cited in U.S. Appl. No. 15/721,401, 26 pgs.

U.S. Final Office Action dated Aug. 25, 2021 cited in U.S. Appl. No. 16/519,337, 23 pgs.

* cited by examiner

Method of Using a Shared Asset With Merchant 300

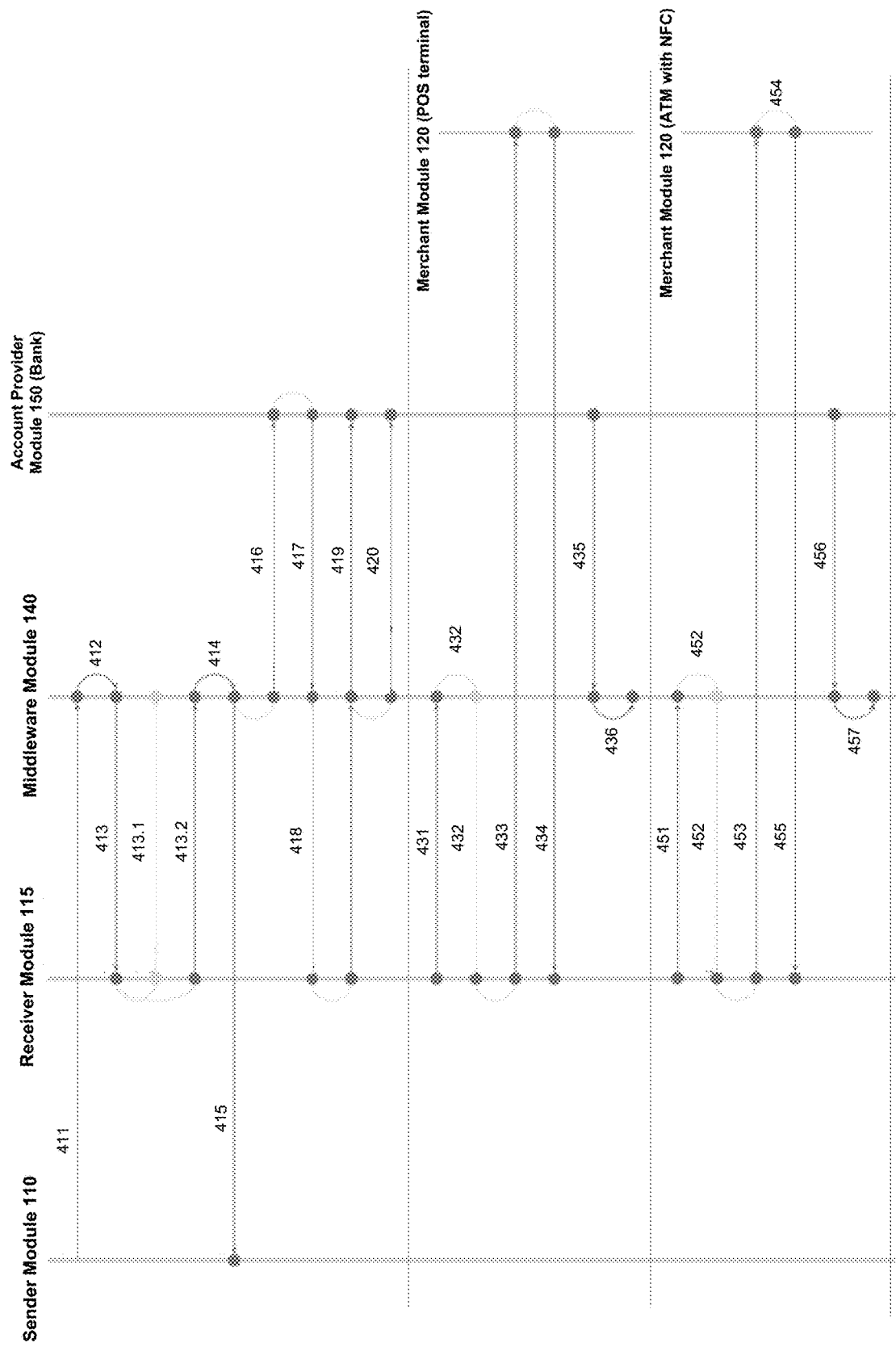

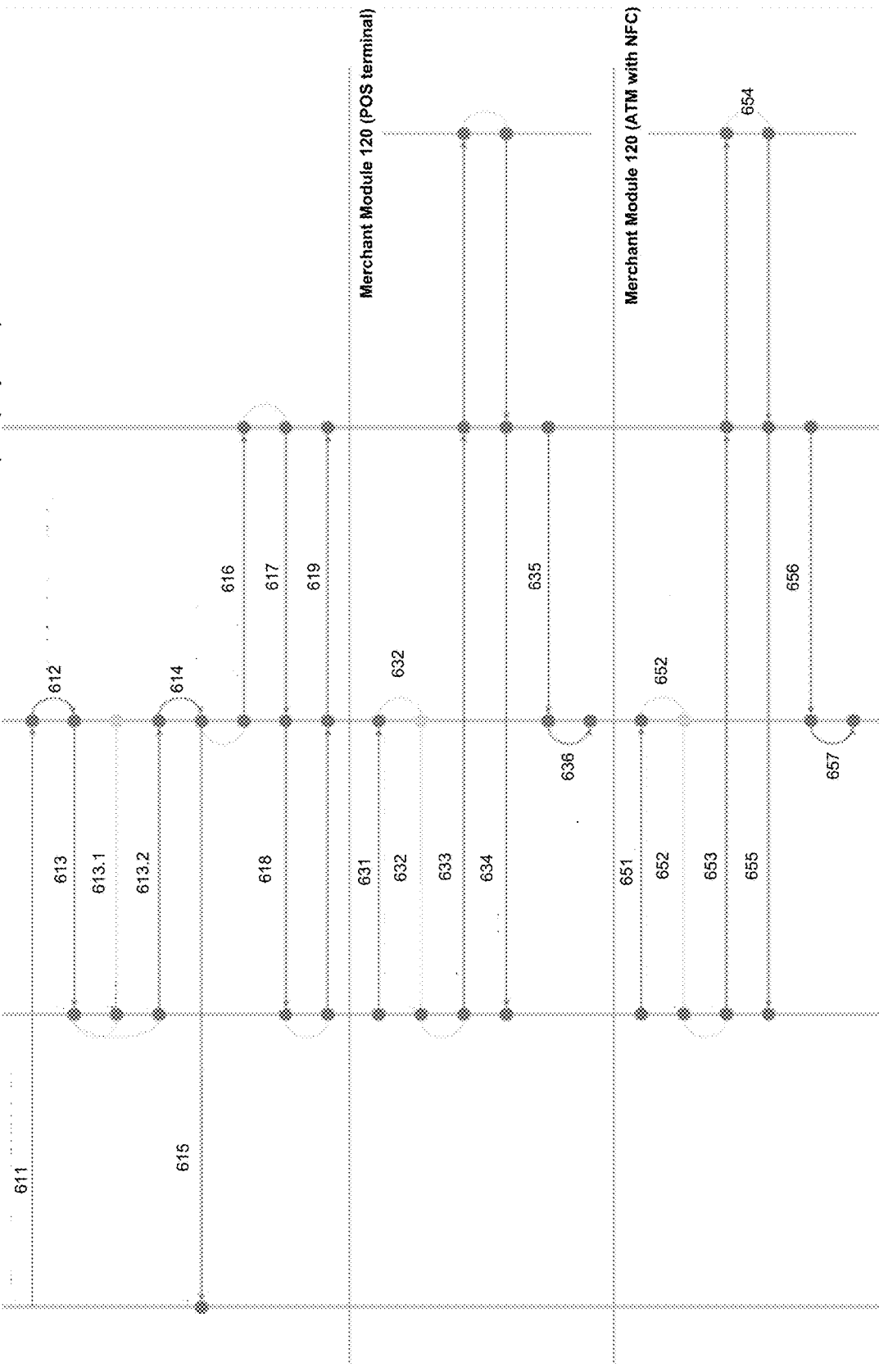

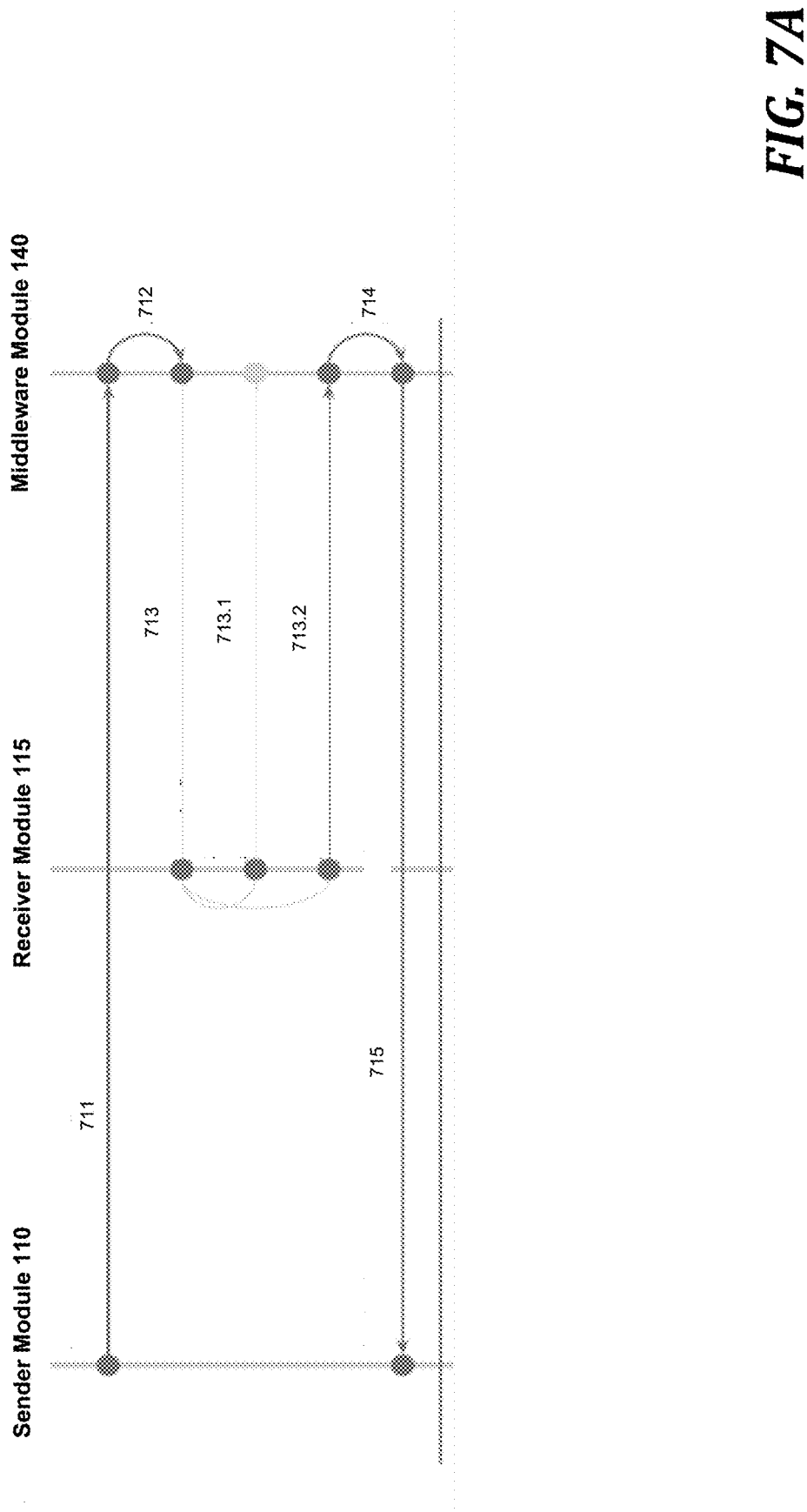

AUTOMATED DIGITAL METHOD AND SYSTEM OF PROVIDING OR SHARING ACCESS

RELATED APPLICATIONS

This application is a Continuation-In-Part of U.S. application Ser. No. 16/519,337 filed on Jul. 23, 2019, entitled "Automated Digital Method and System of Providing or Sharing Access", which is a continuation of U.S. application Ser. No. 15/721,401 filed Sep. 29, 2017 entitled "Automated Digital Method and System of Providing or Sharing Access, which claims priority to U.S. Provisional Application No. 62/401,968 filed on Sep. 30, 2016, entitled "Method of payment by sharing access to a payment card of one bank (Share credit card)", and claims further priority to U.S. Provisional Application No. 62/404,802 filed on Oct. 6, 2016, entitled "Method of payment by sharing access to a payment card (Share credit card)", which are incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

Generally, the present disclosure relates to the sharing of access and usage of digital assets and/or accounts. Specifically, the present disclosure pertains to method and system of providing or sharing access to digital asset and accounts, whether financial or non-financially related.

BACKGROUND

Conventional digital transactions facilitate electronic payment, such as money transfers, payment asset charges, e-commerce transactions and any other types of transactions. However, in multiple circumstances, payees may be unbanked people (e.g., children that need money to buy something) or may have no payment asset (e.g., lost asset). Payment fund transfers may be expensive, time-consuming, heavily regulated, and cumbersome for financial institutions. Thus, there is need for an improved approach.

In some instances, a person may need to delegate his or her right or obligation associated with an asset and/or account, to another person for any reason. The delegation of the rights or obligations may in certain instances be impossible without a physical transmission of such asset and/or account or credentials for access to the asset and/or account. However, such persons may be in different places. Thus, there is need for an improved approach.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Methods, systems, and a computer-readable medium for providing or sharing access to an asset are disclosed. A first request for sharing the asset from a consuming party may be received. The asset may be verified as a registered asset. The first request may be sent for approval by a provisioning party. The first request may comprise details about a transaction for which sharing the asset has been requested and a specification of the asset requested for sharing. Approval may be provided with restriction parameters. In turn, a first digital token may be generated. A second request for the transaction may be received from the consuming party. Transaction details may be verified not to violate the restriction parameters associated with the first digital token. A second digital token associated with the asset from an asset custodian may be received. A request to perform the transaction may be sent to the asset custodian for processing. A confirmation of a processed transaction from the asset custodian may then be received.

Embodiments of the present disclosure may provide methods, systems, and computer-readable media, that may comprise computer-readable instructions, which when executed, perform at least some of the following stages:

Receiving a first request for sharing an asset from a consuming party,

Wherein receiving the first request for sharing asset from the consuming party comprises at least one of the following: the consuming party scanning a barcode and the consuming party using NFC to generate the request;

Verifying the asset has been registered,

Wherein verifying the asset has been registered comprises verifying a provisioning party has configured the asset to be shared by providing asset access information, Wherein providing asset access information comprises providing at least one of the following: an account number of the asset, a routing number of an asset custodian, legal name of an asset owner, the asset custodian, a mailing address of the asset owner, a billing address of the asset owner, zip code of the asset owner; a Card Verification Value (CVV), a digital wallet address, an access code for the digital wallet, Personal Identification Number (PIN), an API key for accessing the asset, a multi-factor code, Device ID, a username, and a password;

Sending a provisioning party, the first request for approval,

Wherein sending the provisioning party the first request for approval comprises sending the following: details about a transaction for which sharing the asset has been requested and a specification of the asset requested for sharing, Wherein the details about the transaction for which sharing the asset has been requested comprise at least one of the following: amount of funds to cover the transaction, a merchant that the transaction is with, the time of the transaction, and the geolocation of the transaction;

Receiving an approval for the first request from the provisioning party,

Wherein receiving the approval for the first request from the provisioning party comprises receiving restriction parameters, Wherein the restriction parameters comprise at least one of the following: the amount of funds approved for sharing, the merchant approved for the transaction, the asset approved for sharing, the time during which sharing is approved, and the geolocation where sharing is approved;

Generating a first digital token to be shared with the consuming party,

Wherein generating the first digital token to be shared with the consuming party comprises generating the first digital token based on the restriction parameters, Wherein the first digital token corresponds to the approval for sharing and is used by the consuming user to specify the asset designated for sharing;

Notifying the consuming party of the approval for the first request,

Wherein notifying the consuming party of the approval for the first request further comprises providing the first digital token to the consuming party;

Receiving a second request for the transaction from the consuming party,

Wherein receiving the second request for the transaction from the consuming party further comprises receiving the first digital token and the details about the transaction;

Verifying the details about the transaction do not violate the restriction parameters associated with the first digital token, Wherein verifying the details about the transaction do not violate the restriction parameters associated with the first digital token comprises comparing the details about the transaction to the restriction parameters and verifying that the details about the transaction do not exceed or violate the restriction parameters;

Receiving a second digital token associated with the asset from an asset custodian, Wherein receiving the second digital token associated with the asset from the asset custodian comprises sending the asset access information to the asset custodian and receiving the second digital token associated with the asset, Wherein receiving the second digital token associated with the asset from the asset custodian further comprises receiving the second digital token for specifying the asset to the asset custodian in order to process transactions with the asset designated for sharing;

Sending a third request for the transaction to the asset custodian for processing, Wherein sending the third request for the transaction to the asset custodian for processing comprises sending the second digital token and the details about the transaction to the asset custodian;

Receiving a confirmation of a processed transaction from the asset custodian;

Notifying a merchant of the processed transaction,

Wherein notifying the merchant of the processed transaction comprises sending the merchant at least one of the following: an Android/iOS/Windows/Linux system notification, a text message, an MMS, an email, an application notification, and a phone call;

Notifying the consuming party of the processed transaction,

Wherein notifying the consuming party of the processed transaction comprises sending the consuming party at least one of the following: the Android/iOS/Windows/Linux system notification, the text message, the MMS, the email, the application notification, and the phone call; and Notifying the provisioning party of the processed transaction, Wherein notifying the provisioning party of the processed transaction comprises sending the provisioning party at least one of the following: the Android/iOS/Windows/Linux system notification, the text message, the MMS, the email, the application notification, and the phone call.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIGS. 4A and 4B illustrate a representative method embodiment including general share process that may be implemented by asset custodians that have already integrated a tokenization service and receive digital tokens of assets, such as, but not limited to credit cards;

FIGS. 6A and 6B illustrate a representative method embodiment including general share process that may be implemented by asset custodians such as third-party wallet providers (e.g., Apple Pay, Google Wallet, Samsung pay, Android Pay etc.), that receive digital tokens of assets, such as, but not limited to credit cards, through integration with a tokenization service and/or asset custodian;

FIGS. 7A and 7B illustrate a representative method embodiment including general share process non-financial assets and/or a process implemented by non-financial asset custodians and/or sharing without involvement of a third party;

DETAILED DESCRIPTION

Figure 1:
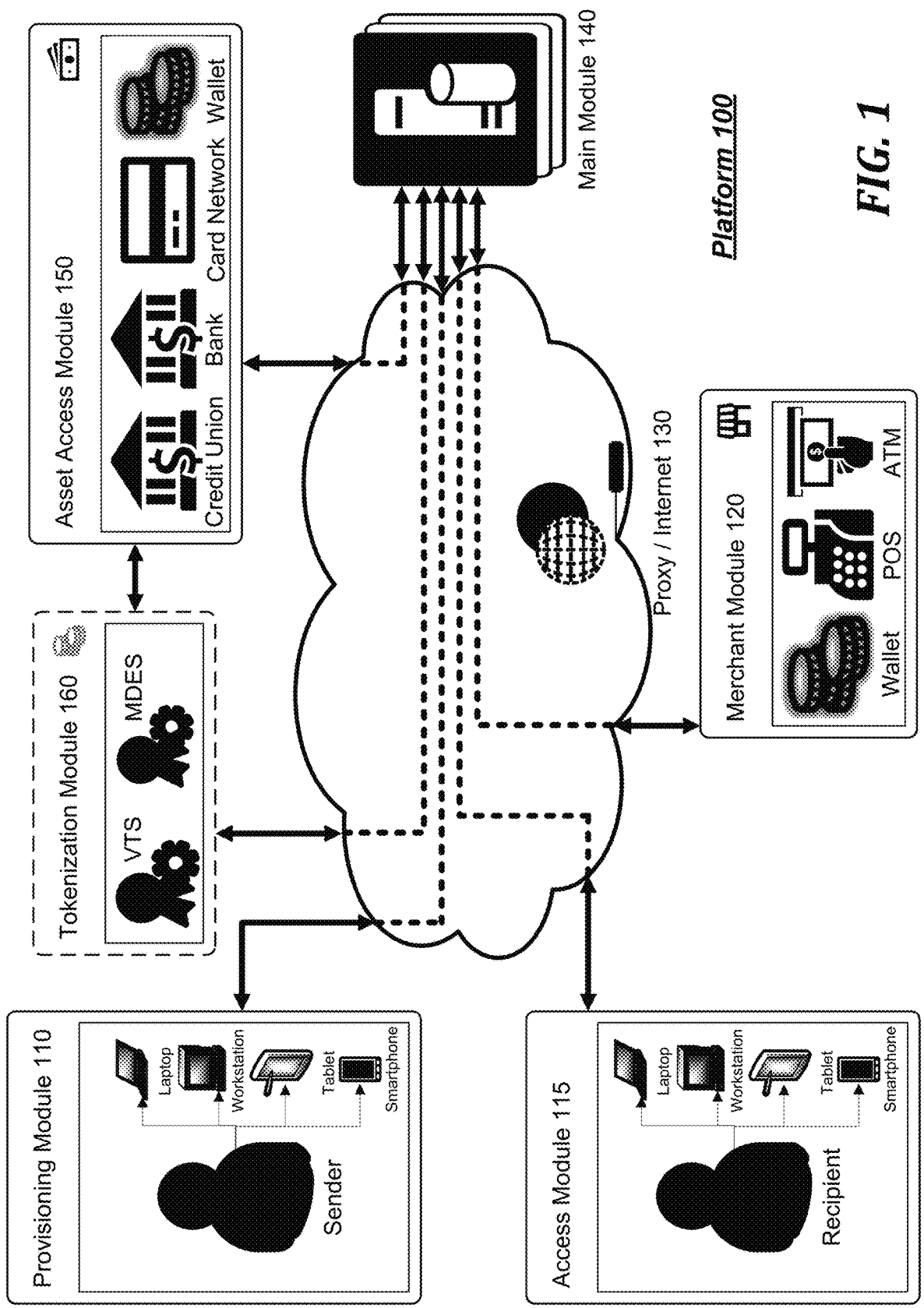
FIG. 1 illustrates an operating environment consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of stages of various processes or methods that are described herein are illustrative and not restrictive. Accordingly, it should be understood that, although stages of various processes or methods may be shown and described as being in a sequence or temporal order, the stages of any such processes or methods are not limited to being carried out in any particular sequence or order, absent an indication otherwise. Indeed, the stages in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of financial accounts and payment processing, embodiments of the present disclosure are not limited to use only in this context.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

The present disclosure may provide an alternative for money transfer systems, such as Western Union, Bitcoin, Swift, Visa, MasterCard, etc. The platform 100, as illustrated in FIG. 1, is the example of the economy going cashless and replacing money transfers as a class. Conventional digital transactions facilitate electronic payment, such as money transfers, payment asset charges, e-commerce transactions and any other types of transactions. However, in many circumstances, payees may be unbanked people (e.g., children that need money to buy something) or may have no payment asset (e.g., lost asset), while payment asset fund transfers may be expensive, time-consuming, and cumbersome for financial institutions. Thus, there is need for an improved approach.

The present disclosure provides an automated 'digital method of providing or sharing access to a payment asset and/or a non-payment asset, transactions between individuals or legal entities without physical transmission of an asset or its credentials, even without a consuming party of an access having an asset, particularly by providing or sharing access to an asset of a provisioning party.

Access to a payment asset and/or similar financial account, transactions between individuals or legal entities without physical transmission of a payment asset or its credentials (even without a consuming party of an access having a payment asset and/or financial account), particularly by providing or sharing access to a payment asset and/or similar financial account of a provisioning party, may be provided. Shared access to a payment asset and/or similar financial account may transact access to such a payment asset and/or similar financial account instantly via various channels remotely using digital token of the provisioning party's payment asset and/or similar financial account or another applicable identifier. Consuming party of the shared access may use such shared access to the provisioning party's payment asset and/or similar financial account to make payments using digital token via NFC enabled devices and/or using QR code and/or any other universal platform, for withdrawing money from Automated Teller Machine (ATM), making payments via Point Of Sale (POS) terminal, making e-commerce transactions, money transfers, fund disbursements and/or another type of transactions subject to conditions set by the provisioning party (optionally), but without transferring money between individual, corporate, and/or business payment asset or similar financial accounts. Advantageously, banks or other financial institutions may not participate to settle payments, thereby economically benefiting provisioning party and/or consuming party by avoiding payment fees, delay, and other resources. Thus, for example, access to a payment asset and/or similar financial account, and fund access as derivative may be accomplished via money transfer between payment assets and/or similar financial accounts, as well as through digital method of providing or sharing of access to individual, corporate, and/or business a payment asset and/or similar financial account. Optionally, provisioning party may provide or otherwise share access to a payment asset and/or similar financial account remotely using network-accessible device (such as smartphone, tablet, smartwatch, laptop, etc.) configured with Near Field Communication (NFC) (optionally), Special Mobile Application (SMA) (optionally), or SMA web version instead (optionally). It is contemplated herein that provisioning party does not need NFC enabled smartphone or another network-accessible device, (such as tablet, smartwatch, laptop, etc.) since, provisioning party may provide access to the payment asset and/or similar financial account without using NFC function; thus, the provisioning party may use SMA or web version instead (optionally). Consuming party needs smartphone or another network-accessible device (e.g., tablet, smartwatch, laptop, etc.) configured with NFC (optionally) to receive access to a payment asset and/or financial account, alternatively and to make transactions using such access. If either consuming party's or merchant's device does not support NFC technology, the consuming party may make transactions using Quick Response Code (a machine-readable optical label that contains information about the item to which it is attached) with digital token or merchant payment credentials encoded in it (optionally) (e.g., Visa) (hereinafter—"QR code") or any other universal platform. Consuming party device may be configured to access the provisioning party's payment asset and/or similar financial account via receipt of digital token, thereby enabling individual or legal entity with such consuming party device effectively to access provisioning party's payment asset and/or similar financial account, applicable to transact using NFC enabled devices or using QR code or any other universal platform, subject to conditions set by provisioning party (optionally). For example, by withdrawing money from Automated Teller Machine (ATM), making payments via Point Of Sale (POS) terminal, making e-commerce transactions, money transfers, fund disbursements and/or another type of transactions.

An automated digital method of providing or sharing access to an is initially cloud based technology, but also can be deployed to private cloud, in-house, on-premises, and/or to other type of environment.

An automated digital method of providing or sharing access to assets may be used by including, but not limited to:

banks or financial institutions that have integrated Visa Token Services (VTS), MasterCard Digital Enablement Service (MDES) or other similar service and receive digital tokens, banks or financial institutions that have not integrated VTS, MDES or other similar service yet and are not able to receive digital tokens, third-party wallet providers (such as Apple Pay, Google Wallet, Samsung pay, Android Pay etc.), that receive digital token of payment asset and/or similar financial account through integration with VTS, MDES and/or issuing bank and/or other similar service.

Access to the rights and/or obligations or access provided by non-payment asset transactions between individuals or legal entities without physical transmission of a non-payment asset or its credentials, particularly by providing or sharing access to a non-payment asset of a provisioning party, may be provided. Proposed digital method and system of providing or sharing access to non-payment assets transact access to the rights and/or obligations or access provided by such non-payment asset subject to conditions set by the provisioning party (optionally), but without transferring non-payment asset and/or similar non-financial account and/or non-card product or its credentials between individuals or legal entities. Advantageously, non-payment asset custodian may not participate to share or provide access to non-payment asset, thereby benefiting provisioning party and/or consuming party by avoiding additional costs, delay, and other resources. Thus, for example, access to the rights and/or obligations or access provided by the non-payment asset may be accomplished via such non-payment asset transmitting, as well as through providing or sharing of access to non-payment asset. Optionally, provisioning party may provide or otherwise share access to non-payment asset remotely using network-accessible device (such as smartphone, tablet, smartwatch, laptop, etc.) configured with Near Field Communication (NFC) (optionally), Special Mobile Application (SMA) (optionally), or SMA web version instead (optionally). Consuming party needs smartphone or another network-accessible device (e.g., tablet, smartwatch, laptop, etc.) configured with NFC (optionally) to receive access alternatively. If either consuming party's or merchant's device does not support NFC technology, the consuming party may use such non-payment asset for any purpose using QR code or any other universal platform. Consuming party device may be configured to access provisioning party's non-payment asset, thereby enabling individual or legal entity with such consuming party device effectively to receive and use access to the provisioning party's non-payment asset, subject to conditions set by provisioning party (optionally).

An automated digital method of providing or sharing access to a non-payment asset is initially cloud based technology, but can be deployed to private cloud, in-house, on-premises, and/or to other type of environment.

At least one automated digital method of providing or sharing access to an asset with or without involvement of the asset may be provided. In some embodiments, the access may be provided by using a digital token or any other applicable identifier. In some embodiments, the transactions and/or sharing of access may be enabled using NFC enabled device and/or barcode technology such as, but not limited to barcode, matrix barcode and QR code, or any other universal platform compatible with a computing device 900. In some embodiments, the access may be subject to conditions set by the provisioning party. In some embodiments, the need for participation of third parties may not be required to settle transactions using access to a provisioning party's asset. In some embodiments, bypassing the need for third parties may benefit the provisioning party and/or consuming party. As a non-limiting example, the provisioning party and/or consuming party may benefit economically by avoiding additional resources, expenses (e.g., fees) and delays.

In some embodiments consistent with the present disclosure, facilitation of access sharing may be provided by technology compatible with a computing device 900. The technology may comprise, but not limited to the following:

a communication protocol, such as, but not limited to Near Field Communication (NFC) and Host Card Emulation (HCE); and a barcode scanner, such as, but not limited to Quick Response (QR) code scanner and matrix barcode scanner.

In some embodiments consistent with the present disclosure, the aforementioned technology may enable, but not limited to the following functionality:

automatically specifying at least one of the following:
at least one identification parameter associated with the consuming party,
asset for sharing of access, and
at least one restriction on the access to the asset;
withdrawing money from Automated Teller Machine (ATM);
payments via Point Of Sale (POS) terminal;
e-commerce transactions;
money transfers; and
fund disbursements.

In some embodiments consistent with the present disclosure, sharing access to an asset may comprise, but not be limited to creating a virtual account. In some embodiments, creating the virtual account may comprise creating a virtual account with a set of restrictions imposed by the provisioning party and/or asset custodian. As a non-limiting example, the restrictions may include limiting the funds to the amount shared by the provisioning party (maximum amount of funds shared) or amount set available by the asset custodian (available balance on the account), whichever is lower. In this way, the consuming party may utilize the virtual account, without ever having to access the original asset. This may increase security, by limiting storage of data associated with the shared asset, and chance of unintended transactions, by not accessing the shared asset directly and not being subject to transaction processing times imposed by third parties such as, but not limited to merchants and asset custodians.

It should be understood terms "sender" and "recipient"/"receiver" used herein may refer to individuals and/or legal entities who may share, provide and/or receive access to an asset via the platform 100. The term "sender" may refer to the provisioning party, and the terms "recipient" and "receiver" may refer to the consuming party. Furthermore, the terms "asset" and "account" used herein, may be defined to include but are not limited to, credit, debit, other types of accounts, individual, corporate, business, and the like, unique personal/business account, or other type of financial account, SIM cards, ID cards, gift cards, stored-value (e.g., pre-paid) cards, and other types of non-payment assets and/or similar non-financial accounts, vehicles, any type of tickets, coupons, vouchers, biometric data and other types of similar non-card products. Further yet, the term "account provider" used herein may refer to a custodian of an asset/asset custodian such as, but not limited to the following: bank, financial institution, payment system, digital wallet provider, credit card provider, Visa/Mastercard, and cryptocurrency wallet/exchange. Still, the terms "applicable identifier", "callID", and "global ID" may be defined to include but not limited to, card ID, electronic key (e-key), token, access code, biometric data for example, face ID, fingerprints, semantic and haptic data, environmental data, sensor generated data.

Embodiments of the present disclosure may comprise methods, systems, and a computer readable medium comprising, but not limited to, at least one of the following:

A. A Provisioning Module;
B. An Access Module;
C. A Merchant Module;
D. A Proxy/Internet Module;
E. A Main Module; and
F. An Asset Access Module.

In some embodiments, the present disclosure may provide an additional set of modules for further facilitating the software and hardware platform. The additional set of modules may comprise, but not be limited to:

G. A Tokenization Module.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of this specifications. Each component disclosed for one module may be mixed with the functionality of another module. In the present disclosure, each component can be claimed on its own and/or interchangeably with other components of other modules.

The following depicts an example of a method of a plurality of methods that may be performed by at least one of the aforementioned modules, or components thereof. Various hardware components may be used at the various stages of operations disclosed with reference to each module. For example, although methods may be described to be performed by a single computing device 900, it should be understood that, in some embodiments, different operations may be performed by different networked elements in operative communication with the computing device 900. For example, at least one computing device 900 may be employed in the performance of some or all of the stages disclosed with regard to the methods. Similarly, an apparatus may be employed in the performance of some or all of the stages of the methods. As such, the apparatus may comprise at least those architectural components as found in computing device 900.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, at least one method may be performed by at least one of the modules disclosed herein. Each method may be embodied as, for example, but not limited to, computer instructions, which when executed, perform the method. A non-limiting example method may comprise the following stages:

Receiving a first request for sharing an asset from a consuming party,
Wherein receiving the first request for sharing asset from the consuming party comprises at least one of the following: the consuming party scanning a barcode and the consuming party using NFC to generate the request;
Verifying the asset has been registered,
Wherein verifying the asset has been registered comprises verifying a provisioning party has configured the asset to be shared by providing asset access information,
Wherein providing asset access information comprises providing at least one of the following: an account number of the asset, a routing number of an asset custodian, legal name of an asset owner, the asset custodian, a mailing address of the asset owner, a billing address of the asset owner, zip code of the asset owner; a Card Verification Value (CVV), a digital wallet address, an access code for the digital wallet, Personal Identification Number (PIN), an API key for accessing the asset, a multi-factor code, Device ID, a username, and a password;

Sending a provisioning party, the first request for approval,

Wherein sending the provisioning party the first request for approval comprises sending the following: details about a transaction for which sharing the asset has been requested and a specification of the asset requested for sharing, Wherein the details about the transaction for which sharing the asset has been requested comprise at least one of the following: amount of funds to cover the transaction, a merchant that the transaction is with, the time of the transaction, and the geolocation of the transaction;

Receiving an approval for the first request from the provisioning party,

Wherein receiving the approval for the first request from the provisioning party comprises receiving restriction parameters, Wherein the restriction parameters comprise at least one of the following: the amount of funds approved for sharing, the merchant approved for the transaction, the asset approved for sharing, the time during which sharing is approved, and the geolocation where sharing is approved;

Generating a first digital token to be shared with the consuming party,

Wherein generating the first digital token to be shared with the consuming party comprises generating the first digital token based on the restriction parameters, Wherein the first digital token corresponds to the approval for sharing and is used by the consuming user to specify the asset designated for sharing;

Notifying the consuming party of the approval for the first request,

Wherein notifying the consuming party of the approval for the first request further comprises providing the first digital token to the consuming party;

Receiving a second request for the transaction from the consuming party,

Wherein receiving the second request for the transaction from the consuming party further comprises receiving the first digital token and the details about the transaction;

Verifying the details about the transaction do not violate the restriction parameters associated with the first digital token, Wherein verifying the details about the transaction do not violate the restriction parameters associated with the first digital token comprises comparing the details about the transaction to the restriction parameters and verifying that the details about the transaction do not exceed or violate the restriction parameters;

Receiving a second digital token associated with the asset from an asset custodian, Wherein receiving the second digital token associated with the asset from the asset custodian comprises sending the asset access information to the asset custodian and receiving the second digital token associated with the asset, Wherein receiving the second digital token associated with the asset from the asset custodian further comprises receiving the second digital token for specifying the asset to the asset custodian in order to process transactions with the asset designated for sharing;

Sending a third request for the transaction to the asset custodian for processing, Wherein sending the third request for the transaction to the asset custodian for processing comprises sending the second digital token and the details about the transaction to the asset custodian;

Receiving a confirmation of a processed transaction from the asset custodian;

Notifying a merchant of the processed transaction,

Wherein notifying the merchant of the processed transaction comprises sending the merchant at least one of the following: An Android/iOS/Windows/Linux system notification, a text message, an MMS, an email, an application notification, and a phone call;

Notifying the consuming party of the processed transaction,

Wherein notifying the consuming party of the processed transaction comprises sending the consuming party at least one of the following: The Android/iOS/Windows/Linux system notification, the text message, the MMS, the email, the application notification, and the phone call; and Notifying the provisioning party of the processed transaction, Wherein notifying the provisioning party of the processed transaction comprises sending the provisioning party at least one of the following: The Android/iOS/Windows/Linux system notification, the text message, the MMS, the email, the application notification, and the phone call.

Although the aforementioned method has been described to be performed by the platform 100, it should be understood that computing device 900 may be used to perform the various stages of the method. Furthermore, in some embodiments, different operations may be performed by different networked elements in operative communication with computing device 900. For example, a plurality of computing devices may be employed in the performance of some or all of the stages in the aforementioned method. Moreover, a plurality of computing devices may be configured much like a single computing device 900. Similarly, an apparatus may be employed in the performance of some or all stages in the method. The apparatus may also be configured much like computing device 900.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. Platform Configuration

FIG. 1 illustrates one possible operating environment through which a platform consistent with embodiments of the present disclosure may be provided. By way of non-limiting example, any component of platform 100 may be hosted on, for example, a cloud computing service. In some embodiments, the platform 100 may be hosted on a computing device 900. A user may access platform 100 through a software application and/or hardware device. The software application may be embodied as, for example, but not be limited to, a website, a web application, a desktop application, and a mobile application compatible with the computing device 900. One possible embodiment of the software application and/or hardware device may be provided by the Corezoid suite of products and services provided by Middleware Inc.

In some embodiments consistent with the present disclosure, at least one module disclosed herein may be provided by a cloud service. In some embodiments, at least one module disclosed herein may be provided by at least one computing device 900, such as, but not limited to a server, a desktop, a laptop, a smartphone, and a tablet. In some embodiments, at least one module disclosed herein may be provided by a computing device 900 owned by the user such as, but not limited to provisioning party, consuming party, and merchant. The aforementioned computing device 900 may comprise, but not limited to a desktop, a laptop, a smartphone, and a tablet. In some embodiments, at least one module disclosed herein may be provided by a computing device 900 not owned by the user, such as, but not limited to at least one server and a cloud service. In some embodiments, at least one module disclosed herein may be provided by a combination of computing devices 900 owned by the user in communication with computing devices 900 not owned by the user. As a non-limiting example, the provisioning module 110 may be provided by a smartphone app in communication with a plurality of servers. In some embodiments, the user may interact with a module by means of user interface. In some embodiments, the user interface may comprise a set of computing instructions, such as, but not limited to a smartphone app and a web page.

In some embodiments, at least two modules may be in operative communication with each other. In some embodiments, the communication may be provided by the internet and/or World Wide Web (WWW). In some embodiments, at least some and/or all communication between at least two modules may be routed through an optional proxy 130, as described below, for additional security and/or privacy. In some embodiments, operative communication between at least two modules may be enabled via API. For non-limiting example, the main module 140 may communicate with the asset access module 150 via API provided by the asset custodian.

In some embodiments consistent with the present disclosure, at least two modules may be combined into a single module. In some embodiments, at least two modules may share common functionality. Furthermore, the modules disclosed herein, are presented for illustrative purposes and may not necessarily reflect a software architecture.

Accordingly, embodiments of the present disclosure provide a software and hardware platform comprised of a distributed set of computing elements, including, but not limited to:

A. A Provisioning Module

In some embodiments consistent with the present disclosure, a provisioning module 110 may be provided. In some embodiments, the provisioning module 110 may facilitate at least some functionality for a sharing user who wishes to share access to at least one asset in their possession. In some embodiments, the aforementioned user may provide a consuming party with access to an asset, such as, but not limited to, a bank account. The sharing user may be referred to as provisioning party herein, although it should be understood that the sharing user need not share or send their account to any third party or consuming party. In some embodiments, the sharing user may employ the functions disclosed herein for creating a virtual account for strictly personal usage. For example, the provisioning party may want to share a portion of their asset with themselves for budget purposes.

In some embodiments, the provisioning party may designate at least one asset for sharing. In some embodiments, the provisioning party may designate at least one asset for sharing via an interface, such as a Graphical User Interface (GUI) provided by the provisioning module 110 and/or asset access module 150 and/or asset custodian, such as intermediary asset custodian (e.g., PayPal, Venmo, Square Cash, and Visa Checkout). The designation may comprise, but not limited to at least one of the following:

Providing the main module 140 with the information about the asset designated for sharing. The information about the asset may be used by the main module 140 to generate a digital token representing the asset and/or obtain a digital token representing the asset from, for example, asset access module 150 and/or tokenization module 160. The information may include, but not limited to, at least one piece of information disclosed below.

Registering an asset designated for sharing with an account custodian and/or payment platform. In some embodiments, the asset custodian and/or payment platform may comprise an intermediary asset custodian. As a non-limiting example, the provisioning party may register an asset (such as credit card) with an intermediary asset custodian (such as, but not limited to PayPal, Venmo, Square Cash, and Visa Checkout). After the provisioning party registers the asset with the intermediary asset custodian, the provisioning party may provide information about the asset to the main module 140 for accessing the asset on the behalf of the provisioning party. The information may include, but not limited to, at least one piece of information disclosed below. As a non-limiting example, the provisioning party may provide the main module 140 with an API key and/or digital token for accessing the shared asset, in order to request transactions from the asset custodian and/or asset access module 150.

The provisioning party may provide the main module 140 with direct access to an asset designated for sharing, such as, but not limited to digital and/or cryptocurrency wallet. The direct access may be provided by, but not limited to, specifying at least one piece of information disclosed below. As a non-limiting example, the provisioning party may provide a digital/cryptocurrency wallet address and key to the main module 140 for accessing the wallet on the behalf of the provisioning party.

In some embodiments consistent with the present disclosure, at least one piece of information about the asset may be used as a Global ID, unique id, and/or callID in order to represent the asset/provisioning party. In some embodiments, at least one piece of information about the asset may be processed by, for example, main module 140 and/or tokenization module 160, in order to generate a more secure way to represent the asset such as, but not limited to a digital token, Global ID, unique id, and/or callID representing the asset/provisioning party. The information about the asset may comprise, but not be limited to at least one of the following:

Account Number;
Routing Number;
Legal Name of asset owner;
Asset custodian;
Mailing/Billing address of the asset owner and/or zip code;
Card Verification Value (CVV);
Digital/cryptocurrency wallet address and optionally the wallet key/access code;
Personal Identification Number (PIN);
API key;
Multi-factor code, such as, but not limited to Google Authenticator registration code/QR code;
Device ID (such as IMEI or MAC address);
Username;
Password; and
Digital token.

In some embodiments consistent with the present disclosure, the provisioning party may designate a set of restrictions on the access to the asset, such as, but not limited to the following:

an identification of at least one consuming party to receive the sharing privileges;

a time for enabling and disabling the sharing privileges;

an amount of asset value within the account to be conveyed with the sharing privileges;

a quantity of transactions to be permitted with the account;

at least one merchant approved for transaction with the account; and at least one type of transaction available for the sharing privileges.

In some embodiments consistent with the present disclosure, the provisioning party may not specify any restrictions. In some embodiments, the provisioning party may specify a plurality of restrictions. In some embodiments, the provisioning party may specify restrictions via a provisioning module 110, by the use of, by non-limiting example, a graphical user interface or a textual user interface (e.g., text-based communication).

In some embodiments consistent with the present disclosure, the provisioning party may specify at least one consuming party for the sharing of access. As mentioned above, the consuming party may be, in certain scenarios, the provisioning party themselves. In some embodiments, the consuming party may be specified by indicating at least one identification parameters associated with the consuming party. The identification parameters associated with the consuming party may include, but not limited to the following:

A global ID such as, but not limited to a unique ID on the platform 100;

A phone number, such as, but not limited to mobile phone number;

An electronic address, such as, but not limited to email and/or website address;

A social ID, such as, but not limited to a social media handle and a social networking service account;

A unique device identifier, such as, but not limited to an International Mobile Equipment Identity (IMEI) number and a Media Access Control (MAC) address;

A physical address, such as, but not limited to a postal address and a billing address; and Another Global Unique Identifier In some embodiments consistent with the present disclosure, the provisioning party may indicate a plurality of identification parameters associated with the consuming party. In some embodiments, the provisioning party may indicate all identification parameters associated with the consuming party. In some embodiments, the provisioning party may indicate at least one identification parameter associated with the consuming party, while the remaining identification parameters may be filled in by data available to platform 100.

In some embodiments consistent with the present disclosure, the provisioning module 110 may initiate the sharing of the asset via an applicable identifier such as, but not limited to an account number, being sent to the access module 115. In some embodiments, the provisioning module 110 may initiate the sharing of the asset via the main module 140. In some embodiments, the initiation of sharing may transpire without at least one of the following facilitating the sending of the applicable identifier:

bank;
financial institution;
payment system;
digital wallet provider;
credit card provider;
Visa Token Service (VTS); and
Mastercard Digital Enablement Service (MDES).

In some embodiments consistent with the present disclosure, the initiation of sharing may transpire without any of the aforementioned services/providers facilitating the sending of the applicable identifier. In some embodiments, the initiation of sharing may transpire with at least one of the aforementioned services/providers facilitating the sending of the applicable identifier.

B. An Access Module

In some embodiments consistent with the present disclosure, an access module 115 may be provided. In some embodiments, the access module 115 may facilitate at least some functionality for a consuming party who wishes to receive and utilize shared access to at least one asset. The asset may not otherwise be in their possession, while in other embodiments, the account may be their own. In some embodiments, the consuming party may be provided with shared access to an asset, such as, but not limited to, a bank account. The consuming party may be referred to as receiver and/or receiving user herein.

In some embodiments, the access module 115 may enable the consuming party to perform at least one of the following functions, by way of non-limiting example:

receive an applicable identifier tied to an asset;

utilize the applicable identifier to access the asset;

receive access to the asset subject to the sharing constraints, such as constraints enforced by the main module 140;

utilize the asset to make at least one transaction in accordance to the at least one type of transaction permitted by the sharing constraints, such as one of the following:

withdrawing money from ATM,
making payments via POS terminal,
e-commerce transactions,
money transfers, and
fund disbursements; and access the asset for real-time payment via proximity-based payment, such as NFC and QR, with or without network access—in some embodiments, the access to the asset may comprise access in accordance to the specified constraints for the at least one type of the following transactions:

withdrawing money from ATM,
making payments via POS terminal,
e-commerce transactions,
money transfers, and
fund disbursements.

In some embodiments consistent with the present disclosure, the access module 115 may be provided by a cloud service. In some embodiments, the access module 115 may be provided by at least one computing device 900, such as, but not limited to a server, a desktop, a laptop, a smartphone, and a tablet. In some embodiments, the access module 115 may be provided by a computing device 900 owned by the consuming party, such as, but not limited to a desktop, a laptop, a smartphone, and a tablet. In some embodiments, the access module 115 may be provided by a computing device 900 not owned by the consuming party, such as, but not limited to at least one server and a cloud service. In some embodiments, the access module 115 may be provided by a combination of computing devices 900 owned by the consuming party in communication with computing devices 900 not owned by the consuming party. As a non-limiting example, the access module 115 may be provided by a smartphone app in communication with a plurality of servers. In some embodiments, the consuming party may interact with the access module 115 by means of user interface. In some embodiments, the user interface may comprise a set of computing instructions, such as, but not limited to a smartphone app and a web page.

In some embodiments consistent with the present disclosure, facilitation of access may be provided by technology compatible with a computing device 900. The technology may comprise, but not limited to the following:
 a communication protocol, such as NFC and HCE,
 a barcode scanner, such as QR code scanner and matrix barcode scanner, and
 Bluetooth.

In some embodiments consistent with the present disclosure, the aforementioned technology may enable, but not be limited to, the following functionality:
 automatically specifying at least one of the following:
  at least one identification parameter associated with the consuming party,
  asset for sharing of access, and
  at least one restriction on the access to the asset;
 withdrawing money from ATM,
 payments via POS terminal,
 e-commerce transactions,
 money transfers, and
 fund disbursements.

In some embodiments consistent with the present disclosure, the access module 115 may utilize applicable identifier such as, but not limited to a digital token, associated with the shared asset received, for example from the provisioning module 110. In some embodiments, the utilization of applicable identifier may transpire without at least one of the following facilitating the sending of the applicable identifier:
 bank,
 financial institution,
 payment system,
 digital wallet provider,
 credit card provider,
 VTS, and
 MDES.

Consistent with embodiments of the present disclosure, the applicable identifier utilized by platform 100 may be a variant or encrypted version of a digital token received from a third party, such as, but not limited to, VTS or MDES. In this way, the receiving user may not be enabled to reverse engineer the data associated with the digital token received from the third party. In some embodiments consistent with the present disclosure, the utilization of applicable identifier may transpire without any of the aforementioned services/providers facilitating the sending of the applicable identifier. In some embodiments, the utilization of applicable identifier may transpire with at least one of the aforementioned services/providers facilitating the sending of the applicable identifier.

C. A Merchant Module

In some embodiments consistent with the present disclosure, a merchant module 120 may be provided. In some embodiments, the merchant module 120 may provide a merchant with an ability to make a transaction with at least one shared asset, via main module 140 and/or asset access module 150, in order to receive funds for purchased goods. In some embodiments, the merchant module 120 may integrate with a plurality of sales-oriented systems such as, but not limited to the following:
 POS Terminals, such as terminals at brick and mortar stores used to facilitate a purchase;
 ATMs, such as bank owned and third-party ATMs used to withdraw, transfer and/or deposit funds;
 Digital Wallets, such as Apple Pay, Android Pay, Samsung Pay, Venmo and Cash App used to transfer funds and/or facilitate purchases;
 Online Sales Platforms, such as those utilized by online retailers such as Amazon and eBay to facilitate online purchases of goods and/or services;
 Cryptocurrency Accounts, such as the following:
  Software Wallets, such as Bitcoin Wallet, Ethereum Wallet and Monero Wallet,
  Hardware Wallets, such as Ledger, Trezor, and ELLIPAL,
  Centralized Exchanges, such as Bitrex, Binance and Coinbase, and
  Decentralized Exchanges, such as Shapeshift, Changely, Waves and EtherDelta; and
 Any computing device 900 compatible with an application that can be configured for bi-directional communication with the main module 140.

In some embodiments consistent with the present disclosure, the merchant module 120 may be provided by a cloud service. In some embodiments, the merchant module 120 may be provided by at least one computing device 900, such as, but not limited to a server, a desktop, a laptop, a smartphone, and a tablet. In some embodiments consistent with the present disclosure, ability to utilize shared asset to purchase goods may be provided by technology compatible with a computing device 900. The technology may comprise, but not limited to the following:
 a communication protocol, such as NFC and HCE;
 a barcode scanner, such as Quick Response (QR) code scanner and matrix barcode scanner; and
 Bluetooth.

In some embodiments consistent with the present disclosure, the aforementioned technology may enable, but not limited to the following functionality:
 automatically specifying at least one of the following:
  at least one identification parameter associated with the consuming party,
  asset for sharing of access, and
  confirmation of payment/transfer of funds;
 withdrawing money from Automated Teller Machine (ATM);
 payments via Point Of Sale (POS) terminal;
 e-commerce transactions;
 money transfers; and
 fund disbursements.

D. A Proxy/Internet Module

In some embodiments consistent with the present disclosure, a proxy/internet module 130 may be provided. In some embodiments, the proxy/internet module 130 may facilitate communication between at least two modules disclosed herein. In some embodiments, at least one module disclosed herein may be connected directly to the internet, which may be known to a person having ordinary skill in the art as Word Wide Web (WWW) and/or Wide Area Network (WAN). In some embodiments all modules may be connected directly to the internet. In some embodiments, at least one module disclosed herein may be connected to a proxy. A proxy may comprise a server and/or service that acts as an intermediary for requests from clients, such as modules, seeking resources from other clients, such as other modules. In some embodiments, the proxy may process at least one type of request from a first module to a second module. For a non-limiting example, the main module 140 may send a digital token to an access module 115 via a proxy server. In some embodiments, the proxy functionality may be provided by a third-party server and/or service such as, but not limited to the following:

Content Delivery Network (CDN) such as Cloud Flare and Akamai;

Proxy software such as, but not limited to, Squid and Privoxy; and

Hardware appliance such as, but not limited to, Mikrotik.

E. A Main Module

In some embodiments consistent with the present disclosure, a main module 140 may be provided. In some embodiments, the main module 140 may facilitate the sharing of access of an asset. Furthermore, main module 140 may be configured to impose sharing constraints on the asset and/or account. In some embodiments, the middleware module may facilitate the sharing of access by communicating with the other modules such as, but not limited to the provisioning module 110, the access module 115, the asset access module 150, and the merchant module 120. In some embodiments, the main module 140 may be configured in operative communication with the tokenization module 160. For example, the main module 140 may communicate with the provisioning module 110 to set up an asset for sharing and establish sharing constraints, with access module 115 to receive and approve/deny usage of the shared asset, with the merchant module 120 to facilitate the transaction with the shared asset, and the asset access module 150 to transfer the funds. The communication may be performed via, for example, the proxy/internet 120 module. In some embodiments, the communication may be between the main module 140, provisioning module 110, and access module 115. In some embodiments, the communication may also include asset access module 150 and/or merchant module 120. In some embodiments where asset access module 150 is utilized, the communication may optionally include tokenization module 160.

In some embodiments consistent with the present disclosure, the main module 140 may be provided by a cloud service. In some embodiments, the main module 140 may be provided by at least one computing device 900, such as, but not limited to a server, a desktop, a laptop, a smartphone, and a tablet. In some embodiments, the main module 140 may be integrated with another module such as, but not limited to asset access module 150, provisioning module 110, access module 115, and merchant module 120. In some embodiments, the main module 140 may be independent from any other module. For example, but not limited to, technically, the main module 140 may comprise a template product (such as a set of processes in Corezoid and expert system in Deepmemo) to an account provider and/or payment service provider and/or retail merchant (such as any entity that is allowed by Visa rules to connect to Visa Checkout APIs) in order to connect to Visa Checkout APIs and provide sharing of business logic.

In some embodiments consistent with the present disclosure, the main module 140 may enforce a set of restrictions on the access to the asset. The restrictions may be, in some embodiments, specified by the provisioning party via the provisioning module 110. In other embodiments, a user may specify the restrictions directly to the main module 140 through an applicable user interface. The restrictions enforced by main module 140 may comprise, but not be limited to, the following:

an identification of at least one consuming party to receive the sharing privileges;

a time for enabling and disabling the sharing privileges;

an amount of asset value within the account to be conveyed with the sharing privileges;

a quantity of transactions to be permitted with the account;

at least one merchant approved for transaction with the account; and at least one type of transaction available for the sharing privileges.

In some embodiments consistent with the present disclosure, restrictions may not be specified. In some embodiments, a plurality of restrictions may be specified. In some embodiments consistent with the present disclosure, a provisioning party and/or consuming party may be specified via access module 115 and/or provisioning module 110. In some embodiments, the provisioning party and/or consuming party may be specified directly to main module 140 by indicating at least one identification parameters associated with the provisioning party and/or consuming party. The identification parameters may include, but not limited to the following:

A global ID such as, but not limited to, an ID on the platform 100;

A phone number, such as, but not limited to mobile phone number;

An electronic address, such as, but not limited to email;

A social ID, such as, but not limited to a social media handle and a social networking service account;

A unique device identifier, such as, but not limited to an International Mobile Equipment Identity (IMEI) number and a Media Access Control (MAC) address;

A physical address, such as, but not limited to a postal address and a billing address; and Another global unique identifier.

In some embodiments consistent with the present disclosure, a plurality of identification parameters may be specified. In some embodiments, all identification parameters may be specified. In some embodiments, at least one identification parameter may be specified, while the remaining identification parameters may be filled in by the platform 100. In some embodiments, the main module 140 may identify a provisioning party and/or consuming party by at least one identification parameter that was specified. In some embodiments, the main module 140 may retrieve the remaining identification parameters after identifying the provisioning party and/or consuming party. In some embodiments, the main module 140 may utilize at least one identification parameter to specify the provisioning party and/or consuming party with another module.

In some embodiments consistent with the present disclosure, asset \ to be shared may be specified by the provisioning party, as disclosed in the provisioning module 110 section.

In some embodiments consistent with the present disclosure, the main module 140 may comprise a tokenization functionality such as, but not limited to tokenization service and/or tokenization infrastructure. In some embodiments, the tokenization functionality may be utilized to enforce a set of restrictions. In some embodiments, the tokenization functionality may be utilized to obfuscate/conceal identification parameters of provisioning party and/or consuming party, by for example, but not limited to, identifying a provisioning party and/or consuming party via a digital token. In some embodiments, the tokenization functionality may be utilized to obfuscate/conceal a digital token provided by the tokenization module 160, by for example, but not limited to, identifying a digital token provided by the tokenization module 160 via a different digital token. In some embodiments, the tokenization functionality may be utilized to obfuscate/conceal at least one sensitive data element via a non-sensitive digital token. In some embodiments, the tokenization functionality may be logically isolated and/or segmented from parts of the platform 100 that may process and/or store sensitive data. In some embodiments, the tokenization functionality may be utilized to reduce risk of compromise or accidental exposure and unauthorized access to sensitive data. In some embodiments, the tokenization functionality may be used to safeguard sensitive data involving, for example, but not limited to bank accounts, financial statements, medical records, criminal records, driver's licenses, loan applications, stock trades, voter registrations, and other types of personally identifiable information. In some embodiments, the tokenization functionality may be provided in part by use of encryption. In some embodiments, the tokenization functionality may provide the modules mentioned herein with the authority and interfaces to request tokens and/or detokenize back to sensitive data.

In some embodiments consistent with the present disclosure, the main module 140 may receive a request to generate and/or provide a digital token associated with, for example, but not limited to asset, account, provisioning party, consuming party, the set of restrictions specified by the provisioning party and/or a digital token provided by the tokenization module 160. In some embodiments, the main module 140 may generate a digital token. In some embodiments, the digital token may be generated, at least in part, by encrypting information the digital token is meant to represent/obfuscate/conceal. In some embodiments, generating a digital token uses methods which render said tokens infeasible to reverse in the absence of the tokenization system, for example, but not limited to using tokens created from random numbers. In some embodiments, only the main module 160 may tokenize data to create tokens and/or detokenize back to redeem sensitive data under strict security controls. In some embodiments, the token generation method may be proven to have the property that there is no feasible means through direct attack, cryptanalysis, side channel analysis, token mapping table exposure or brute force techniques to reverse tokens back to live data. In some embodiments, the choice of tokenization as an alternative to other techniques such as, but not limited to encryption may depend on varying regulatory requirements, interpretation, and/or acceptance by respective auditing and/or assessment entities.

F. An Asset Access Module

In some embodiments consistent with the present disclosure, an asset access module 150 may be provided. The asset access module 150 may facilitate access to an asset of which the asset custodian is a custodian. In some embodiments, the asset access module 150 may process transactions utilizing the assets. As a non-limiting example, the main module 140 may send a transaction for processing to the asset access module 150. The transaction may be within the sharing constraints set upon the account that was verified by the main module 140, in association with an asset/account identified by a corresponding identifier. In turn, the asset access module 150 may perform any one of the following: receive the transaction request, process the request to ascertain the transaction parameters (including, for example, transferring a specific amount of funds from the shared asset to the merchant during the specified time frame), execute the transaction, and respond with the result of the transaction.

Asset custodians such as, but not limited to, banks, financial institutions, credit unions, digital wallets, and credit/debit card providers, may employ an asset access module 150 to process transactions. For example, when using a Visa credit card at a merchant, the merchant may communicate with the main module 140 to request a transaction to be made with the shared asset. The main module 140 may in turn communicate with the asset access module 150 provided by Visa in order to process the transaction and transfer the funds to the merchant via the merchant module 120.

In some embodiments consistent with the present disclosure, an asset access module 150 may have an integrated the tokenization module 160 such as, but not limited to VTS, MDES or other similar service. In such instances, the process of receiving of the digital token of the asset may be obtained by interacting with the asset custodian's service and/or the asset custodian, which may, in turn, provide the digital token from the tokenization module 160 by the standard procedure of the digital token provisioning. In some embodiments, the asset custodian may not have integrated the tokenization module 160. In such embodiments, the process of receiving of the digital token of the asset may be provided by interaction with a third-party tokenization module 160 or encrypted communication may be utilized instead of tokenization method.

G. A Tokenization Module

In some embodiments consistent with the present disclosure, a tokenization module 160 may be provided. The tokenization module 160 may generate and distribute digital tokens to authorized parties, such as, but not limited to the main module 140. A digital token may be used to represent an asset or an account, such as, but not limited to an asset designated for sharing. By using the digital token, the authorized parties may gain access to an electronically restricted resource, such as, but not limited to, asset designated for sharing. By utilizing digital tokens provided by, for example, the tokenization module 160, authorized parties such as, but not limited to the main module 140, may gain secure access to the asset designated for sharing without storing financially sensitive data.

In some embodiments consistent with the present disclosure, the tokenization module 160 may be provided by a third party, for example, but not limited to VTS and MDES. In some embodiments, the tokenization module 160 may facilitate access from the main module 140 to the asset access module 150. In some embodiments, the tokenization module 160 may be provided by an asset custodian such as, but not limited to Visa (with VTS) and MasterCard (with MDES). In some embodiments, the tokenization module may not be present.

In some embodiments consistent with the present disclosure, an asset custodian may have integrated the tokenization module 160 such as, but not limited to VTS, MDES or other similar service. In such instances, the process of receiving of the digital token of the asset may be obtained by interacting with the asset custodian's service and/or the asset custodian, which may, in turn, provide the digital token from the tokenization module 160 by the standard procedure of the digital token provisioning. In some embodiments, the asset custodian may not have integrated the tokenization module 160. In such embodiments, the process of receiving of the digital token of the asset may be provided by interaction with a third-party tokenization module 160 or encrypted communication may be utilized instead of tokenization method.

In some embodiments consistent with the present disclosure, the main module 140 may generate a new digital token, based at least in part on the token provided by the tokenization module 160. The newly generated token may then be provided to other modules such as, but not limited to the access module 115. By generating a new token, the main module 140 may prevent the other modules from accessing the asset custodians directly and/or bypassing a set of restrictions specified by, for example, the provisioning module 110.

III. Platform Operation

Embodiments of the present disclosure provide a hardware and software platform operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device, it should be understood that, in some embodiments, different operations may be performed by different networked elements in operative communication with the computing device. For example, at least one computing device 900 may be employed in the performance of some or all of the stages disclosed with regard to the methods. Similarly, an apparatus may be employed in the performance of some or all of the stages of the methods. As such, the apparatus may comprise at least those architectural components as found in computing device 900.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

FIGS. 2, 3A, 3B, 4A, 4B, 5A, 5B, 6A, 6B, 7A, 7B, and 8 set forth the general stages involved in a methods 200, 300, 400, 500, 600, 700, and 800 consistent with at least one embodiment of the present disclosure for providing the platform 100. Methods 200, 300, 400, 500, 600, 700, and 800 may be implemented using a computing device 900 or any other component associated with platform 100 as described in more detail below with respect to FIG. 9. Furthermore, at least some of the communication, over a network, between 2 or more computing devices 900, may be routed through a proxy 130. Alternately, in some embodiments, network communication may be routed directly over the Internet 130, omitting a proxy. For illustrative purposes alone, computing device 900 is described as one potential actor in the following methods.

A. A Method of Sharing an Asset for a Single Transaction with a Merchant 200

Consistent with embodiments of the present disclosure, a method may be performed by at least one of the aforementioned modules. Although each module has been disclosed to perform a specific function, it should be understood that such module is conceptualized for illustrative purposes only, and that the disclosed functions may be shared by one or more modules, regardless of the module name. The method may be embodied as, for example, but not limited to, computer instructions, which when executed, perform the method. The method may comprise the following stages:

Receiving a first request for sharing an asset from a consuming party 205

Verifying the asset has been registered 210

Sending a provisioning party the first request for approval 215

Receiving an approval for the first request from the provisioning party 220

Generating a first digital token to be shared with the consuming party 225

Notifying the consuming party of the approval for the first request 230

Receiving a second request for the transaction from the consuming party 235

Verifying the details about the transaction do not violate the restriction parameters associated with the first digital token 240

Receiving a second digital token associated with the asset from an asset custodian 245

Sending a third request for the transaction to the asset custodian for processing 250

Receiving a confirmation of a processed transaction from the asset custodian 255

Notifying a merchant of the processed transaction 260

Notifying the consuming party of the processed transaction 265

Notifying the provisioning party of the processed transaction 270

Figure 2:
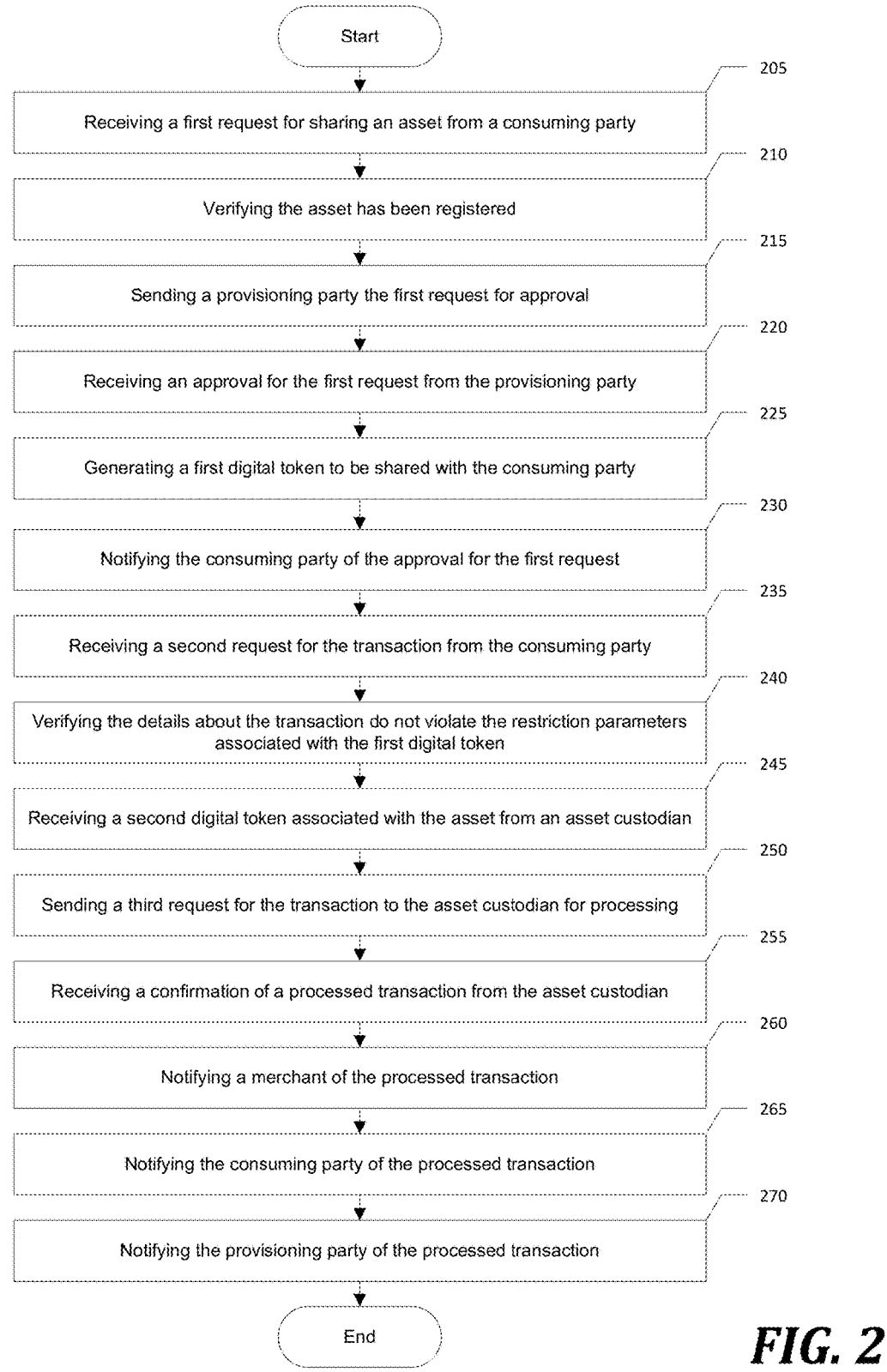
FIG. 2 illustrates a representative method embodiment including general share process that may be implemented by merchants and asset custodians.

FIG. 2 shows a representative method embodiment block diagram, according to at least one embodiment consistent with the present disclosure, for a general sharing process that may be implemented by asset custodians such as, but not limited to, banks, financial institutions, digital/cryptocurrency wallet providers and other asset custodians, that have already integrated tokenization module 160 such as, but not limited to, VTS, MDES or other similar service and get digital tokens of assets.

1. Receiving a First Request for Sharing an Asset from a Consuming Party 205

In some embodiments consistent with the present disclosure, the consuming party may request a provisioning party to share an asset for use with the initiated transaction. The consuming party may utilize a device configured with the access module 115 to specify the provisioning party who is to receive the request. The consuming party may utilize a user interface provided by the access module 115 to specify at least one identifying parameter of the provisioning party such as, but not limited to phone number and name.

In some embodiments consistent with the present disclosure, the consuming party may provide additional details to be sent along with the request. In some embodiments, the details may be conveyed to the provisioning party via the main module 140. The additional details may comprise, but not limited to amount the consuming party wishes to be shared and the merchant the consuming party wishes to spend the shared funds with. In some embodiments, the access module 115 may send some information about the transaction along with the sharing request. The information about the transaction may comprise, but not limited to the total amount of the transaction and the merchant with which the transaction is being made. In some embodiments, the information about the transaction may be obtained from the merchant module 120. In some embodiments, the information may be embedded in the code scanned by the consuming party.

In some embodiments consistent with the present disclosure, once the consuming party provides the information, the user interface provided by the access module 115 may ask the consuming party to verify the provided information. Once verified, the consuming party confirms the information is correct and the sharing request is sent to the provisioning party. In some embodiments, the consuming party may be able to send the request without confirming the information.

In some embodiments consistent with the present disclosure, a merchant may configure a device such as a computing device 900 with a merchant module 120 to facilitate digital transactions. When a consuming party, attempts to make a transaction with the merchant, the merchant module 120 may generate a barcode such as, but not limited to a QR code to be scanned by the consuming party's device configured with the access module 115. In some embodiments, a plurality of technologies may be used to facilitate the transaction, such as, but not limited to another type of code reading mechanism, NFC and Bluetooth.

In some embodiments consistent with the present disclosure, the merchant may use a single barcode for a plurality of transactions. In such embodiments, the code may be printed once and displayed to the public. Furthermore, in such embodiments, the merchant module 120 may not be required to generate a code for every transaction. In some embodiments, may transfer the code via a proxy 130 for added security in cases where the merchant module 120 may be located remotely.

As a non-limiting example, a consuming party, such as a teenager, may wish to make a transaction with a merchant, such as a supermarket. The merchant may generate a QR code that represents the transaction the consuming party wishes to make. When the consuming party scans the QR code with a device configured with the access module 115, the device may activate a user interface provided by the access module 115. Within the user interface, the consuming party may be able to verify the transaction details, select a provisioning party, such as a parent, and send a request for sharing funds to cover the transaction.

In some embodiments consistent with the present disclosure, a proxy 130 may mediate all communication between the modules.

2. Verifying the Asset Has Been Registered 210

When the consuming party sends the request, the access module 115 forwards the request to the main module 140. In some embodiments, the request may be forwarded by the proxy 130. In some embodiments, the request may contain at least one of, but not limited to the following: provisioning party identification, asset designated for sharing, amount of funds designated for sharing, merchant to spend shared funds with, and other information about at least one transaction the consuming party wishes to make.

In some embodiments consistent with the present disclosure, when the main module 140 receives the request, it checks if the provisioning party's asset has been registered with a payment platform and/or asset custodian and/o asset access module 150 compatible with the merchant in question, such as, but not limited to PayPal and Visa checkout platform. In some embodiments, by registering the asset for sharing with an account custodian and/or payment platform compatible with the merchant, the provisioning party may provide asset access information to the main module 140. The asset access information may enable the main module 140 to request transactions using the asset. Furthermore, asset access information may comprise at least one of the following: an account number of the asset, a routing number of an asset custodian, legal name of an asset owner, the asset custodian, a mailing address of the asset owner, a billing address of the asset owner, zip code of the asset owner; a Card Verification Value (CVV), a digital wallet address, an access code for the digital wallet, Personal Identification Number (PIN), an API key for accessing the asset, a multi-factor code, Device ID, a username, and a password.

If the provisioning party has not configured the asset on the payment platform/asset custodian compatible with the merchant, the main module 140 may send the provisioning party a notification to configure the asset via the provisioning module 110. Designating an asset for sharing may be further detailed in the methods herein, such as method 500.

Once the main module 140 verifies that the asset for sharing is configured with a payment platform compatible with the merchant, it may forward the sharing request to the provisioning party for confirmation.

Continuing the previous example, when the consuming party, such as teenager, sends the sharing request to the provisioning party, such as parent, the main module 140 may check if the provisioning party has configured the asset for sharing. Once the main module 140 verifies an asset has been configured for sharing, it may send a request to the provisioning party via the provisioning module 110 for approval.

3. Sending a Provisioning Party the First Request for Approval 215

Once the main module 140 may forward the sharing request to the provisioning party, the provisioning party may receive a notification on a device configured with the provisioning module 110. The notification may comprise, but not limited to Android/iOS/Windows/Linux system notification, text message/MMS, email, application notification, and a phone call.

In some embodiments consistent with the present disclosure, the request for approval may comprise at least one for the following: details about a transaction for which sharing the asset has been requested and a specification of the asset requested for sharing. Furthermore, the details about the transaction for which sharing the asset has been requested may comprise at least one of the following: amount of funds to cover the transaction, a merchant that the transaction is with, the time of the transaction, and the geolocation of the transaction.

In some embodiments consistent with the present disclosure, the main module 140 may forward the request to the provisioning party by routing the request through the proxy 130.

After the provisioning party receives the notification, the provisioning party may review the sharing request and may confirm or deny the sharing request.

Upon confirming the sharing request, the provisioning module 110 may send the confirmation to the main module 140. In some embodiments, the confirmation may be routed through the proxy 130.

4. Receiving an Approval for the First Request from the Provisioning Party 220

In some embodiments consistent with the present disclosure, the main module 140 may receive an approval for sharing the asset from the provisioning module 110, after the provisioning party approves the request. In some embodiments, the approval may comprise, restriction parameters. In some embodiments, the restriction parameters may comprise at least one of the following: the amount of funds approved for sharing, the merchant approved for the transaction, the asset approved for sharing, the time during which sharing is approved, and the geolocation where sharing is approved. In some embodiments, the restriction parameters may comprise the details about the transaction for which sharing the asset has been requested.

Continuing with the non-limiting example above, when the provisioning party, such as the parent, confirms sharing the asset for a transaction the consuming party, such as a teenager, wishes to make, the transaction parameters, such as amount of the transaction and the merchant, may become restriction parameters. For example, the sharing may be restricted to the amount of the transaction and the merchant the transaction is with. The restriction parameters may then be sent by the provisioning module 110 to the main module 140 for enforcement.

5. Generating a First Digital Token to be Shared with the Consuming Party 225

In some embodiments consistent with the present disclosure, when the main module 140 receives the approval for sharing the asset along with the restriction parameters from the provisioning module 110, the main module may generate a digital token based on at least one of the following: the specification of the asset designated for sharing, the restriction parameters, the details about the transaction, the provisioning party, and the consuming party. In some embodiments, the digital token may then be sent to the access module 115, and may be used by the consuming party, via the access module 115, to specify at least one of the following: the asset designated for sharing, the restriction parameters, the details about the transaction, the provisioning party, and the consuming party.

In some embodiments consistent with the present disclosure, the digital token may be used in order to prevent the consuming party and/or access module 115 from storing sensitive information, secure information, and personally identifiable information. Furthermore, in some embodiments, the use of the digital token may prevent unauthorized transactions and bypassing the restriction parameters.

Continuing with the non-limiting example above, once the provisioning party, such as the parent, approves sharing of the asset, the main module 140 may generate a digital token and forward it to the access module 115 on the consuming party's, such as the teenager, device. The consuming party may then use that digital token to make at least one transaction with at least one merchant, without ever obtaining details about the shared asset and sensitive information about the provisioning party. Furthermore, since the consuming party may not ever obtain the details about the shared asset, the consuming party may not make any unauthorized transactions with the shared asset.

6. Notifying the Consuming Party of the Approval for the First Request 230

In some embodiments consistent with the present disclosure, the main module 140 may send the consuming party a notification of shared access via the access module 115. In some embodiments consistent with the present disclosure, the main module 140 may send the notification to the consuming party by routing the request through the proxy 130. The notification may comprise, but not be limited to, Android/iOS/Windows/Linux system notification, text message/MMS, email, application notification, and a phone call.

In some embodiments consistent with the present disclosure, notifying the consuming party of the approval for the first request further comprises providing the first digital token to the consuming party.

Continuing with the non-limiting example above, once the provisioning party, such as the parent, approves sharing of the asset, the main module 140 may generate a digital token and forward it to the access module 115 on the consuming party's, such as the teenager, device. The consuming party may then use that digital token to make at least one transaction with at least one merchant, using the user interface provided by the access module 115, and a technology such as NFC.

7. Receiving a Second Request for the Transaction from the Consuming Party 235

In some embodiments consistent with the present disclosure, after the consuming party receives the notification, they may approve or deny the payment to the merchant. Upon approving the payment to the merchant, the access module 115 may send the approval to the main module 140. In some embodiments, the approval may be routed through the proxy 130.

In some embodiments consistent with the present disclosure, the consuming party may, the consuming party may approve or deny the payment to the merchant through a UI provided by the access module 115. In some embodiments, the access module 115 may be in operative communication with the merchant module 120 (such as POS terminal) via for example, but not limited to, NFC, information obtained from scanned barcode, and/or main module 140. The access module 115 may confirm the transaction, confirmation may be sent to the main module 140, which then may forward the confirmation to the merchant module 120. In some embodiments, the access module 115 may provide confirmation directly to the merchant module 120 via for example, but not limited to NFC, which may then inform the main module 140. Or, in some embodiments, both routes may occur concurrently.

In some embodiments consistent with the present disclosure, the transaction may comprise the first digital token and the details about the transaction, when forwarded to the main module 140 and/or the merchant module 120.

Continuing with the non-limiting example above, when the consuming party receives the approval for sharing and/or the first digital token, the consuming party may use the user interface provided by the access module 115 and/or a technology such as NFC to start the processing of the transaction. For example, the consuming party may open the user interface provided by the access module 115 on their device and place it against the merchant's device configured with the merchant module 120. The access module 115 may then use NFC to obtain transaction details from the merchant module 120 and forward it to the main module 140 with the first digital token.

8. Verifying the Details About the Transaction Do not Violate the Restriction Parameters Associated with the First Digital Token 240

In some embodiments consistent with the present disclosure, after receiving second request for a transaction, the main module 140 may check if the transaction request is compliant with the set of restrictions on the access to the asset specified by the provisioning party. In some embodiments, the main module 140 may check the set of restrictions using a third-party, such as, but not limited to Deepmemo, on the side of processing center of asset custodian.

In some embodiments consistent with the present disclosure, limits may be checked in the access module 115, optionally using a third-party such as, but not limited to Deepmemo, on the side of processing center of asset custodian.

In some embodiments consistent with the present disclosure, verifying the details about the transaction do not violate the restriction parameters associated with the first digital token may be performed entirely by the main module 140. Furthermore, the verification may comprise comparing the details about the transaction to the restriction parameters and verifying that the details about the transaction do not exceed or violate the restriction parameters. As a non-limiting example, the main module may check if the amount of the transaction does not exceed the amount shared, and the merchant is an approved merchant for sharing.

9. Receiving a Second Digital Token Associated with the Asset from an Asset Custodian 245

In some embodiments consistent with the present disclosure, the main module 140 may obtain the second digital token associated with the asset designated for sharing from the asset custodian such as, but not limited to Visa, via the asset access module 150. In some embodiments, at least one of request for the second digital token and the response with the aforementioned digital token, may be routed through a proxy 130.

In some embodiments consistent with the present disclosure, receiving the second digital token associated with the asset from the asset custodian may comprise sending the asset access information to the asset custodian and receiving the second digital token associated with the asset. Furthermore, in some embodiments, receiving the second digital token associated with the asset from the asset custodian may further comprise receiving the second digital token for specifying the asset to the asset custodian in order to process transactions with the asset designated for sharing. As a non-limiting example, the main module 140 may send the asset access information to the asset access module 150. In turn, the asset access module 150 may respond with the digital token that represents the asset. The main module 140 may then use the aforementioned digital token to request the asset access module 150 to process the transactions with the shared asset.

In some embodiments consistent with the present disclosure, the second digital token may be used by the main module 140 in order to make secure transactions without sending the sensitive asset data back and forth for every transaction. Furthermore, the second digital token may be used by the main module 140 in order to make transactions with an asset without having all the details about the asset. As a non-limiting example, the provisioning user may register the main module 140 as an authorized user of the asset with the asset custodian. In turn, the asset custodian may provide an API key to the main module 140. The main module may then use the API key in order to obtain a second digital token and request transactions for processing. Further yet, in some embodiments, the second digital token may be used to verify the identity of the authorized user of the asset. As a non-limiting example, the asset custodian may embed the main module's 140 digital signature within the digital token. In this way, the digital signature of the entity using the digital token must match the embedded digital signature within the digital token, preventing any other entity apart from the main module 140 from using the digital token, thereby preventing unauthorized users and transactions.

10. Sending a Third Request for the Transaction to the Asset Custodian for Processing 250

In some embodiments consistent with the present disclosure, after obtaining the second digital token from the asset custodian, and obtaining the details about the transaction along with the first digital token from the consuming party, the main module 140 may combine the details about the transaction and the second digital token, then send it to asset access module 150 such as, but not limited to, Visa, as a request for a transaction. The asset access module 150 may process the transaction and respond to the main module 140 with a result of the transaction. In some embodiments, at least one of request for a transaction and response with the result of the transaction, may be routed through a proxy 130. As a non-limiting example, the main module 140 may send the asset access module 150, such as Visa, a request to make a transaction. The request may comprise the second digital token representing the shared asset, such as Visa credit card, and the details about the transaction, such as merchant and amount. The asset access module 150, such as Visa, may then attempt to process the transaction and reply to the main module 140 with the result.

11. Receiving a Confirmation of a Processed Transaction from the Asset Custodian '55

In some embodiments consistent with the present disclosure, after the main module 140 sends a request for a transaction to the asset access module 150, the asset access module 150 may respond with the result of the transaction. In some embodiments, at least one of request for a transaction and response with the result of the transaction, may be routed through a proxy 130.

In some embodiments consistent with the present disclosure, the main module 140 may securely dispose of a second digital token, which in turn may prevent the same transaction from happening again and/or unauthorized access to the shared asset. The secure disposal may comprise, but not limited to, secure deletion as described by the Department Of Defense (DOD).

As a non-limiting example, the main module 140 may send the asset access module 150, such as Visa, a request to make a transaction. The request may comprise the second digital token representing the shared asset, such as Visa credit card, and the details about the transaction, such as merchant and amount. The asset access module 150, such as Visa, may then attempt to process the transaction and reply to the main module 140 with the result. After receiving a reply of a successful processing of the transaction from the asset access module 150, the main module 140 may securely dispose of the second digital token using DOD deletion.

12. Notifying a Merchant of the Processed Transaction '60

In some embodiments consistent with the present disclosure, after the main module 140 receives a confirmation of the processed transaction, from the asset access module 150, the main module 140 may notify the merchant by, for example, a notification on the merchant's device, optionally configured with the merchant module 120. In some embodiments consistent with the present disclosure, the main module 140 may send the notification to the merchant by routing the request through the proxy 130. The notification may comprise, but not limited to the following:

An Android/iOS/Windows/Linux system notification;
A text message/MMS;
An email;
An application notification; and
A phone call.

As a non-limiting example, a consuming party, such as a teenager, may attempt to make a transaction with a merchant, such as a supermarket, using an asset shared by the provisioning party, such as a parent. The consuming party may use initiate the transaction via NFC with the merchant. The request for the transaction may then be sent to the main module 140, which may verify that the transaction does not exceed limits placed on the shared asset by the provisioning party. After the verification, the main module 140 may send a request for the transaction to the asset access module 150, which may process the transaction and respond to the main module 140 with the result. The main module 140 may then send the result to the merchant, the consuming party, and the provisioning party in the form of a notification. The merchant may receive the notification on their device configured with the merchant module 120 in a form of an application notification. Alternatively, the merchant may receive an email or a text message with the result of the transaction, even on a device not configured with the merchant module 120.

13. Notifying the Consuming Party of the Processed Transaction 265

In some embodiments consistent with the present disclosure, after the main module 140 sends a notification to the merchant with the result of the transaction, via the merchant module 115, the main module 140 may notify the consuming party by, for example, a notification on the consuming party's device, optionally configured with the access module 115. In some embodiments consistent with the present disclosure, the main module 140 may send the notification to the consuming party by routing the request through the proxy 130. The notification may comprise, but not limited to the following:

An Android/iOS/Windows/Linux system notification;
A text message/MMS;
An email;
An application notification; and
A phone call.

In some embodiments consistent with the present disclosure, the access module 115 may securely dispose of the first digital token, which in turn may prevent the same transaction from happening again and/or unauthorized access to the shared asset. The secure disposal may comprise, but not limited to, secure deletion as described by the Department Of Defense (DOD).

As a non-limiting example, a consuming party, such as a teenager, may attempt to make a transaction with a merchant, such as a supermarket, using an asset shared by the provisioning party, such as a parent. The consuming party may use initiate the transaction via NFC with the merchant. The request for the transaction may then be sent to the main module 140, which may verify that the transaction does not exceed limits placed on the shared asset by the provisioning party. After the verification, the main module 140 may send a request for the transaction to the asset access module 150, which may process the transaction and respond to the main module 140 with the result. The main module 140 may then send the result to the merchant, the consuming party, and the provisioning party in the form of a notification. The consuming party may receive the notification on their device configured with the access module 115 in a form of an application notification, upon which the access module 115 may securely dispose of the first digital token using DOD deletion. Alternatively, the consuming party may receive an email or a text message with the result of the transaction, even on a device not configured with the access module 115.

14. Notifying the Provisioning Party of the Processed Transaction 270

In some embodiments consistent with the present disclosure, after the main module 140 sends a notification to the consuming party with the result of the transaction, via the access module 115, the main module 140 may notify the provisioning party by, for example, a notification on the provisioning party's device, optionally configured with the provisioning module 110. In some embodiments consistent with the present disclosure, the main module 140 may send the notification to the provisioning party by routing the request through the proxy 130. The notification may comprise, but not limited to the following:

An Android/iOS/Windows/Linux system notification;
A text message/MMS;
An email;
An application notification; and
A phone call.

As a non-limiting example, a consuming party, such as a teenager, may attempt to make a transaction with a merchant, such as a supermarket, using an asset shared by the provisioning party, such as a parent. The consuming party may use initiate the transaction via NFC with the merchant. The request for the transaction may then be sent to the main module 140, which may verify that the transaction does not exceed limits placed on the shared asset by the provisioning party. After the verification, the main module 140 may send a request for the transaction to the asset access module 150, which may process the transaction and respond to the main module 140 with the result. The main module 140 may then send the result to the merchant, the consuming party, and the provisioning party in the form of a notification. The provisioning party may receive the notification on their device configured with the provisioning module 110 in a form of an application notification. Alternatively, the provisioning party may receive an email or a text message with the result of the transaction, even on a device not configured with the provisioning module 110.

Technical Advantages

The method above may describe a way to share an asset securely with a third-party, such as a consuming party. The method provides an ability to set restrictions on the sharing, and to share access to the asset without sharing the actual asset. As a non-limiting example, the provisioning party, such as a parent, may share access to an asset, such as a credit card, with the consuming party, such as a teenager. Using the aforementioned method, the provisioning party may never actually share the physical asset, the credit card in this example, with the consuming user, preventing unauthorized use. Instead, the provisioning party may utilize the platform 100 to provide the sharing securely. Furthermore, the provisioning party may set restrictions on the sharing, such as the amount of funds to share, as well as when and where the funds may be shared. Historically, when a parent shared an asset, such as a credit card, with a teenager, the parent had to provide the actual credit card to the teenager. This allowed the teenager to make unauthorized transactions without the parent's knowledge, until the bill came. The present disclosure addresses these, as well as other, disadvantages of sharing a physical asset or transferring funds to different asset, which may come with substantial fees as well as at least some of the disadvantages of sharing the physical asset.

B. Method of Using a Shared Asset With Merchant 300

Consistent with embodiments of the present disclosure, a method may be performed by at least one of the aforementioned modules. Although each module has been disclosed to perform a specific function, it should be understood that such module is conceptualized for illustrative purposes only, and that the disclosed functions may be shared by one or more modules, regardless of the module name. The method may be embodied as, for example, but not limited to, computer instructions, which when executed, perform the method. The method may comprise the following stages:

Merchant generates QR code to accept payment via merchant module 311

Consuming party scans QR code via provisioning module 312

Access module creates request to provisioning module for sharing access via selecting provisioning party details 313

Main module checks if provisioning party registered asset with an intermediary account provider 314

Provisioning party receives request for confirmation via provisioning module 315

Provisioning party confirms sharing access via provisioning module 316

Main module shares access through a global ID 317

Consuming party receives notification of sharing access confirmation via access module 318

Consuming party confirms payment via access module 319

Main module obtains provisioning party's callID 320

Main module obtains provisioning party's asset details by sending callID to asset access module 321

Main module sends transaction request to asset access module with provisioning party's asset details 322

Consuming party receives notification of payment via access module 323

Merchant receives notification of payment via merchant module 324

Provisioning party receives notification of payment via provisioning module 32

Figure 3A:
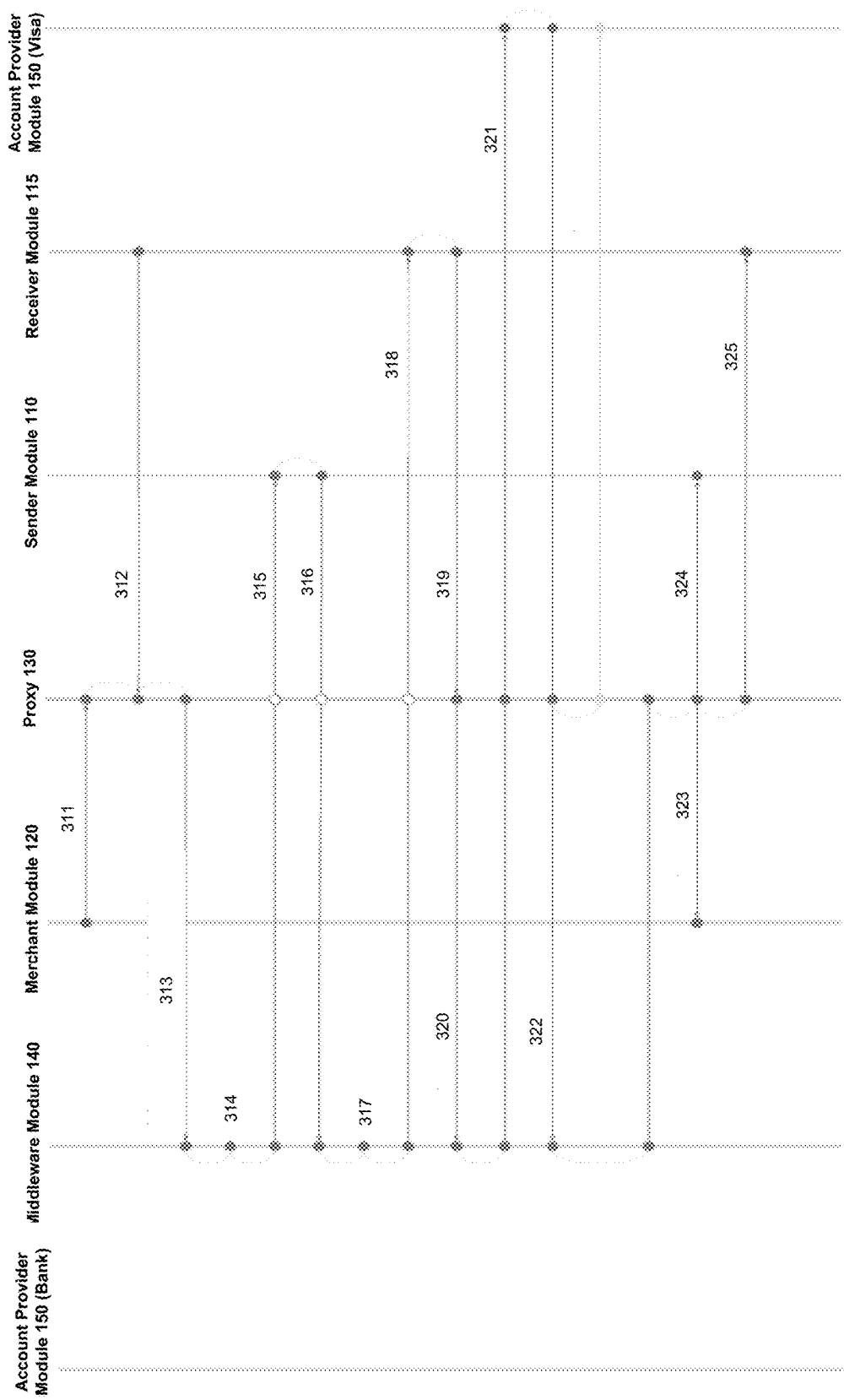
FIGS. 3A and 3B illustrate a representative method embodiment including general share process that may be implemented by merchants and asset custodians, as well as involving an optional proxy server to secure and/or route all communication traffic.
Figure 3B:
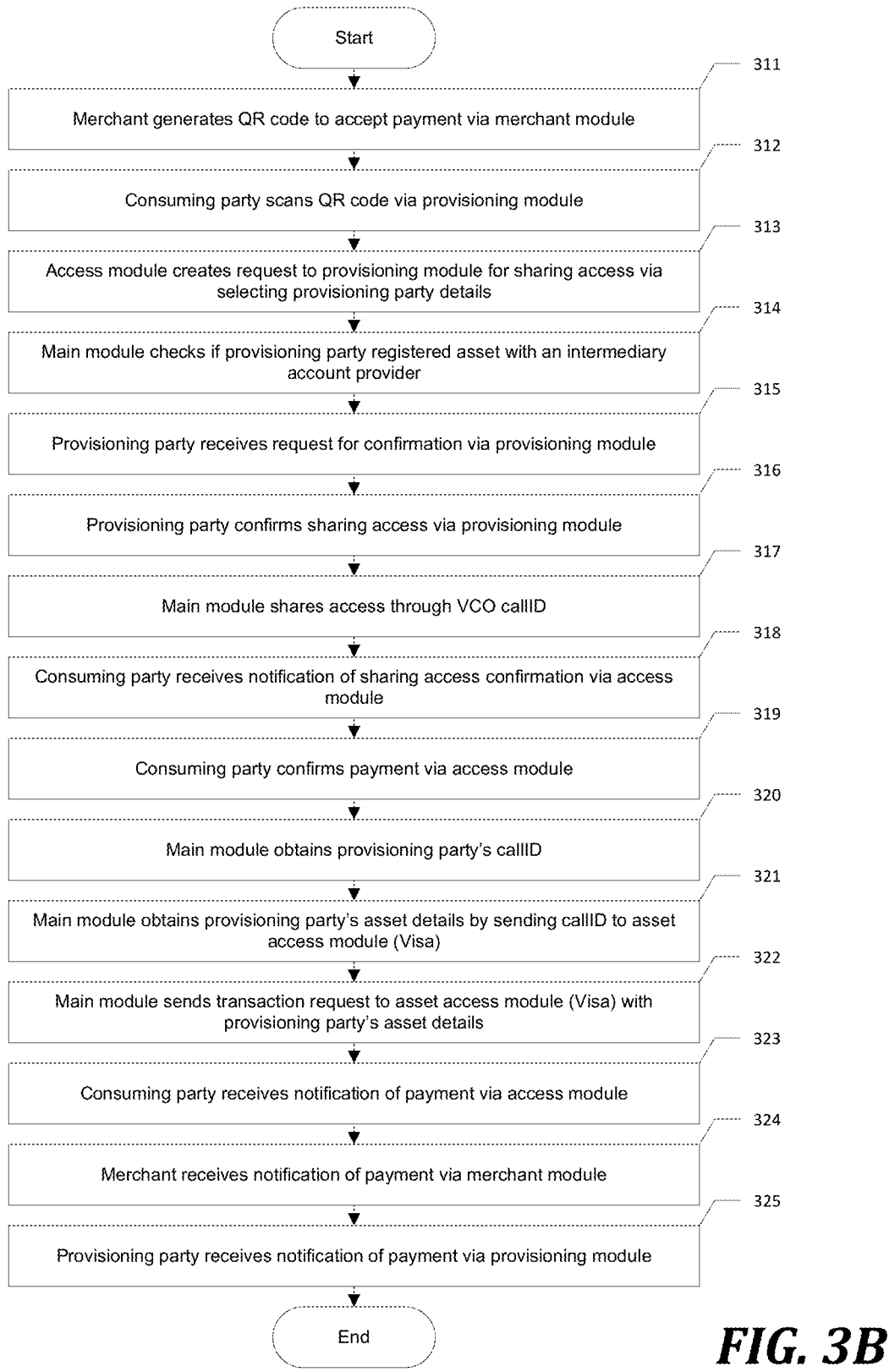

FIGS. 3A and 3B show representative method embodiment diagram for according to at least one embodiment of the present disclosure, including general sharing process that may be implemented by asset custodians such as, but not limited to, banks and financial institutions that have already integrated tokenization module 160 such as, but not limited to, VTS, MDES or other similar service and get digital tokens of assets. The FIGS. 3A and 3B further show an implementation of an optional proxy server as part of the proxy/internet module 120.

1. Merchant Generates QR Code to Accept Payment Via Merchant Module 311

In some embodiments consistent with the present disclosure, a merchant may configure a device such as a computing device 900 with a merchant module 120 to facilitate digital transactions. When a customer such as, but not limited to a consuming party, attempts to make a transaction with the merchant, the merchant module 120 may generate a barcode such as, but not limited to a QR code to be scanned by the customer's device configured with the access module 115.

In some embodiments, the merchant may use a single barcode for a plurality of transactions. In such embodiments, the code may be printed once and displayed to the public. Furthermore, in such embodiments, the merchant module 120 may not be required to generate a code for every transaction. In some embodiments, may transfer the code via a proxy 130 for added security in cases where the merchant module 120 may be located remotely.

For a non-limiting example, a consuming party, such as a teenager, may be shopping and ready to checkout at a merchant location, such as a store. The teenager may wish for a provisioning party, such as his/her parent, to pay for the purchase. The parent may not be in the vicinity of the teenager and/or the teenager may not have access to the parent's payment. The store may generate a QR code for the teenager to scan, in order to have the parent pay for the purchase.

2. Consuming Party Scans QR Code Via Access Module 312

In some embodiments consistent with the present disclosure, the consuming party/customer who may wish to make a digital transaction with a merchant, may scan the provided code such as, but not limited to a QR code via a device configured with an access module 115. Scanning the code may initiate the transaction employing the platform of the present disclosure.

Continuing with the aforementioned example, the teenager may scan the QR code provided by the merchant in order to initiate a payment sharing request.

3. Access Module Creates Request to Provisioning Module for Sharing Access Via Selecting Provisioning Party Details 313

In some embodiments consistent with the present disclosure, the consuming party may request a provisioning party to share an asset for use with the initiated transaction. The consuming party may utilize a device configured with the access module 115 to specify the provisioning party who is to receive the request. The consuming party may utilize a user interface provided by the access module 115 to specify at least one identifying parameter of the provisioning party such as, but not limited to phone number and name.

In some embodiments consistent with the present disclosure, the consuming party may provide additional details to be sent along with the request. In some embodiments, the details may be conveyed to the provisioning party via main module 140. The additional details may comprise, but not limited to amount the consuming party wishes to be shared and the merchant the consuming party wishes to spend the shared funds with. In some embodiments, the access module 115 may send some information about the transaction along with the sharing request. The information about the transaction may comprise, but not limited to the total amount of the transaction and the merchant with which the transaction is being made. In some embodiments, the information about the transaction may be obtained from the merchant module 120. In some embodiments, the information may be embedded in the code scanned by the consuming party.

In some embodiments consistent with the present disclosure, once the consuming party provides the information, the user interface provided by the access module 115 may ask the consuming party to verify the provided information. Once verified, the consuming party confirms the information is correct and the sharing request is sent to the provisioning party. In some embodiments, the consuming party may be able to send the request without confirming the information.

In some embodiments consistent with the present disclosure, a proxy 130 may mediate all communication between the modules.

Continuing with the aforementioned example, after the teenager scans the QR code, a specialized app may launch. Upon launching, the app may present a UI where the teenager may press a button "request sharing access" and then specify a provisioning user, such as a parent. The teenager may then pick the parent from the contact list on the device and initiate the sharing request by, for example, clicking a button "send request".

4. Main Module Checks if Provisioning Party Registered Asset with an Intermediary Account Provider 314

When the consuming party sends the request, the access module 115 forwards the request to the main module 140. In some embodiments, the request may be forwarded by the proxy 130. In some embodiments, the request may contain at least one of, but not limited to the following: provisioning party identification, asset designated for sharing, amount of funds designated for sharing, merchant to spend shared funds with, and other information about at least one transaction the consuming party wishes to make. When the main module 140 receives the request, it checks if the provisioning party's asset has been configured with a payment platform and/or asset custodian and/or asset access module 150 compatible with the merchant in question, such as, but not limited to PayPal and Visa checkout platform. If the provisioning party has not configured the asset on the payment platform compatible with the merchant, the main module 140 may send the provisioning party a notification to configure the asset with the aforementioned payment platform via the provisioning module 110. Provisioning of assets is disclosed with reference to other methods herein. In other words, a provisioning party may pre-designate certain accounts for sharing.

Once the main module 140 verifies that the asset for sharing is configured with a payment platform compatible with the merchant, it may forward the sharing request to the provisioning party for confirmation.

Continuing with the aforementioned example, after the teenager initiates a sharing request, the platform 100 may check if the parent's payment that is on file is registered with the payment platform compatible with the store. The store may be compatible with the Visa Checkout payment platform, which means the platform 100 may check if the parent has a predefined payment saved that is registered with Visa Checkout. The parent may have a Visa credit card saved on the platform, where the parent may have registered the card with Visa Checkout during the last sharing request, which will fulfill the requirements.

5. Provisioning Party Receives Request for Confirmation Via Provisioning Module 315

Once the main module 140 may forward the sharing request to the provisioning party, the provisioning party may receive a notification on a device configured with the provisioning module 110. The notification may comprise, but not limited to Android/iOS/Windows/Linux system notification, text message/MMS, email, application notification, and a phone call.

In some embodiments consistent with the present disclosure, the main module 140 may forward the request to the provisioning party by routing the request through the proxy 130.

Continuing with the aforementioned example, after the teenager initiates a sharing request, the parent may get a notification of the request.

6. Provisioning Party Confirms Sharing Access Via Provisioning Module 316

In some embodiments consistent with the present disclosure, after the provisioning party receives the notification, the provisioning party may review the sharing request and optionally modify the sharing parameters, such as, but not limited to the amount of funds being shared. In some embodiments, after reviewing/modifying the sharing parameters, the provisioning party may confirm or deny the sharing request. In some embodiments, the provisioning user may preapprove sharing requests based on a plurality of parameters, such as, but not limited to, the consuming party and the merchant. In such embodiments, the provisioning party may receive a notification of the sharing request with the associated details but may not have an option to modify/decline the request as it may have been automatically approved.

Upon confirming the sharing request, the provisioning module 110 may send the confirmation to the main module 140. In some embodiments, the confirmation may be routed through the proxy 130.

Continuing with the aforementioned example, after receiving a notification of the request for sharing, the parent may review the items purchased, the merchant, and the cost, then accept the request for sharing.

7. Main Module Shares Access Through a Global ID 317

In some embodiments consistent with the present disclosure, the main module 140 may provide the sharing of access by registering the provisioning party's global ID such as, but not limited to, provisioning party's device ID (such as IMEI or MAC address), digital token representing the provisioning party, and/or a digital certificate, with Virtual Central Office (VCO). In some embodiments, the main module 140 may obtain the global ID by generating a digital token associated with the provisioning party and/or shared asset and/or sharing parameters. In this way, secure access to the shared asset may be gained without transferring sensitive information such as, but not limited to financial and personally identifiable information.

8. Consuming Party Receives Notification of Sharing Access Confirmation Via Access Module 318

Next, the main module 140 may send the consuming party a notification of shared access via the access module 115. In some embodiments consistent with the present disclosure, the main module 140 may send the notification to the consuming party by routing the request through the proxy 130. The notification may comprise, but not be limited to, Android/iOS/Windows/Linux system notification, text message/MMS, email, application notification, and a phone call.

Continuing with the aforementioned example, the teenager may receive a notification on their device notifying them that the parent approved the request for sharing.

9. Consuming Party Confirms Payment Via Access Module 319

After the consuming party receives the notification, they may approve or deny the payment to the merchant. Upon approving the payment to the merchant, the access module 115 may send the approval to the main module 140. In some embodiments, the approval may be routed through the proxy 130.

In some embodiments consistent with the present disclosure, the consuming party may, the consuming party may approve or deny the payment to the merchant through a UI provided by the access module 115. In some embodiments, the access module 115 may be in operative communication with the merchant module 120 (such as POS terminal) via for example, but not limited to, NFC, information obtained from scanned barcode, and/or main module 140. The access module 115 may confirm the transaction, confirmation may be sent to the main module 140, which then may forward the confirmation to the merchant module 120. In some embodiments, the access module 115 may provide confirmation directly to the merchant module 120 via for example, but not limited to NFC, which may then inform the main module 140. Or, in some embodiments, both routes may occur concurrently.

Continuing with the aforementioned example, after the teenager receives a notification, they may be presented with a UI where the teenager may press the "Confirm Payment" button.

10. Main Module Obtains Provisioning Party'S CallId 320

In some embodiments consistent with the present disclosure, after receiving the approval for payment, the main module 140 may obtain/generate provisioning party's callID. In some embodiments, the main module 140 may obtain the callID from local and/or cloud storage. In some embodiments, the main module 140 may obtain the callID from provisioning module 110 and/or tokenization module 160 and/or asset access module 150, potentially by routing the network traffic through the proxy 130. In some embodiments, the main module 140 may obtain the callID by generating and/or obtaining a digital token. For example, the main module 140 may obtain a digital token from the asset access module 150 by routing the network traffic through a proxy 130. In some embodiments, the callID may be obtained from the payment platform, such as, but not limited to VCO.

In some embodiments consistent with the present disclosure, the callID may be used to identify the payment asset with the asset access module 150 by an authorized party, such as the main module 140. By using callID, the main module 140 may perform transactions on the behalf of the provisioning party, without prior input of sensitive financial information or personally identifiable information.

11. Main Module Obtains Provisioning Party's Asset Details by Sending callID to Asset Access Module 321

In some embodiments consistent with the present disclosure, the main module 140 may obtain details about the asset such as, but not limited to a credit card, from the asset access module 150 such as, but not limited to Visa and Visa Checkout. The details may comprise, but not limited to card number, zip code and Card Verification Value (CVV). The main module 140 may obtain the details by sending the asset access module 150 the callID associated with the provisioning party and/or the provisioning party's asset. In turn, the asset access module 150 may respond with the details about asset. In some embodiments, at least one of request for details and response with the details, may be routed through a proxy 130.

12. Main Module Sends Transaction Request to Asset Access Module with Provisioning Party's Asset Details 322

After obtaining the details about the shared asset, the main module 140 may combine the details about the shared asset and information about the transaction, then send it to asset access module 150 such as, but not limited to, Visa, as a request for a transaction. The asset access module 150 may process the transaction and respond to the main module 140 with a result of the transaction. In some embodiments, at least one of request for a transaction and response with the result of the transaction, may be routed through a proxy 130. As a non-limiting example, the main module 140 may send the asset access module 150, such as Visa, a request to make a transaction. The request may comprise a digital token representing the shared asset, such as Visa credit card, and transaction information, such as merchant and amount. The asset access module 150, such as Visa, may then attempt to process the transaction and reply to the main module 140 with the result.

13. Consuming Party Receives Notification of Payment Via Access Module 323

After the main module 140 receives the result of the transaction from the asset access module 150, the main module 140 may notify the consuming party by, for example, a notification on the consuming party's device, optionally configured with the access module 115. In some embodiments consistent with the present disclosure, the main module 140 may send the notification to the consuming party by routing the request through the proxy 130. The notification may comprise, but not limited to Android/iOS/Windows/Linux system notification, text message/MMS, email, application notification, and a phone call.

Continuing with the aforementioned example, after a successful payment, the teenager may receive a notification stating the payment was successful.

14. Merchant Receives Notification of Payment Via Merchant Module 324

After the main module 140 receives the result of the transaction from the asset access module 150, the main module 140 may notify the merchant by, for example, a notification on the merchant's computing device, optionally configured with the merchant module 120. In some embodiments consistent with the present disclosure, the main module 140 may send the notification to the merchant by routing the request through the proxy 130. The notification may comprise, but not limited to Android/iOS/Windows/Linux system notification, text message/MMS, email, application notification, and a phone call.

Continuing with the aforementioned example, after a successful payment, the store may receive a notification stating the payment was successful.

15. Provisioning Party Receives Notification of Payment Via Provisioning Module 325

After the main module 140 receives the result of the transaction from the asset access module 150, the main module 140 may notify the provisioning party by, for example, a notification on the provisioning party's device, optionally configured with the provisioning module 110. In some embodiments consistent with the present disclosure, the main module 140 may send the notification to the provisioning party by routing the request through the proxy 130. The notification may comprise, but not limited to Android/iOS/Windows/Linux system notification, text message/MMS, email, application notification, and a phone call.

In some embodiments consistent with the present disclosure, the main module 140 may securely dispose of callID, which in turn may prevent the same transaction from happening again and/or unauthorized access to the shared asset. The secure disposal may comprise, but not limited to, secure deletion as described by the Department Of Defense (DOD). In some embodiments, the main module 140 may retain the global ID and/or callID for future transactions between the same parties and/or using same payment method.

Continuing with the aforementioned example, after a successful payment, the parent may receive a notification stating the payment was successful.

The aforementioned method 300 may describe sharing a payment by providing the payment information directly to a merchant. The method 300 may provide a capability to quickly and/or flexibly change business logic of the solution. The method 300 may also provide flexible management of limits for a plurality of transactions. The aforementioned flexibility may make method 300 a template solution that does not require hardcoding from scratch. Furthermore, the method 300 may integrate with a plurality of APIs, such as, but not limited to, a bank's API and payment system API (e.g., Visa), providing a versatile payment sharing solution that may be used at a plurality of merchants.

C. Method of Sharing Using a Bank as an Asset Custodian 400

Consistent with embodiments of the present disclosure, a method may be performed by at least one of the aforementioned modules. The method may be embodied as, for example, but not limited to, computer instructions, which when executed, perform the method. The method may comprise the following stages:

Provisioning module shares asset request (PANid, limits) to main module 411

Main module checks fraud, rules and limits 412

Access module receives a notification to confirm sharing of asset 413

Consuming party does not confirm sharing of asset 413.1

Consuming party confirms sharing of asset 413.2

Main module stores bonding data: provisioning party's PANid, limits, provisioning party, consuming party 414

Provisioning module receives notification of sharing asset 415

Main module requests token of asset from asset access module (Bank) 416

Asset access module (Bank) responds to main module with asset token 417

Main module sends token and limits to access module for storage 418

Access module then main module send confirmation of storing token 419

Main module requests asset access module (Bank) to set limits on its side 420

Access module sends pay request to main module 431

Main module checks limits online and limits stored by access module 432

Access module sends payment to merchant module (POS terminal) via NFC 433

Merchant module (POS Terminal) responds to access module with result of payment 434

Asset access module (Bank) sends main module fact of transaction 435

Main module updates limits 436

Access module sends get cash request to main module 451

Main module checks limits online and limits stored by access module 452

Access module sends get cash request to merchant module (ATM) via NFC 453

Consuming party provides merchant module (ATM) a PIN 454

Merchant module (ATM) responds to access module with result of payment 455

Asset access module (Bank) sends main module fact of transaction 456

Main module updates limits 457

Figure 4B:
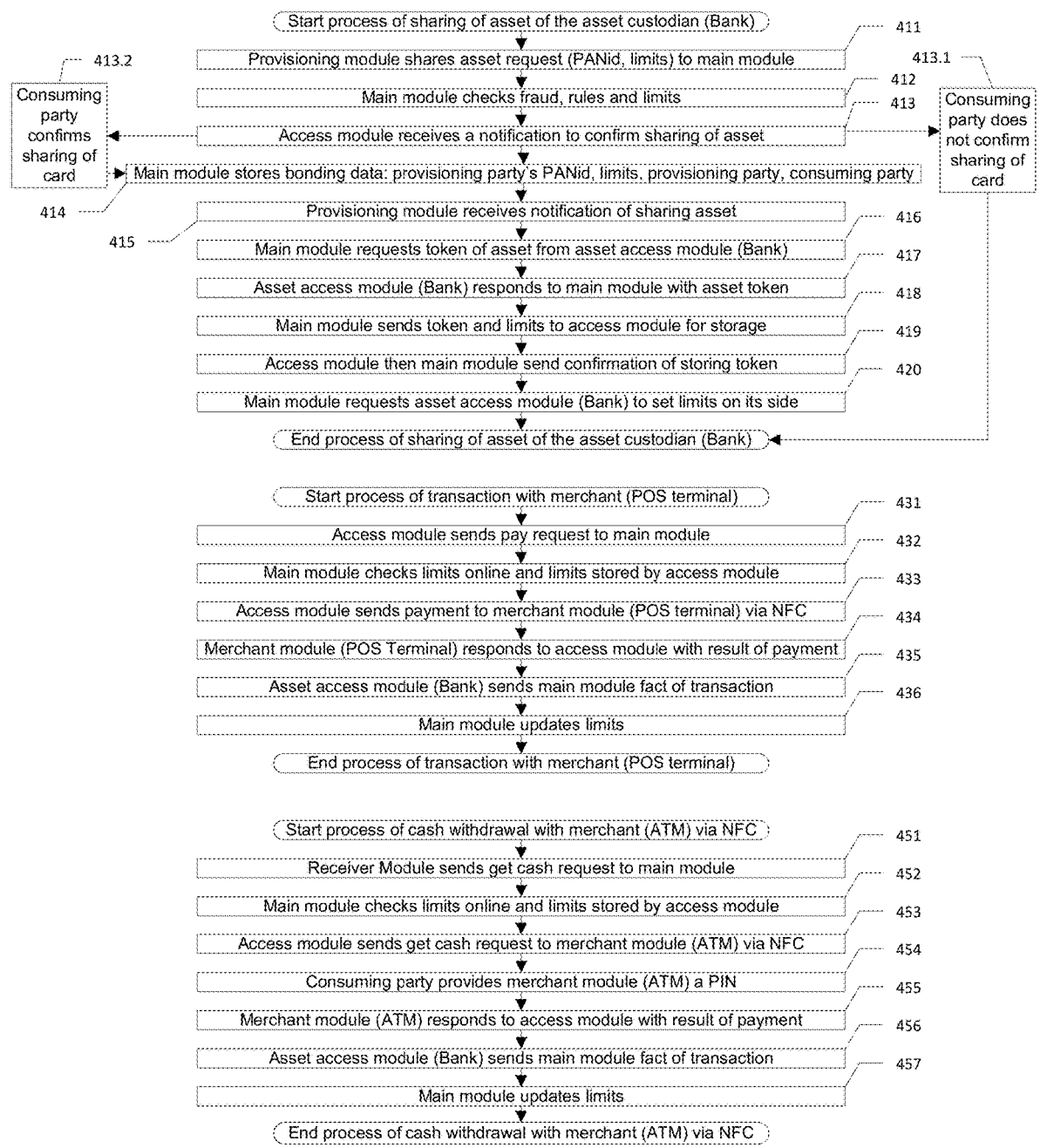

FIGS. 4A and 4B show representative method embodiment diagram for according to at least one embodiment of the present disclosure, including general sharing process that may be implemented by asset custodians such as, but not limited to banks and financial institutions that have already integrated tokenization module 160 such as, but not limited to VTS, MDES or other similar service and get digital tokens of assets.

1. Provisioning Module Shares Asset Request (PANid, Limits) to Main Module 411

In the Provisioning party software or any other messenger or software (hereinafter—"Provisioning party software" or "Provisioning party" or provisioning module 110) may be integrated in order to provide notifications to the provisioning party and to the consuming party in the process of sharing access to a payment or non-payment asset and/or similar financial account, as well as end-to-end integration with main module 140 as shown in FIGS. 4A and 4B.

Usage of provisioning module 110 within the process of sharing or providing access to an asset is optional, especially for third-party wallet providers such as, but not limited to Apple Pay, Google Wallet, Android Pay, Samsung Pay, that receive digital token of an asset through integration with tokenization module 140 such as, but not limited to VTS, MDES and/or issuing bank and/or other similar service.

The provisioning party using a device such as, but not limited to computing device 900, may add the information about the asset, access to which will be shared with another individual or legal entity. If the information about an asset has already been added to the device, provisioning party selects the asset, access to which will be shared with another individual or legal entity.

Provisioning party then may set at least one of the following non-limiting sharing constraints for the asset:

the amount of funds to which access may be shared together with the access to the asset (provisioning party can set a certain amount to which access may be shared or give access to the entire amount of available funds on the account);

the type of transaction using asset, access to which may be shared (provisioning party can set the following types of use of the amounts of funds to which access may be shared: withdrawal of money from ATM, payment via POS terminal, e-commerce transactions, money transfers, fund disbursements and/or other type of transactions);

the number of transactions (provisioning party may set the number of transactions; which consuming party may be authorized to make using shared access to the provisioning party's asset); and the term of the access to the asset (provisioning party can set the period of time during which the consuming party may have access to the asset or to share access to the asset on a regular basis).

Mentioned above sharing constraints may be optional. If provisioning party does not set at least one of the mentioned limits, those limits may be set by default. Provisioning party may set no limits; and no limits may be set by default. Furthermore, provisioning party may disable at least one limit.

Next, the provisioning party of the access to the asset may choose and/or specify the consuming party (an individual or legal entity who will be granted the access to the asset of the provisioning party) by entering at least one identifying parameter (cell phone number, email, account in online social media and/or social networking service [e.g., Facebook], IMEI, MAC address, or any other global ID) of the consuming party of the shared access to the asset.

The at least one identifying parameter such as, but not limited to cell phone number, email, account in online social media and/or social networking service (e.g., Facebook), IMEI, MAC address, or any other global ID may be a special identifier of the consuming party of the shared access to the provisioning party's asset. Optionally, the provisioning party may choose a plurality of identifying parameters. In some embodiments, once the provisioning party chooses at least one identifying parameter, the provisioning module 110 may fill in the remaining parameters for verification.

Following the initiation of sharing the access to the provisioning party's asset, information regarding such request is transferred from the provisioning module 110 to the main module 140.

2. Main Module Checks Fraud, Rules and Limits 412

The information regarding sharing access is transmitted to the cloud expert system e.g., Deepmemo, Deepmemo system, or other relevant cloud expert system (hereinafter—"Deepmemo") in order to control fraud and/or limits as shown in FIGS. 4A and 4B. Main module checks fraud, rules and limits 412.

Integration with Deepmemo is optional, also Deepmemo may be replaced with another applicable software/hardware/service.

Further yet, in some embodiments of the present disclosure, successful passing of fraud and limits, Deepmemo system may confirm possibility of access sharing and may send a response with corresponding information to the main module 140.

In some embodiments consistent with the present disclosure, a system such as, but not limited to Deepmemo, may be fully and/or partially integrated with the main module 140.

3. Access Module Receives a Notification to Confirm Sharing of Asset 413

Main module 140 may send the consuming party a notification of the shared access to the asset.

Upon notification receipt, the consuming party may confirm or deny the shared access to the asset, as seen in FIGS.

4A and 4B Consuming party confirms sharing of asset and 413.2. Consuming party doesn't confirm sharing of asset 413.1.

4. Main Module Stores Bonding Data: Provisioning Party's PANid, Limits, Provisioning Party, Consuming Party 414

Upon the confirmation from the consuming party of the shared access to the asset, notification may be sent from access module 115 to the main module 140.

In some embodiments consistent with the present disclosure, the identifier of the provisioning party's shared asset such as, but not limited to Primary Account Number (PAN it PANid) and optionally limits and/or consuming party information and/or provisioning party information may be sent in a request from the main module 140 to Deepmemo.

Furthermore, the main module 140 may store bonding data such as, but not limited to provisioning party's PANid, limits, provisioning party, consuming party, etc.

5. Provisioning Module Receives Notification of Sharing Asset 415

The provisioning party may receive a confirmation of acceptance of the shared access to the asset by the consuming party via the provisioning module 110.

6. Main Module Requests Token of Asset from Asset Access Module (Bank) 416

Main module 140 may transmit information about the provisioning party's asset to the asset access module 150 (in this case a bank or financial institution) which has integrated tokenization module 160 such as VTS/MDES and/or other tokenization services.

7. Asset Access Module (Bank) Responds to Main Module with Asset Token 417

After the request for token provision takes place, namely when the digital token of provisioning party's asset may be transmitted to the tokenization module 160 such as, but not limited to VTS/MDES or other similar services for the confirmation, the tokenization module 160 (or the asset access module 150 with tokenization module 160 integrated) may respond to the main module 140 with the aforementioned digital token.

8. Main Module Sends Token and Limits to Access Module for Storage 418

Upon receipt of the digital token of the provisioning party's asset, information about such digital token of the provisioning party's asset and limits (optionally) may be transmitted to the access module 115, as seen in FIGS. 4A and 4B—Main module sends token and limits to access module for storage 418.

9. Access Module Then Main Module Send Confirmation of Storing Token 419

After saving the information about the digital token and limits (optionally), confirmation of receipt of the provided digital token (FIGS. 4A and 4B Access module then main module send confirmation of storing token 419) may be transferred from the access module 115 to the main module 140 then to the asset access module 150 (bank's or financial institution's service), that may receive digital token of asset through integration with the tokenization module 160 such as, but not limited to VTS, MDES and/or issuing bank and/or other similar service.

The access to the asset may now become available to the consuming party.

10. Main Module Requests Asset Access Module (Bank) to Set Limits on Its Side 420

Further yet, in some embodiments of the present disclosure, information about the limits from the main module 140 may be transferred to processing center of the asset access module 150 such as, but not limited to the bank (e.g., bank's processing host, etc.) (FIGS. 4A and 4B. Main module requests asset access module (Bank) to set limits on its side 420).

Throughout the process described above, access to the provisioning party's asset can be canceled by the provisioning party.

The process of sharing of an access to asset may be used with any other services related to the provision of digital tokens to an asset.

Continuing with reference to FIGS. 4A and 4B, in some embodiments consistent with the present disclosure, in order to use shared access to the asset for making transactions with a merchant such as POS terminal:

11. Access Module Sends Pay Request to Main Module 431

After receiving of the access to the asset, the consuming party may optionally send at least one pay request to the main module 140 via access module 115.

After sending the at least one pay request, the consuming party may optionally select shared/account to which access is provided by the provisioning party. Then consuming party may optionally bring a smartphone or another network-accessible device (such as smartphone, tablet, smartwatch, laptop, or another computing device 900) to a computing device 9 configured with a merchant module 120, such as an NFC enabled POS terminal. The NFC enabled POS terminal may read the digital token of the provisioning party's asset and receive payment data through NFC channel of data transmission. If either consuming party's or merchant's computing device 900 does not support NFC technology, the consuming party may make transactions using QR code or any other universal platform compatible with a computing device 900.

12. Main Module Checks Limits Online and Limits Stored by Access Module 432

After receiving at least one pay request, the main module 140 may check if the at least one pay request is compliant with the set of restrictions on the access to the asset specified by the provisioning party. In some embodiments, the main module 140 may check the set of restrictions using Deepmemo (optionally), on the side of processing center of asset custodian.

In some embodiments consistent with the present disclosure, limits may be checked in the access module 115, using Deepmemo (optionally), on the side of processing center of asset custodian.

13. Access Module Sends Payment to Merchant Module (POS Terminal) Via NFC 433

In some embodiments consistent with the present disclosure, in order to use shared access to the asset for making payments, the consuming party may select respective payment type; then, consuming party may need to activate network-accessible device configured with the access module 115 (such as smartphone, tablet, smartwatch, laptop, or another computing device 900), and to bring smartphone or another network-accessible device to NFC enabled POS terminal (optionally); then, the consuming party may use proximity payment technology (e.g., MasterCard Paypass/Visa PayWave transaction using Visa Token Service, in case of Visa and/or MasterCard Cloud based payment, in case of MasterCard, etc.) to initiate a payment. Payment may get initiated when the access module 115 sends a payment to the merchant module 120 via NFC and/or proximity payment technology. If either consuming party's or merchant's device does not support NFC technology, the consuming party may make transactions using QR code or any other universal platform compatible with a computing device 900.

14. Merchant Module Responds to Access Module with Result of Payment 434

After successful or unsuccessful transaction, a computing device configured with the merchant module 120 such as POS terminal may display information about the transaction. In case of successful transaction, funds may be debited from the provisioning party's asset. For payment assets and/or similar financial accounts, a flow of authorization and debiting funds may take place, for example, using a standard scheme—via bank-acquirer, payment system, and issuing bank of the asset access to which has been shared with the consuming party.

15. Asset Access Module (Bank) Sends Main Module Fact of Transaction 435

In some embodiments consistent with the present disclosure, after a successful transaction, the account provider associated with the shared asset may send information about the transaction to main module 140.

16. Main Module Updates Limits 436

In some embodiments consistent with the present disclosure, after a successful transaction, the main module 140 may further transfer information to Deepmemo for a plurality of purposes, such as, but not limited to synchronization of limits. In some embodiments, the main module 140 may update parameters for the sharing of access, such as, but not limited to limits, locally.

Continuing with reference to FIGS. 4A and 4B, in some embodiments consistent with the present disclosure, in order to use shared access to the asset for cash withdrawal through ATM:

17. Access Module Sends Get Cash Request to Main Module 451

After receiving of the access to the asset, the consuming party may send at least one get cash request to the main module 140 via access module 115.

After at least one get cash request, the consuming party may bring a network-accessible device to NFC enabled ATM. The NFC enabled ATM (optionally) may read the token of the provisioning party's asset through NFC channel of data transmission. If either consuming party's device or ATM does not support NFC technology, the consuming party may make cash withdrawal using QR code or any other universal platform compatible with a computing device 900.

18. Main Module Checks Limits Online and Limits Stored by Access Module 452

After receiving at least one get cash request, the main module 140 may check if the at least one get cash request is compliant with the set of restrictions on the access to the asset specified by the provisioning party. In some embodiments, the main module 140 may check the set of restrictions using Deepmemo (optionally), on the side of processing center of the asset custodian.

In some embodiments consistent with the present disclosure, limits may be checked in the access module 115, using Deepmemo (optionally), on the side of processing center of card issuing bank.

19. Access Module Sends Get Cash Request to Merchant Module (ATM) Via NFC 453

In some embodiments consistent with the present disclosure, in order to use shared access to the asset for cash withdrawal through ATM, consuming party may select respective payment type; then, the consuming party may activate the network-accessible device configured with the access module 115 (such as smartphone, tablet, smartwatch, laptop, or another computing device 900), and bring the network-accessible device configured with the access module 115 to NFC enabled ATM (optionally); then, the consuming party may use proximity payment technology (e.g., MasterCard Paypass/Visa PayWave transaction using Visa Token Service, in case of Visa and/or MasterCard Cloud based payment, in case of MasterCard, etc.) to obtain cash. Cash may be obtained when the access module 115 sends a get cash request to the merchant module 120 (such as ATM) via NFC and/or proximity payment technology. If either consuming party's or merchant's device does not support NFC technology, the consuming party may make transactions using QR code or any other universal platform compatible with a computing device 900.

20. Consuming Party Provides Merchant Module (ATM) a PIN 454

In some embodiments consistent with the present disclosure, after the merchant module 120 (such as ATM) receives at least one get cash request, the merchant module 120 may prompt the consuming party for a PIN. The get cash request may continue to be processed after a successful PIN entry by the consuming party. In some embodiments, the access module 115 may send the PIN and/or other authentication information over NFC along with the at least one get cash request.

21. Merchant Module (ATM) Responds to Access Module with Result of Payment 455

In some embodiments consistent with the present disclosure, after successful or unsuccessful transaction, a computing device configured with the merchant module 120 such as ATM may display information about the transaction. In case of successful transaction, funds may be debited from the provisioning party's asset. For some assets/accounts, a flow of authorization and debiting funds may take place, for example, using a standard scheme—via bank-acquirer, payment system, and issuing bank of the asset access to which has been shared with the consuming party.

22. Asset Access Module (Bank) Sends Main Module Fact of Transaction 456

In some embodiments consistent with the present disclosure, after a successful transaction, the asset custodian associated with the shared asset may send information about the transaction to main module 140.

23. Main Module Updates Limits 457

In some embodiments consistent with the present disclosure, after a successful transaction, the main module 140 may further transfer information to Deepmemo for a plurality of purposes, such as, but not limited to synchronization of limits. In some embodiments, the main module 140 may update parameters for the sharing of access, such as, but not limited to limits, locally.

D. Method of Sharing Using a Bank as an Asset Custodian and Using Tokenization Module 500

Consistent with embodiments of the present disclosure, a method may be performed by at least one of the aforementioned modules. The method may be embodied as, for example, but not limited to, computer instructions, which when executed, perform the method. The method may comprise the following stages:

Provisioning module shares asset request (PANid, limits) to main module 511

Main module checks fraud, rules and limits 512

Access module receives a notification to confirm sharing of asset 513

Consuming party does not confirm sharing of asset 513.1

Consuming party confirms sharing of asset 513.2

Main module stores bonding data: provisioning party's PANid, limits, provisioning party, consuming party 514

Provisioning module receives notification of sharing asset 515

Main module initiates device request—generate cert key 516

Main module enrolls device using tokenization module (VTS/MDES) 517

Main module requests to enroll PAN from tokenization module (VTS/MDES) 518

Main module enrolls PAN using tokenization module (VTS/MDES) 519

Main module provisions token using tokenization module (VTS/MDES) 520

Main module sends token and limits to access module for storage 521

Main module sends confirmation of storing token to tokenization module 522

Main module requests asset access module (Bank) to set limits on its side 523

Access module sends pay request to main module 531

Main module checks limits online and limits stored by access module 532

Access module sends payment to merchant module (POS terminal) via NFC 533

Merchant module (POS Terminal) responds to access module with result of payment 534

Asset access module (Bank) sends main module fact of transaction 535

Main module updates limits 536

Access module sends get cash request to main module 551

Main module checks limits online and limits stored by access module 552

Access module sends get cash request to merchant module (ATM) via NFC 553

Consuming party provides merchant module (ATM) a PIN 554

Merchant module (ATM) responds to access module with result of payment 555

Asset access module (Bank) sends main module fact of transaction 556

Main module updates limits 557

Figure 5A:
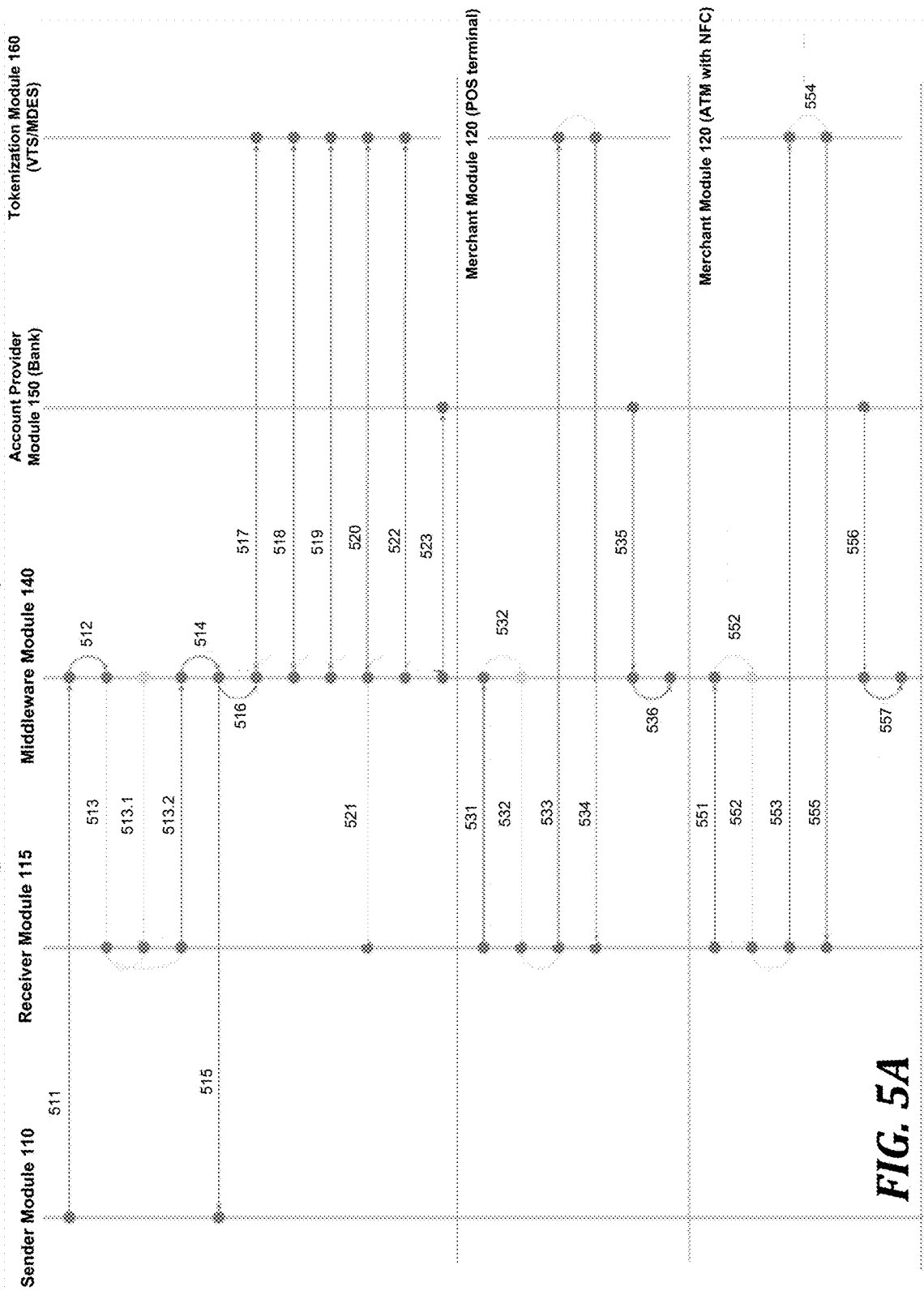
FIGS. 5A and 5B illustrate a representative method embodiment including general share process that may be implemented by asset custodians that have not integrated a tokenization service and receive digital tokens of assets, such as, but not limited to credit cards.
Figure 5B:
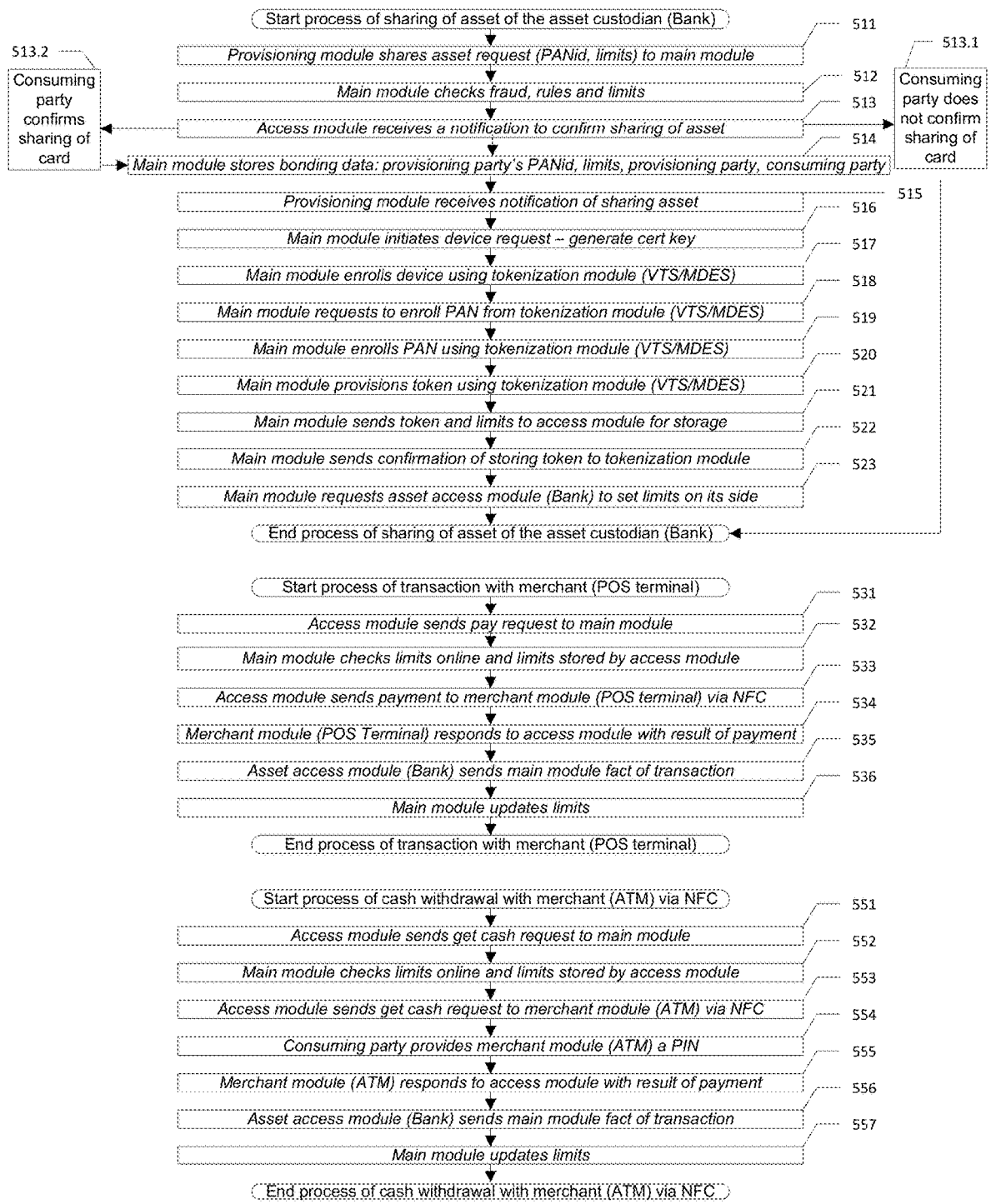

FIGS. 5A and 5B show representative method embodiment diagram for according to at least one embodiment of the present disclosure, including general sharing process that may be implemented by asset custodians such as, but not limited to banks or financial institutions that have not integrated tokenization module 160 such as, but not limited to VTS, MDES or other similar service yet and are not able to get digital tokens of assets.

1. Provisioning Module Shares Asset Request (PANid, Limits) to Main Module 511

The Provisioning module 110 may be integrated in order to provide notifications to the provisioning party and to the consuming party in the process of sharing access to a payment or non-payment asset and/or similar financial account, as well as end-to-end integration with main module 140 as shown in FIGS. 5A and 5B—Main Module 140.

Usage of provisioning module 110 within the process of sharing or providing access to an asset is optional, especially for third-party wallet providers such as, but not limited to Apple Pay, Google Wallet, Android Pay, Samsung Pay, that receive digital token of an asset through integration with tokenization module 140 such as, but not limited to VTS, MDES and/or issuing bank and/or other similar service.

The provisioning party using a device such as, but not limited to computing device 900, may add the information about the asset, access to which will be shared with another individual or legal entity. If the information about an asset has already been added to the device, provisioning party selects the asset, access to which will be shared with another individual or legal entity.

Provisioning party then may set at least one of the following non-limiting sharing constraints for the asset:

the amount of funds to which access may be shared together with the access to the asset (provisioning party can set a certain amount to which access may be shared or give access to the entire amount of available funds on the account);

the type of transaction using asset, access to which may be shared (provisioning party can set the following types of use of the amounts of funds to which access may be shared: withdrawal of money from ATM, payment via POS terminal, e-commerce transactions, money transfers, fund disbursements and/or other type of transactions);

the number of transactions (provisioning party can set the number of transactions; which consuming party will be authorized to make using shared access to the provisioning party's asset); and the term of the access to the asset (provisioning party can set the period of time during which the consuming party may have access to the asset or to share access to the asset on a regular basis).

Mentioned above sharing constraints may be optional. If provisioning party does not set at least one of the mentioned limits, those limits may be set by default. Provisioning party may set no limits; and no limits may be set by default. Furthermore, provisioning party may disable at least one limit.

Next, the provisioning party of the access to the asset may choose and/or specify the consuming party (an individual or legal entity who will be granted the access to the asset of the provisioning party) by entering at least one identifying parameter (cell phone number, email, account in online social media and/or social networking service [e.g., Facebook], IMEI, MAC address, or any other global ID) of the consuming party of the shared access to the asset.

The at least one identifying parameter such as, but not limited to cell phone number, email, account in online social media and/or social networking service (e.g., Facebook), IMEI, MAC address, or any other global ID may be a special identifier of the consuming party of the shared access to the provisioning party's asset. Optionally, the provisioning party may choose a plurality of identifying parameters. In some embodiments, once the provisioning party chooses at least one identifying parameter, the provisioning module 110 may fill in the remaining parameters for verification.

Following the initiation of sharing the access to the provisioning party's asset, information regarding such request is transferred from the provisioning module 110 to the main module 140.

2. Main Module Checks Fraud, Rules and Limits 512

The information regarding sharing access is transmitted to the cloud expert system e.g., Deepmemo, Deepmemo system, or other relevant cloud expert system (hereinafter—"Deepmemo") in order to control fraud and/or limits as shown in FIGS. 5A and 5B. main module checks fraud, rules and limits 512.

Integration with Deepmemo is optional, also Deepmemo may be replaced with another applicable software/hardware/service.

Further yet, in some embodiments of the present disclosure, successful passing of fraud and limits, Deepmemo system may confirm possibility of access sharing and may send a response with corresponding information to the main module 140.

In some embodiments consistent with the present disclosure, a system such as, but not limited to Deepmemo, may be fully and/or partially integrated with the main module 140.

3. Access Module Receives a Notification to Confirm Sharing of Asset 513

Main module 140 may send the consuming party a notification of the shared access to the asset.

Upon notification receipt, the consuming party may confirm or deny the shared access to the asset, as seen in FIGS. 5A and 5B Consuming party confirms sharing of asset and 513.2. Consuming party doesn't confirm sharing of asset 513.1.

4. Main Module Stores Bonding Data: Provisioning Party's PANid, Limits, Provisioning Party, Consuming Party 514

Upon the confirmation from the consuming party of the shared access to the asset, notification may be sent from access module 115 to the main module 140.

In some embodiments consistent with the present disclosure, the identifier of the provisioning party's shared asset such as, but not limited to Primary Account Number (PAN it PANid) and optionally limits and/or consuming party information and/or provisioning party information may be sent in a request from the main module 140 to Deepmemo.

Furthermore, the main module 140 may store bonding data such as, but not limited to provisioning party's PANid, limits, provisioning party, consuming party, etc.

5. Provisioning Module Receives Notification of Sharing Asset 515

The provisioning party may receive a confirmation of acceptance of the shared access to the asset by the consuming party via the provisioning module 110.

6. Main Module Initiates Device Request—Generate Cert Key 516

After storing information relevant to the sharing of asset (Main Module stores bonding data: provisioning party's PANid, limits, provisioning party, consuming party 514), the main module 140 may initiate a device request to the tokenization module 160. In some embodiments, part of the initiation of device request may by generating a digital token and/or a digital certificate and/or a key to represent the asset and/or limits associated with the account and/or consuming party/consuming party's device and/or consuming party/consuming party's device authorized for sharing.

7. Main Module Enrolls Device Using Tokenization Module (VTS/MDES) 517

Main module 140, after initiating device request, may forward the request to the tokenization module 160. The tokenization module 160 may approve or deny the request. If approved, the enrollment process may continue.

8. Main Module Requests to Enroll PAN from Tokenization Module (VTS/MDES) 518

Once the tokenization module 160 approved device request, it may send a PAN to the main module 140. In some embodiments, after the main module 140 receives approval for device enrollment, the main module 140 may send the tokenization module 160 a request to obtain a PAN to represent the asset and/or limits associated with the account and/or provisioning party/provisioning party's device and/or consuming party/consuming party's device authorized for sharing. Tokenization module 160 may then respond with the corresponding PAN.

9. Main Module Enrolls PAN Using Tokenization Module (VTS/MDES) 519

Once the main module 140 receives a PAN from the tokenization module 160, the main module may enroll the PAN in order to represent the asset and/or limits associated with the account and/or provisioning party/provisioning party's device and/or consuming party/consuming party's device authorized for sharing. Enrolling PAN may comprise, but not limited to, storing the PAN and optionally associated data on local and/or cloud storage. In some embodiments, enrolling PAN may additionally comprise enrolling the PAN with the tokenization module 160.

10. Main Module Provisions Token Using Tokenization Module (VTS/MDES) 520

In some embodiments consistent with the present disclosure, the main module 140 may request the tokenization module to send a request tokenization module 160 to provision a digital token associated with the PAN and/or associated data. In some embodiments, the main module 140 may provision the token based on the PAN provided by the tokenization module 160 and/or associated data.

11. Main Module Sends Token and Limits to Access Module for Storage 521

Upon receipt of the digital token of the provisioning party's asset, information about such digital token of the provisioning party's asset and limits (optionally) may be transmitted to the access module 115, as seen in FIGS. 5A and 5B—Main Module sends token and limits to Access module for storage 521.

12. Main Module Send Confirmation of Storing Token to Tokenization Module 522

After saving the information about the digital token and limits (optionally), confirmation of receipt of the provided digital token (FIGS. 5A and 5B Main Module send confirmation of storing token to Tokenization Module 522) may be transferred from the tokenization module 115 to the main module 140 then to the tokenization module 160 such as, but not limited to VTS, MDES and/or issuing bank and/or other similar service.

The access to the payment asset and/or similar financial account may now become available to the consuming party.

13. Main Module Requests Asset Access Module (Bank) to Set Limits on Its Side 523

Further yet, in some embodiments of the present disclosure, information about the limits from the main module 140 may be transferred to processing center of the asset access module 150 such as, but not limited to the bank (e.g., bank's processing host, etc.) (FIGS. 5A and 5B. Main Module requests Asset access module (Bank) to set limits on its side 523).

Throughout the process described above, access to the provisioning party's asset can be canceled by the provisioning party.

The process of sharing of an access to asset may be used with any other services related to the provision of digital tokens to an asset.

Continuing with reference to FIGS. 5A and 5B, in some embodiments consistent with the present disclosure, in order to use shared access to the asset for making transactions with a merchant such as POS terminal:

14. Access Module Sends Pay Request to Main Module 531

After receiving of the access to the asset, the consuming party may optionally send at least one pay request to the main module 140 via access module 115.

After sending the at least one pay request, the consuming party may optionally select shared/account to which access is provided by the provisioning party. Then consuming party may optionally bring a smartphone or another network-accessible device (such as smartphone, tablet, smartwatch, laptop, or another computing device 900) to a computing device 9 configured with a merchant module 120, such as an NFC enabled POS terminal. The NFC enabled POS terminal may read the digital token of the provisioning party's asset and receive payment data through NFC channel of data transmission. If either consuming party's or merchant's computing device 900 does not support NFC technology, the consuming party may make transactions using QR code or any other universal platform compatible with a computing device 900.

15. Main Module Checks Limits Online and Limits Stored by Access Module 532

After receiving at least one pay request, the main module 140 may check if the at least one pay request is compliant with the set of restrictions on the access to the asset specified by the provisioning party. In some embodiments, the main module 140 may check the set of restrictions using Deepmemo (optionally), on the side of processing center of the asset custodian.

In some embodiments consistent with the present disclosure, limits may be checked in the access module 115, using Deepmemo (optionally), on the side of processing center of the asset custodian.

16. Access Module Sends Payment to Merchant Module (POS Terminal) Via NFC 533

In some embodiments consistent with the present disclosure, in order to use shared access to the asset for making payments, the consuming party may select respective payment type; then, consuming party may need to activate network-accessible device configured with the access module 115 (such as smartphone, tablet, smartwatch, laptop, or another computing device 900), and to bring smartphone or another network-accessible device to NFC enabled POS terminal (optionally); then, the consuming party may use proximity payment technology (e.g., MasterCard Paypass/Visa PayWave transaction using Visa Token Service, in case of Visa and/or MasterCard Cloud based payment, in case of MasterCard, etc.) to initiate a payment. Payment may get initiated when the access module 115 sends a payment to the merchant module 120 via NFC and/or proximity payment technology. If either consuming party's or merchant's device does not support NFC technology, the consuming party may make transactions using QR code or any other universal platform compatible with a computing device 900.

17. Merchant Module Responds to Access Module with Result of Payment 534

After successful or unsuccessful transaction, a computing device configured with the merchant module 120 such as POS terminal may display information about the transaction. In case of successful transaction, funds may be debited from the provisioning party's asset. For payment assets and/or similar financial accounts, a flow of authorization and debiting funds may take place, for example, using a standard scheme—via bank-acquirer, payment system, and issuing bank of the asset access to which has been shared with the consuming party.

18. Asset Access Module (Bank) Sends Main Module Fact of Transaction 535

In some embodiments consistent with the present disclosure, after a successful transaction, the asset custodian associated with the shared asset may send information about the transaction to main module 140.

19. Main Module Updates Limits 536

In some embodiments consistent with the present disclosure, after a successful transaction, the main module 140 may further transfer information to Deepmemo for a plurality of purposes, such as, but not limited to synchronization of limits. In some embodiments, the main module 140 may update parameters for the sharing of access, such as, but not limited to limits, locally.

Continuing with reference to FIGS. 5A and 5B, in some embodiments consistent with the present disclosure, in order to use shared access to the asset for cash withdrawal through ATM:

20. Access Module Sends Get Cash Request to Main Module 551

After receiving of the access to the asset, the consuming party may send at least one get cash request to the main module 140 via access module 115.

After at least one get cash request, the consuming party may bring a network-accessible device to NFC enabled ATM. The NFC enabled ATM (optionally) may read the token of the provisioning party's asset through NFC channel of data transmission. If either consuming party's device or ATM does not support NFC technology, the consuming party may make cash withdrawal using QR code or any other universal platform compatible with a computing device 900.

21. Main Module Checks Limits Online and Limits Stored by Access Module 552

After receiving at least one get cash request, the main module 140 may check if the at least one get cash request is compliant with the set of restrictions on the access to the asset specified by the provisioning party. In some embodiments, the main module 140 may check the set of restrictions using Deepmemo (optionally), on the side of processing center of the asset custodian.

In some embodiments consistent with the present disclosure, limits may be checked in the access module 115, using Deepmemo (optionally), on the side of processing center of the asset custodian.

22. Access Module Sends Get Cash Request to Merchant Module (ATM) Via NFC 553

In some embodiments consistent with the present disclosure, in order to use shared access to the asset for cash withdrawal through ATM, consuming party may select respective payment type; then, the consuming party may activate the network-accessible device configured with the access module 115 (such as smartphone, tablet, smartwatch, laptop, or another computing device 900), and bring the network-accessible device configured with the access module 115 to NFC enabled ATM (optionally); then, the consuming party may use proximity payment technology (e.g., MasterCard Paypass/Visa PayWave transaction using Visa Token Service, in case of Visa and/or MasterCard Cloud based payment, in case of MasterCard, etc.) to obtain cash. Cash may be obtained when the access module 115 sends a get cash request to the merchant module 120 (such as ATM) via NFC and/or proximity payment technology. If either consuming party's or merchant's device does not support NFC technology, the consuming party may make transactions using QR code or any other universal platform compatible with a computing device 900.

23. Consuming Party Provides Merchant Module (ATM) a PIN 554

In some embodiments consistent with the present disclosure, after the merchant module 120 (such as ATM) receives at least one get cash request, the merchant module 120 may prompt the consuming party for a PIN. The get cash request may continue to be processed after a successful PIN entry by the consuming party. In some embodiments, the access module 115 may send the PIN and/or other authentication information over NFC along with the at least one get cash request.

24. Merchant Module (ATM) Responds to Access Module with Result of Payment 555

In some embodiments consistent with the present disclosure, after successful or unsuccessful transaction, a computing device configured with the merchant module 120 such as ATM may display information about the transaction. In case of successful transaction, funds may be debited from the provisioning party's asset. For some assets/accounts, a flow of authorization and debiting funds may take place, for example, using a standard scheme—via bank-acquirer, payment system, and issuing bank of the asset access to which has been shared with the consuming party.

25. Asset Access Module (Bank) Sends Main Module Fact of Transaction 556

In some embodiments consistent with the present disclosure, after a successful transaction, the asset custodian associated with the shared asset may send information about the transaction to main module 140.

26. Main Module Updates Limits 557

In some embodiments consistent with the present disclosure, after a successful transaction, the main module 140 may further transfer information to Deepmemo for a plurality of purposes, such as, but not limited to synchronization of limits. In some embodiments, the main module 140 may update parameters for the sharing of access, such as, but not limited to limits, locally.

E. Method of Sharing Using a Third-Party Wallet 600

Consistent with embodiments of the present disclosure, a method may be performed by at least one of the aforementioned modules. The method may be embodied as, for example, but not limited to, computer instructions, which when executed, perform the method. The method may comprise the following stages:

Provisioning module shares asset request (PANid, limits) to main module 611

Main module checks fraud, rules and limits 612

Access module receives a notification to confirm sharing of asset 613

Consuming party does not confirm sharing of asset 613.1

Consuming party confirms sharing of asset 613.2

Main module stores bonding data: provisioning party's PANid, limits, provisioning party, consuming party 614

Provisioning module receives notification of sharing asset 615

Main module requests token of asset from asset access module (Wallet) 616

Asset access module (Wallet) responds to main module with asset token 617

Main module sends token and limits to access module for storage 618

Access module then main module send confirmation of storing token 619

Access module sends pay request to main module 631

Main module checks limits online and limits stored by access module 632

Access module sends payment to Merchant Module (POS terminal) via NFC using asset access module (Third-Party Wallet) 633

Merchant module (POS Terminal) responds to access module with result of payment using asset access module (Third-Party Wallet) 634

Asset access module (Wallet) sends main module fact of transaction 635

Main module updates limits 636

Access module sends get cash request to main module 651

Main module checks limits online and limits stored by access module 652

Access module sends get cash request to merchant module (ATM) via NFC using asset access module (Third-Party Wallet) 653

Consuming party provides merchant module (ATM) a PIN 654

Merchant module (ATM) responds to access module with result of payment using asset access module (Third-Party Wallet) 655

Asset access module (Wallet) sends main module fact of transaction 656

Main module updates limits 657

Figure 6B:
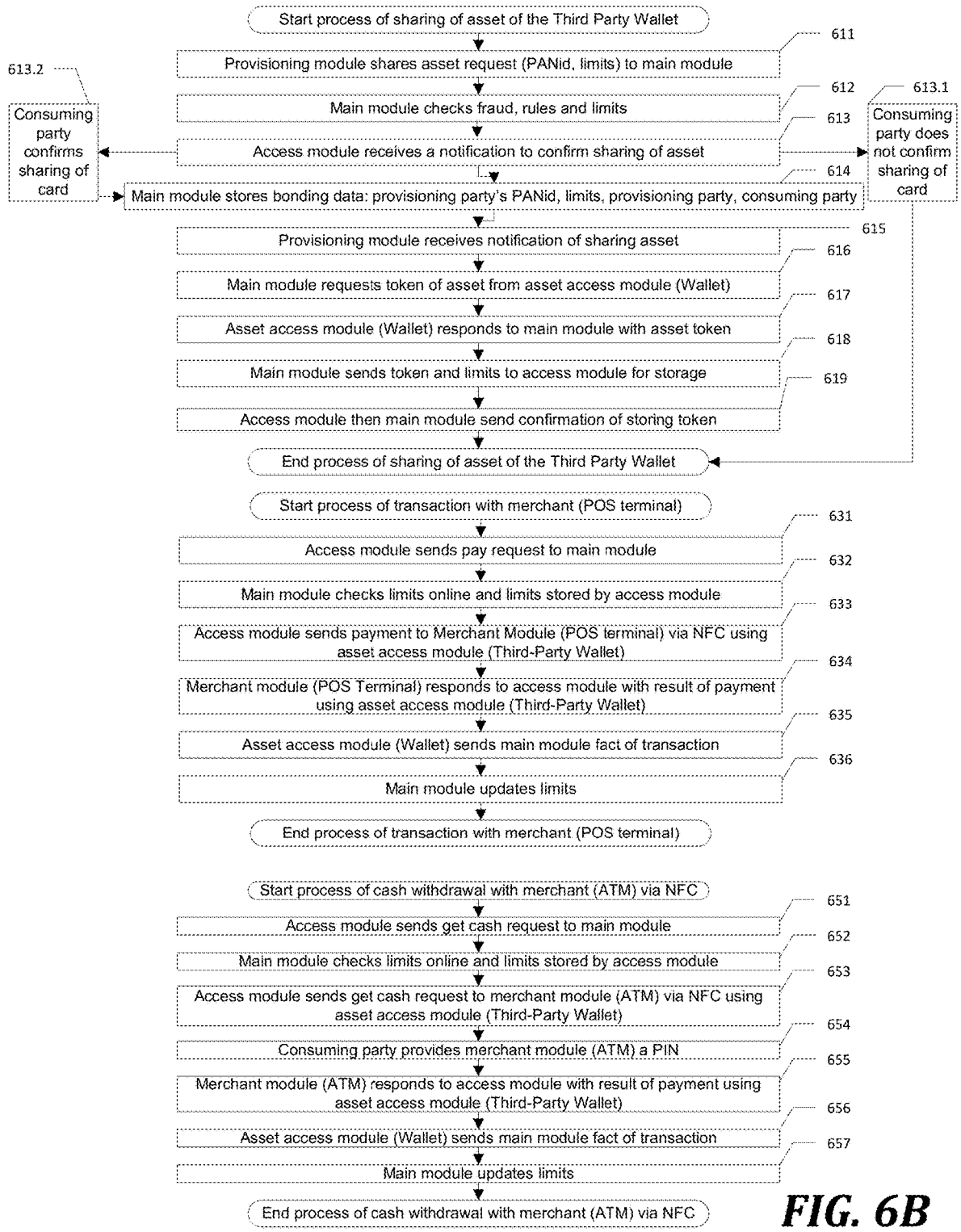

FIGS. 6A and 6B show representative method embodiment diagram for according to at least one embodiment of the present disclosure, including general sharing process that may be implemented by third-party wallet providers (such as Apple Pay, Google Wallet, Samsung pay, Android Pay etc.), that receive digital token of payment asset through integration with tokenization module 160 such as, but not limited to VTS, MDES and/or asset custodians such as, but not limited to issuing bank and/or other similar service.

In some embodiments consistent with the present disclosure, in order to share an access to an asset using tokenization module 160 such as, but not limited to Visa Token Services (VTS), MasterCard Digital Enablement Service (MDES) (however, asset sharing process may be implemented using any other services related to the provision of digital tokens to an asset):

1. Provisioning Module Shares Asset Request (PANid, Limits) to Main Module 611

In the Provisioning party software or any other messenger or software (hereinafter—"Provisioning party software" or "Provisioning party" or Provisioning module 110) may be integrated in order to provide notifications to the provisioning party and to the consuming party in the process of sharing access to an asset, as well as end-to-end integration with main module 140 as shown in FIGS. 6A and 6B—Main Module 140.

Usage of provisioning module 110 within the process of sharing or providing access to an asset is optional, especially for third-party wallet providers such as, but not limited to Apple Pay, Google Wallet, Android Pay, Samsung Pay, that receive digital token of an asset through integration with tokenization module 140 such as, but not limited to VTS, MDES and/or issuing bank and/or other similar service.

The provisioning party using a device such as, but not limited to computing device 900, may add the information about the asset, access to which will be shared with another individual or legal entity. If the information about an asset has already been added to the device, provisioning party selects the asset, access to which will be shared with another individual or legal entity.

Provisioning party then may set at least one of the following non-limiting sharing constraints for the asset:

the amount of funds to which access may be shared together with the access to the asset (provisioning party can set a certain amount to which access may be shared or give access to the entire amount of available funds on the asset);

the type of transaction using asset, access to which may be shared (provisioning party can set the following types of use of the amounts of funds to which access may be shared: withdrawal of money from ATM, payment via POS terminal, e-commerce transactions, money transfers, fund disbursements and/or other type of transactions);

the number of transactions (provisioning party can set the number of transactions; which consuming party will be authorized to make using shared access to the provisioning party's asset); and the term of the access to the asset (provisioning party can set the period of time during which the consuming party may have access to the asset or to share access to the asset on a regular basis).

Mentioned above sharing constraints may be optional. If provisioning party does not set at least one of the mentioned limits, those limits may be set by default. Provisioning party may set no limits; and no limits may be set by default. Furthermore, provisioning party may disable at least one limit.

Next, the provisioning party of the access to the asset may choose and/or specify the consuming party (an individual or legal entity who will be granted the access to the asset of the provisioning party) by entering at least one identifying parameter (cell phone number, email, account in online social media and/or social networking service [e.g., Facebook], IMEI, MAC address, or any other global ID) of the consuming party of the shared access to the asset).

The at least one identifying parameter such as, but not limited to cell phone number, email, account in online social media and/or social networking service (e.g., Facebook), IMEI, MAC address, or any other global ID may be a special identifier of the consuming party of the shared access to the provisioning party's asset. Optionally, the provisioning party may choose a plurality of identifying parameters. In some embodiments, once the provisioning party chooses at least one identifying parameter, the provisioning module 110 may fill in the remaining parameters for verification.

Following the initiation of sharing the access to the provisioning party's asset, information regarding such request is transferred from the provisioning module 110 to the main module 140.

2. Main Module Checks Fraud, Rules and Limits 612

The information regarding sharing access is transmitted to the cloud expert system e.g., Deepmemo, Deepmemo system, or other relevant cloud expert system (hereinafter—"Deepmemo") in order to control fraud and/or limits as shown in FIGS. 6A and 6B. main module checks fraud, rules and limits 612.

Integration with Deepmemo is optional, also Deepmemo may be replaced with another applicable software/hardware/service.

Further yet, in some embodiments of the present disclosure, successful passing of fraud and limits, Deepmemo system may confirm possibility of access sharing and may send a response with corresponding information to the main module 140.

In some embodiments consistent with the present disclosure, a system such as, but not limited to Deepmemo, may be fully and/or partially integrated with the main module 140.

3. Access Module Receives a Notification to Confirm Sharing of Asset 613

Main module 140 may send the consuming party a notification of the shared access to the asset.

Upon notification receipt, the consuming party may confirm or deny the shared access to the asset, as seen in FIGS. 6A and 6B Consuming party confirms sharing of asset and 613.2. Consuming party doesn't confirm sharing of asset 613.1.

4. Main Module Stores Bonding Data: Provisioning Party's PANid, Limits, Provisioning Party, Consuming Party 614

Upon the confirmation from the consuming party of the shared access to the asset, notification may be sent from access module 115 to the main module 140.

In some embodiments consistent with the present disclosure, the identifier of the provisioning party's shared asset such as, but not limited to Primary Account Number (PAN it PANid) and optionally limits and/or consuming party information and/or provisioning party information may be sent in a request from the main module 140 to Deepmemo.

Furthermore, the main module 140 may store bonding data such as, but not limited to provisioning party's PANid, limits, provisioning party, consuming party, etc.

5. Provisioning Module Receives Notification of Sharing Asset 615

The provisioning party may receive a confirmation of acceptance of the shared access to the asset by the consuming party via the provisioning module 110.

6. Main Module Requests Token of Asset from Asset Access Module (Wallet) 616

The main module 140 may transmit information about the provisioning party's asset to the asset access module 150 (in this case digital wallet provider such as, but not limited to Apple Pay, Android Pay, Samsung Pay and Trezor) which has integrated tokenization module 160 such as VTS/MDES and/or other tokenization services.

7. Asset Access Module (Wallet) Responds to Main Module with Asset Token 617

After the request for token provision takes place, namely when the digital token of provisioning party's asset may be transmitted to the tokenization module 160 such as, but not limited to VTS/MDES or other similar services for the confirmation, the tokenization module 160 (or the asset access module 150 with tokenization module 160 integrated) may respond to the main module 140 with the aforementioned digital token.

8. Main Module Sends Token and Limits to Access Module for Storage 618

Upon receipt of the digital token of the provisioning party's asset, information about such digital token of the provisioning party's asset and limits (optionally) may be transmitted to the access module 115, as seen in FIGS. 6A and 6B—Main Module sends token and limits to Access module for storage 618.

9. Access Module Then Main Module Send Confirmation of Storing Token 619

After saving the information about the digital token and limits (optionally), confirmation of receipt of the provided digital token (FIGS. 6A and 6B Access module then Main Module send confirmation of storing token 619) may be transferred from the access module 115 to the main module 140 then to the asset access module 150 (third-party wallet providers' service such as, but not limited to Apple Pay, Google Wallet, Android Pay, Samsung pay, Trezor, etc.), that may receive digital token of asset through integration with the tokenization module 160 such as, but not limited to VTS, MDES and/or issuing bank and/or other similar service.

The access to the payment asset and/or similar financial account may now become available to the consuming party.

Throughout the process described above, access to the provisioning party's payment asset and/or similar financial account can be canceled by the provisioning party.

The process of sharing of an access to an asset and/or similar financial account may be used with any other services related to the provision of digital tokens to an asset.

Continuing with reference to FIGS. 6A and 6B, in some embodiments consistent with the present disclosure, in order to use shared access to the asset for making payments with a merchant such as POS terminal:

10. Access Module Sends Pay Request to Main Module 631

After receiving of the access to the asset, the consuming party may optionally send at least one pay request to the main module 140 via access module 115.

After sending the at least one pay request, the consuming party may optionally select shared/account to which access is provided by the provisioning party. Then consuming party may optionally bring a smartphone or another network-accessible device (such as smartphone, tablet, smartwatch, laptop, or another computing device 900) to a computing device 9 configured with a merchant module 120, such as an NFC enabled POS terminal. The NFC enabled POS terminal may read the digital token of the provisioning party's asset and receive payment data through NFC channel of data transmission. If either consuming party's or merchant's computing device 900 does not support NFC technology, the consuming party may make transactions using QR code or any other universal platform compatible with a computing device 900.

11. Main Module Checks Limits Online and Limits Stored by Access Module 632

After receiving at least one pay request, the main module 140 may check if the at least one pay request is compliant with the set of restrictions on the access to the asset specified by the provisioning party. In some embodiments, the main module 140 may check the set of restrictions using Deepmemo (optionally), on the side of processing center of asset custodian.

In some embodiments consistent with the present disclosure, limits may be checked in the access module 115, using Deepmemo (optionally), on the side of processing center of asset custodian.

12. Access Module Sends Payment to Merchant Module (POS Terminal) Via NFC 633

In some embodiments consistent with the present disclosure, in order to use shared access to the asset for making payments, the consuming party may select respective payment type; then, consuming party may need to activate network-accessible device configured with the access module 115 (such as smartphone, tablet, smartwatch, laptop, or another computing device 900), and to bring smartphone or another network-accessible device to NFC enabled POS terminal (optionally); then, the consuming party may use proximity payment technology (e.g., MasterCard Paypass/Visa paywave transaction using Visa Token Service, in case of Visa and/or MasterCard Cloud based payment, in case of MasterCard, etc.) to initiate a payment. Payment may get initiated when the access module 115 sends a payment to the merchant module 120 via NFC and/or proximity payment technology. If either consuming party's or merchant's device does not support NFC technology, the consuming party may make transactions using QR code or any other universal platform compatible with a computing device 900.

13. Merchant Module Responds to Access Module with Result of Payment 634

After successful or unsuccessful transaction, a computing device configured with the merchant module 120 such as POS terminal may display information about the transaction. In case of successful transaction, funds may be debited from the provisioning party's asset. For payment assets and/or similar financial accounts, a flow of authorization and debiting funds may take place, for example, using a standard scheme—via bank-acquirer, payment system, and issuing bank of the asset access to which has been shared with the consuming party.

14. Asset Access Module (Bank) Sends Main Module Fact of Transaction 635

In some embodiments consistent with the present disclosure, after a successful transaction, the asset custodian associated with the shared asset may send information about the transaction to main module 140.

15. Main Module Updates Limits 636

In some embodiments consistent with the present disclosure, after a successful transaction, the main module 140 may further transfer information to Deepmemo for a plurality of purposes, such as, but not limited to synchronization of limits. In some embodiments, the main module 140 may update parameters for the sharing of access, such as, but not limited to limits, locally.

Continuing with reference to FIGS. 6A and 6B, in some embodiments consistent with the present disclosure, in order to use shared access to the asset for cash withdrawal through ATM:

16. Access Module Sends Get Cash Request to Main Module 651

After receiving of the access to the asset, the consuming party may send at least one get cash request to the main module 140 via access module 115.

After at least one get cash request, the consuming party may bring a network-accessible device to NFC enabled ATM. The NFC enabled ATM (optionally) may read the token of the provisioning party's asset through NFC channel of data transmission. If either consuming party's device or ATM does not support NFC technology, the consuming party may make cash withdrawal using QR code or any other universal platform compatible with a computing device 900.

17. Main Module Checks Limits Online and Limits Stored by Access Module 652

After receiving at least one get cash request, the main module 140 may check if the at least one get cash request is compliant with the set of restrictions on the access to the asset specified by the provisioning party. In some embodiments, the main module 140 may check the set of restrictions using Deepmemo (optionally), on the side of processing center of the asset custodian.

In some embodiments consistent with the present disclosure, limits may be checked in the access module 115, using Deepmemo (optionally), on the side of processing center of asset custodian, such as, but not limited to a bank and/or financial institution and/or credit union.

18. Access Module Sends Get Cash Request to Merchant Module (ATM) Via NFC 653

In some embodiments consistent with the present disclosure, in order to use shared access to the asset for cash withdrawal through ATM, consuming party may select respective payment type; then, the consuming party may activate the network-accessible device configured with the access module 115 (such as smartphone, tablet, smartwatch, laptop, or another computing device 900), and bring the network-accessible device configured with the access module 115 to NFC enabled ATM (optionally); then, the consuming party may use proximity payment technology (e.g., MasterCard Paypass/Visa PayWave transaction using Visa Token Service, in case of Visa and/or MasterCard Cloud based payment, in case of MasterCard, etc.) to obtain cash. Cash may be obtained when the access module 115 sends a get cash request to the merchant module 120 (such as ATM) via NFC and/or proximity payment technology. If either consuming party's or merchant's device does not support NFC technology, the consuming party may make transactions using QR code or any other universal platform compatible with a computing device 900.

19. Consuming Party Provides Merchant Module (ATM) a PIN 654

In some embodiments consistent with the present disclosure, after the merchant module 120 (such as ATM) receives at least one get cash request, the merchant module 120 may prompt the consuming party for a PIN. The get cash request may continue to be processed after a successful PIN entry by the consuming party. In some embodiments, the access module 115 may send the PIN and/or other authentication information over NFC along with the at least one get cash request.

20. Merchant Module (ATM) Responds to Access Module with Result of Payment 655

In some embodiments consistent with the present disclosure, after successful or unsuccessful transaction, a computing device configured with the merchant module 120 such as ATM may display information about the transaction. In case of successful transaction, funds may be debited from the provisioning party's asset. For some assets/accounts, a flow of authorization and debiting funds may take place, for example, using a standard scheme—via bank-acquirer, payment system, and issuing bank of the asset access to which has been shared with the consuming party.

21. Asset Access Module (Bank) Sends Main Module Fact of Transaction 656

In some embodiments consistent with the present disclosure, after a successful transaction, the asset custodian associated with the shared asset may send information about the transaction to main module 140.

22. Main Module Updates Limits 657

In some embodiments consistent with the present disclosure, after a successful transaction, the main module 140 may further transfer information to Deepmemo for a plurality of purposes, such as, but not limited to synchronization of limits. In some embodiments, the main module 140 may update parameters for the sharing of access, such as, but not limited to limits, locally.

F. Method of Sharing a Non-Payment Asset 700

Consistent with embodiments of the present disclosure, a method may be performed by at least one of the aforementioned modules. The method may be embodied as, for example, but not limited to, computer instructions, which when executed, perform the method. The method may comprise the following stages:

Provisioning module sends non-payment asset sharing request to main module 711

Main module checks fraud, rules and limits 712

Main module sends notification to confirm sharing to access module 713

Consuming party does not confirm sharing of asset 713.1

Consuming party confirms sharing of asset 713.2

Main module stores bonding data: provisioning party's CardID, provisioning party, consuming party 714

Main module sends notification of sharing to provisioning module 715

Figure 7B:
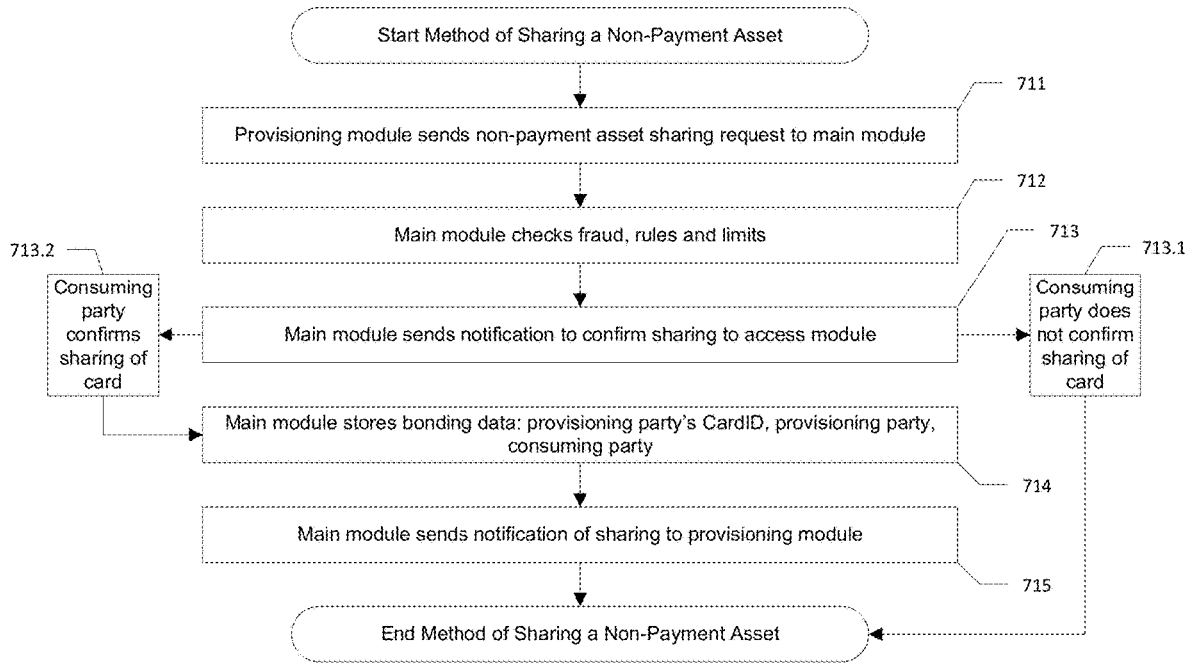

With reference to FIGS. 7A and 7B. FIGS. 7A and 7B show representative method embodiment diagram for according to one or more aspect of the present invention, including general process of providing or sharing access to non-payment asset.

In some embodiments consistent with the present disclosure, stage 711, a person (physical person or legal entity) who requires access to a non-payment asset of another person (physical person or legal entity) may inform such a person via any accessible method.

Additionally, stage 711 may be omitted if sharing of an access to a non-payment asset is initiated by a provisioning party (not consuming party).

Optionally, provisioning party's and/or consuming party's device may be at least one of, but not limited to, a portable/wireless/cell/smart phone, smartwatch or another network-accessible device, personal computer, laptop, or any other computing device 900.

Further yet, in stage 711, a person (physical person or legal entity) who wants to share access to a non-payment asset may have a set of computing instructions, such as an app, may choose a non-payment asset access to which will be shared (optionally). In some embodiments consistent with the present disclosure, a person, such as a provisioning party, may choose the consuming party, may set up limits (optionally), and may send request for sharing of access to a non-payment asset (function of sharing of access to a non-payment asset by receiving of any applicable non-payment asset digital token or any applicable identifier by consuming party device may be fulfilled by an asset custodian, etc.—depending on an embodiment). Such request may be sent from any device, including but not limited to computing device 900, via any available instrument such as, but not limited to mobile application, website, SMS, notification and any instructions compatible with a computing device 900 (FIGS. 7A and 7B. Provisioning module sends non-payment asset sharing request to main module 711).

Provisioning party may choose the consuming party of the shared or provide access to a non-payment asset by entering at least one of, but not limited to, choosing a phone number, email, account in various online social media and/or social networking services (e.g., Facebook), IMEI, MAC address, etc., or other global ID of the consuming party.

Provisioning party may share or provide consuming party with an access to an asset.

Further yet, in some embodiments consistent with the present disclosure, provisioning party and consuming party may have network access via at least one of, but not limited to, Wi-Fi, or cellular, Bluetooth and, or any other connection to share access to a non-payment asset.

Optionally, provisioning party may specify any limits for consuming party's using of a provided access such as, but not limited to a time period for which a shared access to a non-payment asset will be available to the consuming party.

The process, management and the processing of requests for sharing access to the non-payment asset, limit verification (optionally), receipt of digital token or any applicable identifier of non-payment asset digital token or any applicable identifier occurs in the main module 140.

Optionally the information regarding sharing access may be transmitted to the cloud expert system such as, but not limited to Deepmemo, Deepmemo system, or other cloud expert system in order to control fraud and/or limits as shown in (FIGS. 7A and 7B. Main module checks fraud rules and limits 712).

For the non-payment asset digital token or any applicable identifier is not required to be obtained via Tokenization Module 160 embodiment such as, but not limited to Visa Token Services (VTS), MasterCard Digital Enablement Service (MDES) or other similar service.

The received digital token or any applicable identifier of the non-payment asset may be sent to the consuming party's device, thus, the access to the non-payment asset of the provisioning party is shared with the consuming party.

After digital token or any applicable identifier of non-payment asset may be sent to consuming party's device, the consuming party receives notification. The notification may be in the form such as, but not limited to SMS, e-mail, etc. (FIGS. 7A and 7B. Main module sends notification to confirm sharing to access module 713).

Upon notification receipt, the consuming party may confirm or deny the shared access to the non-payment asset (optionally) (FIGS. 7A and 7B Consuming party does not confirm sharing of asset 713.1 or Consuming party confirms sharing of asset 713.2).

Upon receipt of digital token or any applicable identifier of the non-payment asset, information about such digital token or applicable identifier of the provisioning party's non-payment asset and limits are stored by the main module 140 (FIGS. 7A and 7B. Main module stores bonding data: provisioning party's CardID, provisioning party, consuming party 714).

Further yet, in some embodiments consistent with the present disclosure, once the sharing process is complete, the digital token or applicable identifier of non-payment asset may be saved on a consuming party's network-accessible device such as, but not limited to computing device 900, for any applicable purpose (FIGS. 7A and 7B. Main module sends notification of sharing to provisioning module 715).

Throughout the process described above, access to the provisioning party's non-payment asset may be canceled by the provisioning party. In some embodiments, access to the non-payment asset, received by the consuming party may also be shared by the consuming party with any third party, if such transaction is not prohibited by the provisioning party of the shared access.

G. Method of Sharing Access to a Financial Asset 800

Consistent with embodiments of the present disclosure, a method may be performed by at least one of the aforementioned modules. The method may be embodied as, for example, but not limited to, computer instructions, which when executed, perform the method.

Figure 8:
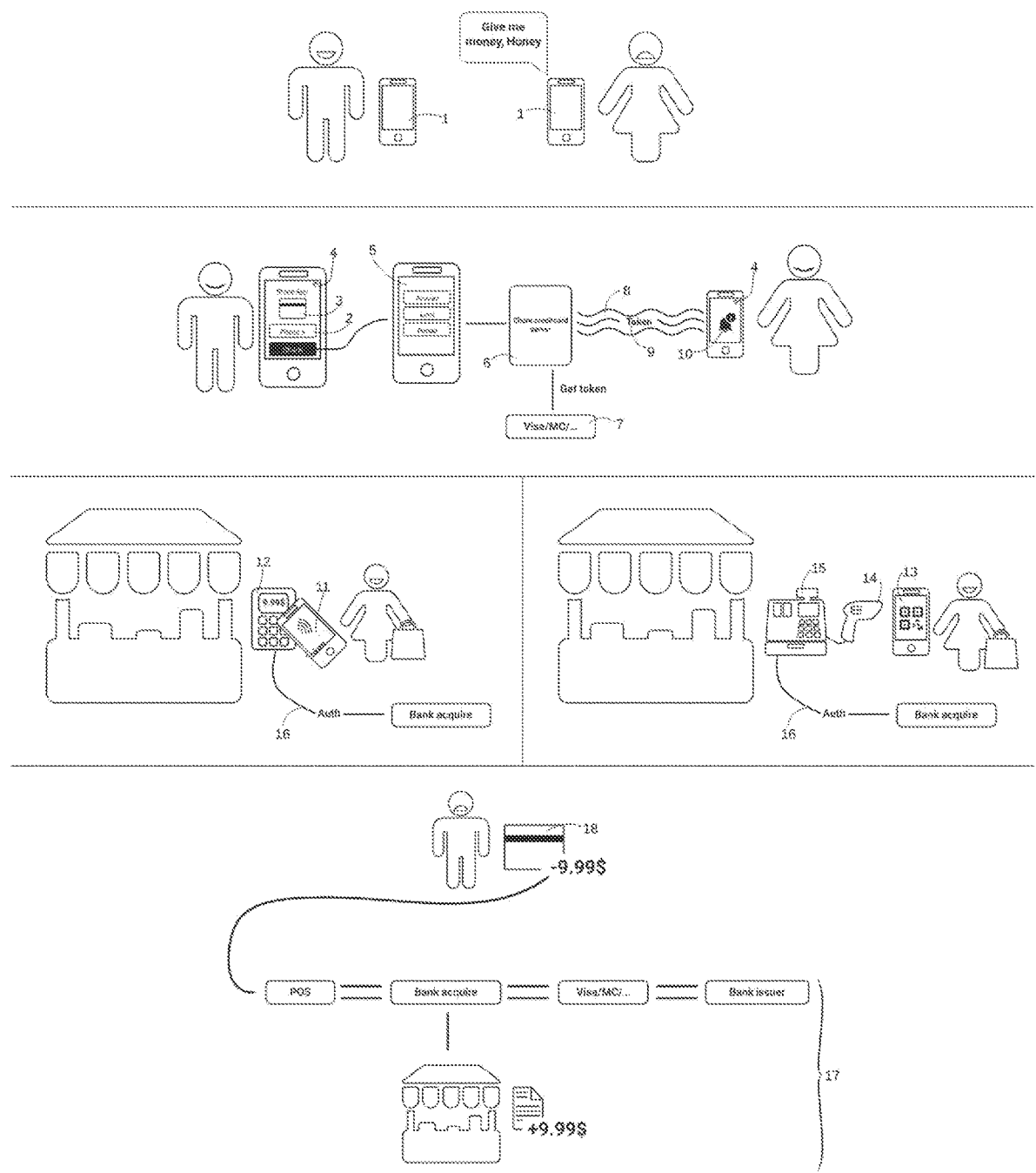
FIG. 8 illustrates a conceptual scheme of a digital method of providing or sharing access to an asset.

FIG. 8 shows a conceptual scheme of digital method of providing or sharing access to an asset H. A Conceptual Scheme of Method of Sharing Access to a Financial Asset 800 is the Following:

In an embodiment consistent with the present disclosure, stage 1. a person (physical person or legal entity) who requires access to an asset of another person (physical person or legal entity) may inform such person via any accessible method.

Alternatively, Stage 1 may be optional and may be skipped if sharing of an access to an asset is initiated by a provisioning party (not consuming party).

Optionally, provisioning party's and/or consuming party's device 1 may be a portable/wireless/cell/smartphone, smartwatch or another network-accessible device, personal computer, laptop, or any other computing device 900.

Further yet, in stage 2, a person (physical person or legal entity) who wants to share access to an asset may choose an asset access to which will be shared 3 (optionally), may choose consuming party 2, may set up limits 5 (optionally), and may send request for sharing of access to an asset (function of sharing of access to an asset by receiving of a digital token by consuming party device may be fulfilled by an asset custodian such as, but not limited to a payment system, bank or financial institution, expert system, or any other asset custodian—depending on an embodiment consistent with the present disclosure). Such request may be sent from at least one device, but not limited to, (e.g., smartphone, tablet, smartwatch, laptop, or any other computing device 900) via any available instrument (e.g., mobile application, website, SMS, notification etc.).

Provisioning party may choose consuming party of the shared or provided access to either a an asset by choosing at least one of, but not limited to, a phone number, email, account in online social media and/or social networking service (e.g., Facebook), IMEI, MAC address, etc., or other global ID 2 of the consuming party.

Provisioning party may share or provide consuming party with an access to an asset 3.

Further yet, in an embodiment consistent with the present disclosure, a provisioning party and a consuming party may have network access 4 via at least one of, but not limited to, Wi-Fi, cellular, Bluetooth, and, or another type of connection compatible with a computing device 900 to share access to an asset to the consuming party.

Optionally, the provisioning party may specify at least one of the following:

an amount 5 within which the consuming party may perform operations using shared access to a payment asset and/or similar financial account;

a limited amount for withdrawing money 5 from Automated Teller Machine (ATM), payments via Point Of Sale (POS) terminal, making e-commerce transactions, money transfers, fund disbursements and/or another type of transactions; and a time period 5 for which shared access to an asset will be available to the consuming party.

The management and processing of requests for the sharing access to an asset, limit verification (optionally), receipt of a digital token or any other applicable identifier of an asset may occur in Corezoid cloud process engine provided by Middleware or any other relevant software enabling management of the sharing process (hereinafter—"Main Module" 6) which may interact with VTS/MDES and/or a issuing bank, asset custodian and/or other similar service.

When a provisioning party selects an asset, sets up limits (optionally), and selects consuming party, request for digitalization of the asset (namely request and receipt of the digital token of the provisioning party's asset) may take a place.

For non-payment assets, a digital token or any applicable identifier may not be obtained via Visa Token Services (VTS), MasterCard Digital Enablement Service (MDES) or other similar service.

Also, if the issuing asset custodian such as, but not limited to a bank, has already integrated a tokenization module 160 such as, but not limited to Visa Token Services (VTS), MasterCard Digital Enablement Service (MDES) or other similar service, the process of receiving of the digital token of the asset may be obtained by interacting with the asset custodian's service and the asset custodian, in its turn, may receive the digital token from Visa Token Services (VTS), MasterCard Digital Enablement Service (MDES) or other similar service by the standard procedure of the digital token provisioning. When an issuing bank has not integrated a tokenization module 160 such as, but not limited to Visa Token Services (VTS), MasterCard Digital Enablement Service (MDES) or other similar service yet, then the process of receiving of the digital token of the asset may be obtained by interaction with a separate tokenization module 160 such as, but not limited to Visa Token Services (VTS), MasterCard Digital Enablement Service (MDES) or other similar service. In case of third-party wallet provider (such as Apple Pay, Google Wallet, Samsung pay, Android Pay etc), which receives digital token of an asset through integration with a tokenization module 160 such as, but not limited to Visa Token Service (VTS), MasterCard Digital Enablement Service (MDES) and/or asset custodian and/or other similar service the process of receiving of the digital token of the asset may be obtained by interacting with third-party wallet provider and receiving digital token from third-party wallet provider 7.

Then, received digital token shall be sent to the consuming party's device, thus, the access to the asset of the provisioning party is shared with the consuming party 8. The received digital token or any applicable identifier of non-payment asset may be sent to the consuming party's device, thus the access to the non-payment asset of the provisioning party is shared with the consuming party.

The digital token of an asset received via tokenization module 160 may be used to transact using NFC enabled device or using QR code or any other universal platform. Non-payment assets may be shared by the same conceptual scheme, although in some embodiments, digital tokens may be replaced with any other available instrument 9 (e.g., identifier).

After the digital token of an asset is sent to consuming party's device, the consuming party may receive a notification such as, but not limited to application notification, SMS, email 10, etc.

Further yet, in some embodiments of the present disclosure, stage 3, once the sharing process is complete, the digital token of an asset, or any other applicable identifier of non-payment asset may be saved on a consuming party's network-accessible device 11, who may use such access for any applicable purpose (including, but not limited to, withdrawing money from ATM, making payments via POS terminal, making e-commerce transactions, money transfers, fund disbursements and/or another type of transactions 12, 14, 15, etc.). If either consuming party's or merchant's device does not support NFC technology, the consuming party may make transactions using QR code 13, 14, 15 or any other method compatible with a computing device 900.

In a continuing reference to FIG. 8, stage 4, for payment assets, a transaction of debiting funds from the payment asset of provisioning party (access to which has been shared) may take place, when the consuming party makes withdrawal of money from ATM, payment via POS terminal, makes e-commerce transactions, money transfers, fund disbursements and/or another type of transactions 18.

For payment assets, a flow of authorization and debiting funds may take place using a standard scheme—via bank-acquirer, payment system, and issuing bank of the payment asset access to which has been shared with the consuming party 16, 17.

Throughout the process described above, access to the provisioning party's payment assets or non-payment asset may be canceled by the provisioning party.

Optionally, access to the asset, received by the consuming party may also be shared by the consuming party with any third party, if, such transaction is not prohibited by the provisioning party of the shared access. The sharing of shared access with any third party by the consuming party may occur in accordance with the instructions given for sharing an access to an asset.

The above described digital method and system of providing or sharing access to an asset may be automated as suggested below:
 selection of the consuming party to the provisioning party's asset; and/or
  selection of a global ID of the consuming party; and/or
  selection of the asset; and/or
  setting of the limits for using shared access by the consuming party.

Embodiments of the present disclosure provide a hardware and software platform operative as a distributed system of modules and computing elements.

IV. Computing Device Architecture

Platform 100 may be embodied as, for example, but not be limited to, a website, a web application, a desktop application, backend application, and a mobile application compatible with a computing device 900. The computing device 900 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

Platform 100 may be hosted on a centralized server or a cloud computing service. Although methods 200, 300, 400, 500, 600, 700 and 800 have been described to be performed by a computing device 900, it should be understood that, in some embodiments, different operations may be performed by a plurality of the computing devices 900 in operative communication at least one network.

Embodiments of the present disclosure may comprise a system having a central processing unit (CPU) 920, a bus 930, a memory unit 940, a power supply unit (PSU) 950, and one or more Input/Output (I/O) units. The CPU 920 coupled to the memory unit 940 and the plurality of I/O units 960 via the bus 930, all of which are powered by the PSU 950. It should be understood that, in some embodiments, each disclosed unit may actually be a plurality of such units for the purposes of redundancy, high availability, and/or performance. The combination of the presently disclosed units is configured to perform the stages any method disclosed herein.

Figure 9:
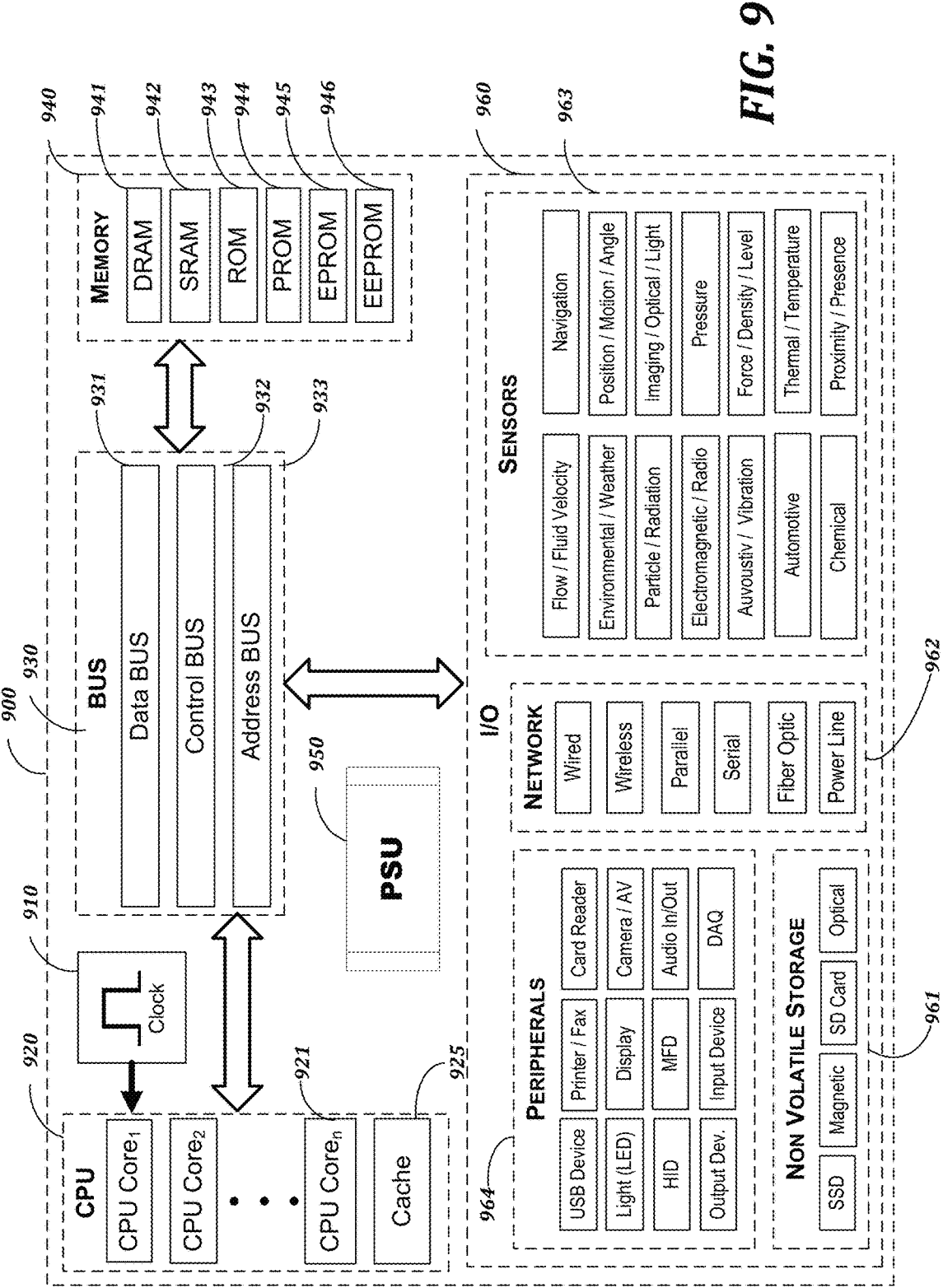
FIG. 9 is a block diagram of a system including a computing device for performing the methods of the present disclosure.

FIG. 9 is a block diagram of a system including computing device 900. Consistent with an embodiment of the disclosure, the aforementioned CPU 920, the bus 930, the memory unit 940, a PSU 950, and the plurality of I/O units 960 may be implemented in a computing device, such as computing device 900 of FIG. 9. Any suitable combination of hardware, software, or firmware may be used to implement the aforementioned units. For example, the CPU 920, the bus 930, and the memory unit 940 may be implemented with computing device 900 or any of other computing devices 900, in combination with computing device 900. The aforementioned system, device, and components are examples and other systems, devices, and components may comprise the aforementioned CPU 920, the bus 930, the memory unit 940, consistent with embodiments of the disclosure.

At least one computing device 900 may be embodied as any of the computing elements illustrated in all of the attached figures, including methods 200, 300, 400, 500, 600, and 800. A computing device 900 does not need to be electronic, nor even have a CPU 920, nor bus 930, nor memory unit 940. The definition of the computing device 900 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 900, especially if the processing is purposeful.

With reference to FIG. 9, a system consistent with an embodiment of the disclosure may include a computing device, such as computing device 900. In a basic configuration, computing device 900 may include at least one clock module 910, at least one CPU 920, at least one bus 930, and at least one memory unit 940, at least one PSU 950, and at least one I/O 960 module, wherein I/O module may be comprised of, but not limited to a non-volatile storage sub-module 961, a communication sub-module 962, a sensors sub-module 963, and a peripherals sub-module 964.

A system consistent with an embodiment of the disclosure the computing device 900 may include the clock module 910 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 920, the central component of modern computers, which relies on a clock. The only exceptions are asynchronous circuits such as asynchronous CPUs. The clock 910 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 900 use a "clock multiplier" which multiplies a lower frequency external clock to the appropriate clock rate of the CPU 920. This allows the CPU 920 to operate at a much higher frequency than the rest of the computer, which affords performance gains in situations where the CPU 920 does not need to wait on an external factor (like memory 940 or input/output 960). Some embodiments of the clock 910 may include dynamic frequency change, where, the time between clock edges can vary widely from one edge to the next and back again.

A system consistent with an embodiment of the disclosure the computing device 900 may include the CPU unit 920 comprising at least one CPU Core 921. A plurality of CPU cores 921 may comprise identical the CPU cores 921, such as, but not limited to, homogeneous multi-core systems. It is also possible for the plurality of CPU cores 921 to comprise different the CPU cores 921, such as, but not limited to, heterogeneous multi-core systems, big.LITTLE systems and some AMD accelerated processing units (APU). The CPU unit 920 reads and executes program instructions which may be used across many application domains, for example, but not limited to, general purpose computing, embedded computing, network computing, digital signal processing (DSP), and graphics processing (GPU). The CPU unit 920 may run multiple instructions on separate CPU cores 921 at the same time. The CPU unit 920 may be integrated into at least one of a single integrated circuit die and multiple dies in a single chip package. The single integrated circuit die and multiple dies in a single chip package may contain a plurality of other aspects of the computing device 900, for example, but not limited to, the clock 910, the CPU 920, the bus 930, the memory 940, and I/O 960.

The CPU unit 921 may contain cache 922 such as, but not limited to, a level 1 cache, level 2 cache, level 3 cache or combination thereof. The aforementioned cache 922 may or may not be shared amongst a plurality of CPU cores 921. The cache 922 sharing comprises at least one of message passing and inter-core communication methods may be used for the at least one CPU Core 921 to communicate with the cache 922. The inter-core communication methods may comprise, but not limited to, bus, ring, two-dimensional mesh, and crossbar. The aforementioned CPU unit 920 may employ symmetric multiprocessing (SMP) design.

The plurality of the aforementioned CPU cores 921 may comprise soft microprocessor cores on a single field programmable gate array (FPGA), such as semiconductor intellectual property cores (IP Core). The plurality of CPU cores 921 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 921, for example, but not limited to Instruction-level parallelism (ILP) such as, but not limited to, super-scalar pipelining, and Thread-level parallelism (TLP).

Consistent with the embodiments of the present disclosure, the aforementioned computing device 900 may employ a communication system that transfers data between components inside the aforementioned computing device 900, and/or the plurality of computing devices 900. The aforementioned communication system will be known to a person having ordinary skill in the art as a bus 930. The bus 930 may embody internal and/or external plurality of hardware and software components, for example, but not limited to a wire, optical fiber, communication protocols, and any physical arrangement that provides the same logical function as a parallel electrical bus. The bus 930 may comprise at least one of, but not limited to a parallel bus, wherein the parallel bus carry data words in parallel on multiple wires, and a serial bus, wherein the serial bus carry data in bit-serial form. The bus 930 may embody a plurality of topologies, for example, but not limited to, a multidrop/electrical parallel topology, a daisy chain topology, and a connected by switched hubs, such as USB bus. The bus 930 may comprise a plurality of embodiments, for example, but not limited to:
Internal data bus (data bus) 931/Memory bus
Control bus 932
Address bus 933
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)
  HyperTransport
  InfiniBand
  RapidIO
  Mobile Industry Processor Interface (MIPI)
  Coherent Processor Interface (CAPI)
  Plug-n-play
  1-Wire
  Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (i.g. PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
  Music Instrument Digital Interface (MIDI)
  Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 900 may employ hardware integrated circuits that store information for immediate use in the computing device 900, know to the person having ordinary skill in the art as primary storage or memory 940. The memory 940 operates at high speed, distinguishing it from the non-volatile storage sub-module 961, which may be referred to as secondary or tertiary storage, which provides slow-to-access information but offers higher capacities at lower cost. The contents contained in memory 940, may be transferred to secondary storage via techniques such as, but not limited to, virtual memory and swap. The memory 940 may be associated with addressable semiconductor memory, such as integrated circuits consisting of silicon-based transistors, used for example as primary storage but also other purposes in the computing device 900. The memory 940 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 941, Static Random-Access Memory (SRAM) 942, CPU Cache memory 925, Advanced Random-Access Memory (A-RAM), and other types of primary storage such as Random-Access Memory (RAM).

Non-volatile memory which can retain stored information even after power is removed, for example, but not limited to, Read-Only Memory (ROM) 943, Programmable ROM (PROM) 944, Erasable PROM (EPROM) 945, Electrically Erasable PROM (EEPROM) 946 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 900 may employ the communication system between an information processing system, such as the computing device 900, and the outside world, for example, but not limited to, human, environment, and another computing device 900. The aforementioned communication system will be known to a person having ordinary skill in the art as I/O 960. The I/O module 960 regulates a plurality of inputs and outputs with regard to the computing device 900, wherein the inputs are a plurality of signals and data received by the computing device 900, and the outputs are the plurality of signals and data sent from the computing device 900. The I/O module 960 interfaces a plurality of hardware, such as, but not limited to, non-volatile storage 961, communication devices 962, sensors 963, and peripherals 964. The plurality of hardware is used by the at least one of, but not limited to, human, environment, and another computing device 900 to communicate with the present computing device 900. The I/O module 960 may comprise a plurality of forms, for example, but not limited to channel I/O, port mapped I/O, asynchronous I/O, and Direct Memory Access (DMA).

Consistent with the embodiments of the present disclosure, the aforementioned computing device 900 may employ the non-volatile storage sub-module 961, which may be referred to by a person having ordinary skill in the art as one of secondary storage, external memory, tertiary storage, off-line storage, and auxiliary storage. The non-volatile storage sub-module 961 may not be accessed directly by the CPU 920 without using intermediate area in the memory 940. The non-volatile storage sub-module 961 does not lose data when power is removed and may be two orders of magnitude less costly than storage used in memory module, at the expense of speed and latency. The non-volatile storage sub-module 961 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (961) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO)

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor Magnetic storage such as, but not limited to, Hard Disk Drive (HDD), tape drive, carousel memory, and Card Random-Access Memory (CRAM)

Phase-change memory

Holographic data storage such as Holographic Versatile Disk (HVD)

Molecular Memory

Deoxyribonucleic Acid (DNA) digital data storage

Consistent with the embodiments of the present disclosure, the aforementioned computing device 900 may employ the communication sub-module 962 as a subset of the I/O 960, which may be referred to by a person having ordinary skill in the art as at least one of, but not limited to, computer network, data network, and network. The network allows computing devices 900 to exchange data using connections, which may be known to a person having ordinary skill in the art as data links, between network nodes. The nodes comprise network computer devices 900 that originate, route, and terminate data. The nodes are identified by network addresses and can include a plurality of hosts consistent with the embodiments of a computing device 900. The aforementioned embodiments include, but not limited to personal computers, phones, servers, drones, and networking devices such as, but not limited to, hubs, switches, routers, modems, and firewalls.

Two nodes can be said are networked together, when one computing device 900 is able to exchange information with the other computing device 900, whether or not they have a direct connection with each other. The communication sub-module 962 supports a plurality of applications and services, such as, but not limited to World Wide Web (WWW), digital video and audio, shared use of application and storage computing devices 900, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 962 may comprise a plurality of size, topology, traffic control mechanism and organizational intent. The communication sub-module 962 may comprise a plurality of embodiments, such as, but not limited to Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength)

Parallel communications, such as, but not limited to, LPT ports.

Serial communications, such as, but not limited to, RS-232 and USB

Fiber Optic communications, such as, but not limited to, Single-mode optical fiber (SMF) and Multi-mode optical fiber (MMF)

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 900 may employ the sensors sub-module 963 as a subset of the I/O 960. The sensors sub-module 963 comprises at least one of the devices, modules, and subsystems whose purpose is to detect events or changes in its environment and send the information to the computing device 900. Sensors are sensitive to the measured property, are not sensitive to any property not measured, but may be encountered in its application, and do not significantly influence the measured property. The sensors sub-module 963 may comprise a plurality of digital devices and analog devices, wherein if an analog device is used, an Analog to Digital (A-to-D) converter must be employed to interface the said device with the computing device 900. The sensors may be subject to a plurality of deviations that limit sensor accuracy. The sensors sub-module 963 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ionselective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 900 may employ the peripherals sub-module 962 as a subset of the I/O 960. The peripheral sub-module 964 comprises ancillary devices uses to put information into and get information out of the computing device 900. There are 3 categories of devices comprising the peripheral sub-module 964, which exist based on their relationship with the computing device 900, input devices, output devices, and input/output devices. Input devices send at least one of data and instructions to the computing device 900. Input devices can be categorized based on, but not limited to:

Modality of input, such as, but not limited to, mechanical motion, audio, visual, and tactile Whether the input is discrete, such as but not limited to, pressing a key, or continuous such as, but not limited to position of a mouse The number of degrees of freedom involved, such as, but not limited to, two-dimensional mice vs three-dimensional mice used for Computer-Aided Design (CAD) applications Output devices provide output from the computing device 900. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 964:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 900. The information can be stored in a multitude of formats depending on the user's requirement. Examples of types of video input devices include, but not limited to, digital camera, digital camcorder, portable media player, web cam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 900 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices covert at least one of analog signals and physical parameters to digital values for processing by the computing device 900. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 962 sub-module), data storage device (non-volatile storage 961), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose V. Aspects The following disclose various Aspects of the present disclosure. The various Aspects are not to be construed as patent claims unless the language of the Aspect appears as a patent claim. The Aspects describe various non-limiting embodiments of the present disclosure.

Aspect 1. An automated digital system to provide or share access to a financial asset or account, the system comprising of: a first network-accessible device, used by a provisioning party, to share access to an asset with a consuming party, wherein the first network-accessible device enables the provisioning party to: specify the consuming party by selecting an ID of the consuming party, define sharing constraints upon the account, wherein the sharing constraints comprise: a time for enabling and disabling the consuming party's access to the asset, an amount of asset value within the asset to be shared with the consuming party, a quantity of transactions to be permitted with the asset, at least one merchant approved for transaction with the asset, and at least one type of transaction available for the sharing privileges; a tokenization service configured to: receive a request to generate a digital token associated with the asset, generate the digital token, and enforce a first portion of the sharing constraints upon the consuming party's utilization of the asset via the digital token; a second network-accessible device, used by the consuming party, to receive the shared access to the provisioning party's asset, wherein the second network-accessible device enables the consuming party to: utilize the digital token associated with the shared asset through a controlled interface; and an intermediary server configured to: receive, from the first network-accessible device used by the provisioning party, the following: a request to share the asset with the consuming party, and the sharing constraints to be enforced upon the shared asset, transmit the request, to the tokenization service, for the digital token, provide, to the second network-accessible device used by the consuming party, a controlled interface for utilizing the shared asset via the digital token, and enforce, via the controlled interface, a second portion of the sharing constraints upon the consuming party's utilization of the shared asset, in addition to the first portion of the sharing constraints enforced by the tokenization service.

Aspect 2. The system of Aspect 1, wherein the first network-accessible device comprises at least one of the following: smartphone, tablet, smartwatch, laptop configured with Near Field Communication (NFC), to share access to the provisioning party's asset.

Aspect 3. The system of Aspect 1, wherein the second network-accessible device comprises at least one of the following: smartphone, tablet, smartwatch, laptop configured with Near Field Communication (NFC), to receive access to the provisioning party's asset.

Aspect 4. The system of Aspect 1, wherein specify the consuming party by selecting the ID of the consuming party comprises the provisioning party being enabled to select at least one of the following of the consuming party: a unique ID associated with the consuming party, a phone number, email, social media, networking service, IMEI, MAC address, and other identifiable data associated with the consuming party.

Aspect 5. The system of Aspect 1, wherein the second network-accessible device is configured to receive access to the provisioning party's asset from an applicable identifier associated with the digital token.

Aspect 6. The system of Aspect 1, wherein the second network-accessible device is configured to receive access to the provisioning party's asset subject to the sharing constraints enforced by the intermediary server.

Aspect 7. The system of Aspect 1, wherein the second network-accessible device is configured to utilize the provisioning party's asset to make at least one transaction in accordance to the at least one type of transaction permitted by the sharing constraints, the at least one transaction comprising at least one of the following: withdrawing money from Automated Teller Machine (ATM), making payments via Point Of Sale (POS) terminal, e-commerce transactions, money transfers, and fund disbursements.

Aspect 8. The system of Aspect 1, wherein the second network-accessible device is configured to utilize the provisioning party's account for making transactions, in accordance to the at least one type of transaction permitted by the sharing constraints, using at least one of the following: an NFC enabled device, and a matrix barcode.

Aspect 9. The system of Aspect 1, wherein the first network-accessible device is configured to initiate sharing the provisioning party's asset via an applicable identifier being sent to the second network-accessible device without a bank, financial institution, a payment system, and third-party wallet provider facilitating the sending of the applicable identifier.

Aspect 10. The system of Aspect 9, wherein the second network-accessible device is configured to receive the applicable identifier, without the bank, the financial institution, the payment system, and the third-party wallet provider facilitating receipt of the applicable identifier.

Aspect 11. The system of Aspect 1, wherein the second network-accessible device is configured to access the provisioning party's asset for real-time payment via proximity-based payment in accordance to the specified constraint for the at least one type of transaction, in order to perform at least one of the following: withdrawing money from Automated Teller Machine (ATM), making payments via Point Of Sale (POS) terminal, e-commerce transactions, money transfers, and fund disbursements, wherein the proximity-based payment comprises at least one of the following: an NFC enabled device or at least one of, universal platform, such as matrix barcode with or without access to a network.

Aspect 12. The system of Aspect 1, wherein the first network-accessible device is configured with at least one of the following: Host Card Emulation (HCE), Near Field Communication (NFC) technology to access the provisioning party's asset, in order to enable at least one of the following, in accordance to the at least one type of transactions specified by the sharing constraints: withdrawing money from Automated Teller Machine (ATM), payments via Point Of Sale (POS) terminal, e-commerce transactions, money transfers, and fund disbursements.

Aspect 13. The system of Aspect 1, wherein the first network-accessible device is configured to utilize the provisioning party's asset, in order to enable, in accordance to the at least one type of transactions specified by the sharing constraints, a matrix barcode, when the first device and the second device does not support NFC technology.

Aspect 14. The system of Aspect 1, wherein the first network-accessible device is configured for automatically specifying the consuming party, the provisioning party's asset, and defining the sharing constraints based on parameters associated with the provisioning party.

Aspect 15. A method for improving conventional account tokenization infrastructure by establishing, integrating, and managing, through an intermediary server, access and utilization constraints upon tokenized accounts, the method comprising: selecting an account for which sharing privileges are to be offered; defining constraints upon the sharing privileges to the account, the constraints comprising at least one of the following: an identification of at least one consuming party to receive the sharing privileges, a time for enabling and disabling the sharing privileges, an amount of asset value within the account to be conveyed with the sharing privileges, a quantity of transactions to be permitted with the account, at least one merchant approved for transaction with the account, and at least one type of transaction available for the sharing privileges; sending a request for a digital token associated with the account, wherein sending the request for the digital token comprises sending the request to at least one of the following: an institution associated with the account, a digital tokenization service provider associated with the institution, corresponding to the account, and a digital wallet associated with the account; receiving the digital token for the account; providing access to the digital token through a controlled interface; the controlled interface providing at least one of the following: an encryption of the digital token as a virtual identifier, a communication means for interacting with at least one of the following: a physical POS terminal, an e-commerce terminal, and an ATM; receiving a request to utilize the digital token through the controlled interface for affecting a transaction, wherein receiving the request comprises receiving transaction details associated with the request; verifying whether the transaction details are within the constraints established for the account; and when the transaction details are within the constraints: employing the digital token to affect the transaction, wherein employing the digital token comprises: enabling the consuming party to utilize the controlled interface to facilitate the transaction with the virtual identifier, and causing a transfer of asset value from the shared account to facilitate the transaction in response to the utilization of the digital token.

Aspect 16. The method of Aspect 15, further comprising: an offer for the sharing privileges and an acceptance of the sharing privileges for the consuming party.

Aspect 17. The method of Aspect 15, wherein sending the request for the digital token to the institution associated with the account comprises communicating with a preferred token service provider affiliated with the institution.

Aspect 18. The method of Aspect 15, wherein the communication means for interacting with the POS terminal comprises a near field communication protocol.

Aspect 19. The method of Aspect 15, wherein the communication means for interacting with the POS terminal comprises the utilization of a matrix barcode.

Aspect 20. The method of Aspect 15, further comprising, deploying an integration with the intermediary server in at least one of the following: the institution, the digital token service provider, and the digital wallet.

Aspect 21. A computer-readable medium which contains of set of instructions, which when executed, perform a method for improving conventional account tokenization infrastructure by establishing, integrating, and managing, through an intermediary server, access and utilization constraints upon tokenized accounts, the method executed by the set of instructions comprising: selecting an account for which sharing privileges are to be offered; defining constraints upon the sharing privileges to the account, the constraints comprising at least one of the following: an identification of at least one consuming party to receive the sharing privileges, a time for enabling and disabling the sharing privileges, an amount of asset value within the account to be conveyed with the sharing privileges, a quantity of transactions to be permitted with the account, at least one merchant approved for transaction with the account, and at least one type of transaction available for the sharing privileges; sending a request for a digital token associated with the account, wherein sending the request for the digital token comprises sending the request to at least one of the following: an institution associated with the account, a digital tokenization service provider associated with the institution corresponding to the account, and a digital wallet associated with the account; receiving the digital token for the account; providing access to the digital token through a controlled interface, the controlled interface providing at least one of the following: an obfuscation of the digital token as a virtual identifier, and a communication means for interacting with at least one of the following: a physical POS terminal, an e-commerce terminal, and an ATM; receiving a request to utilize the digital token through the controlled interface for affecting a transaction, wherein receiving the request comprises receiving transaction details associated with the request; verifying whether the transaction details are within the constraints established for the account; and when the transaction details are within the constraints: employing the digital token to affect the transaction, wherein employing the digital token comprises: enabling the consuming party to utilize the controlled interface to facilitate the transaction with the virtual identifier, and causing a transfer of asset value from the shared account to facilitate the transaction in response to the utilization of the digital token.

Aspect 22. The computer-readable medium of Aspect 21, further comprising: an offer for the sharing privileges and an acceptance of the sharing privileges for the consuming party.

Aspect 23. The computer-readable medium of Aspect 21, wherein sending the request for the digital token to the institution associated with the account comprises communicating with a preferred token service provider affiliated with the institution.

Aspect 24. The computer-readable medium of Aspect 21, wherein the communication means for interacting with the POS terminal comprises a near field communication protocol.

Aspect 25. The computer-readable medium of Aspect 21, wherein the communication means for interacting with the POS terminal comprises the utilization of a matrix barcode.

Aspect 26. The computer-readable medium of Aspect 21, further comprising, deploying an integration with the intermediary server in at least one of the following: the institution, the digital token service provider, and the third-party wallet.

Aspect 27. A system comprising: a tokenization infrastructure; an asset operative with the tokenization infrastructure; an intermediary server configured to establishing, integrating, and managing access and utilization constraints upon the asset when the asset is tokenized by the tokenization infrastructure; and a consuming party device comprising a controlled interface configured to receive a digital token associated with the tokenized account and utilize the tokenized account with the constraints imposed by the intermediary server.

Aspect 28. The system of Aspect 27, wherein the intermediary server is deployed in at least one of the following: an institution, and a digital token service provider associated with the institution.

Aspect 29. The system of Aspect 28, wherein the asset is associated with the institution.

Aspect 30. The system of Aspect 29, wherein the institution is associated with the digital token service provider.

Aspect 31. The system of Aspect 30, wherein the digital token service provider is associated with the tokenization infrastructure.

Aspect 32. The system of Aspect 27, wherein the consuming party device is operative with a near field communication protocol.

Aspect 33. The system of Aspect 27, wherein the consuming party device is operative to display a matrix barcode.

Aspect 34. An automated digital method of providing or sharing access to an asset or account, the method comprising: specifying, by a provisioning party using a first network-accessible device for sharing access to an asset that the provisioning party intends to share with a consuming party; specifying the consuming party by selecting a unique ID associated with the consuming party; defining, via the first network-accessible device, sharing constraints upon the asset, wherein defining the sharing constraints comprises: specifying a time for enabling and disabling the consuming party's access to the asset, specifying an amount of asset value within the asset to be shared with the consuming party, specifying a quantity of transactions to be permitted with the asset, specifying at least one merchant approved for transaction with the asset, and specifying at least one type of transaction available for the sharing privileges; requesting, from an intermediary server to a tokenization service, a digital token associated with the asset, the tokenization service being configured to: receiving, at the intermediary server from the tokenization service, the digital token, and enforcing, by the tokenization service, a first portion of the sharing constraints upon the consuming party's utilization of the shared asset via the digital token; enforcing, by the intermediary server, a second portion of the sharing constraints upon the consuming party's utilization of the shared asset, in addition to the first portion of the sharing constraints enforced by the tokenization service; and providing, by the intermediary server, a controlled interface for the consuming party using a second network-accessible device for utilizing the digital token, wherein the controlled interface regulates, by employing the intermediary server, the consuming party's utilization of the asset by enforcing the second portion of the sharing constrains upon the digital token in addition to the first portion of sharing constraints enforced by the tokenization service.

Aspect 35. The method of Aspect 34, wherein the provisioning party using a first network-accessible device comprising using at least one of the following: smartphone, tablet, smartwatch, laptop configured with Near Field Communication (NFC), to share access to the provisioning party's asset.

Aspect 36. The method of Aspect 34, wherein the consuming party using a second network-accessible device comprises using at least one of the following: smartphone, tablet, smartwatch, laptop configured with Near Field Communication (NFC), to receive access to the provisioning party's asset.

Aspect 37. The method of Aspect 34, wherein specifying the consuming party comprises utilizing at least one of the following the unique ID of the consuming party, a mobile phone number, email, online social media, a social networking service, IMEI, MAC address, and other identifiable data associated with the consuming party.

Aspect 38. The method of Aspect 34, further comprising receiving, using the controlled interface of the second network-accessible device, access to the provisioning party's asset by receiving an applicable identifier corresponding to the digital token generated for the asset.

Aspect 39. The method of Aspect 34, wherein providing the controlled interface for the consuming party using the second network-accessible device comprises enabling the second network-accessible device, through the controlled interface, to receive access to the provisioning party's asset subject to: the first portion of sharing constraints through the tokenization service, and the second portion of the sharing constraints through the intermediary server.

Aspect 40. The method of Aspect 34, wherein providing the controlled interface for the consuming party using the second network-accessible device comprises enabling the second network-accessible device, through the controlled interface, to access the provisioning party's asset to make at least one transaction, wherein enabling to make the at least one transaction comprises enabling, in accordance to the specified constraint for the at least one type of transaction, the following: withdrawing money from Automated Teller Machine (ATM), making payments via Point Of Sale (POS) terminal, e-commerce transactions, money transfers, and fund disbursements.

Aspect 41. An automated digital method of providing or sharing access to an asset comprising steps of: a provisioning party using a network-accessible device for sharing access to a consuming party, by choosing an asset that provisioning party intends to share access to the consuming party, choosing the consuming party by selecting a global ID of the consuming party; the consuming party using a network-accessible device for receiving the shared access to the provisioning party's asset by receiving a digital token.

Aspect 42. The method of Aspect 41, wherein the provisioning party may use at least one of, network-accessible device such as, smartphone, tablet, smartwatch, laptop configured with Near Field Communication (NFC), to share access to the provisioning party's asset.

Aspect 43. The method of Aspect 41, wherein the consuming party may use at least one of, network-accessible device such as, smartphone, tablet, smartwatch, laptop configured with Near Field Communication (NFC), to receive access to the provisioning party's asset.

Aspect 44. The method of Aspect 41, wherein the provisioning party may use at least one of, network-accessible device such as, smartphone, tablet, smartwatch, laptop not configured with Near Field Communication (NFC), to share access to the provisioning party's asset.

Aspect 45. The method of Aspect 41, wherein the consuming party may use at least one of, network-accessible device such as, smartphone, tablet, smartwatch, laptop not configured with Near Field Communication (NFC), to receive access to the provisioning party's asset.

Aspect 46. The method of Aspect 41, wherein the provisioning party may use at least one of, or a combination of a plurality of, the global ID of the consuming, a mobile phone number, email, online social media and/or social networking service, EMEI, MAC address, or other global ID to choose the consuming party.

Aspect 47. The method of Aspect 41, wherein the consuming party may use network-accessible device to receive access to the provisioning party's asset by receiving at least one of, the asset applicable identifier.

Aspect 48. The method of Aspect 41, wherein the consuming party may use network-accessible device, to receive access to the provisioning party's asset subject to at least one condition set by the provisioning party.

Aspect 49. The method of Aspect 41, wherein the consuming party may use network-accessible device, to access the provisioning party's asset to make at least one transaction such as, withdrawing money from Automated Teller Machine (ATM), making payments via Point Of Sale (POS) terminal, e-commerce transactions, money transfers or fund disbursements.

Aspect 50. The method of Aspect 41, wherein the consuming party may use network-accessible device, to access the provisioning party's asset for making transactions, using NFC enabled device or at least one of, universal platform, such as QR code.

Aspect 51. The method of Aspect 41, wherein the provisioning party may use network-accessible device, to initiate sharing an access to the provisioning party's asset, resulting in a applicable identifier being sent to the consuming party network-accessible device without an account custodian facilitating the sharing access and/or sending the applicable identifier.

Aspect 52. The method of Aspect 41, wherein the consuming party may use network-accessible device, to receive access to the provisioning party's asset by receiving an applicable identifier, without an asset custodian facilitating receipt of the applicable identifier.

Aspect 53. The method of Aspect 41, wherein the consuming party may use network-accessible device, to access the provisioning party's asset for real-time payment via contactless or proximity payment for at least one of, transactions such as, withdrawing money from Automated Teller Machine (ATM), payments via Point Of Sale (POS) terminal, e-commerce transactions, money transfers or fund disbursements, via NFC enabled device or at least one of, universal platform, such as QR code with or without access to a network.

Aspect 54. The method of Aspect 41, wherein the consuming party may use network-accessible device using Host Card Emulation (HCE), Near Field Communication (NFC) technology to access the provisioning party's asset, to make for at least one of, transactions such as, withdrawing money from Automated Teller Machine (ATM), payments via Point Of Sale (POS) terminal, e-commerce transactions, money transfers or fund disbursements.

Aspect 55. The method of Aspect 41, wherein the consuming party may use network-accessible device, to access the provisioning party's asset, to make transaction via at least one of, universal platform, such as QR code, if either the recipient's or a merchant's device does not support NFC technology.

Aspect 56. The method of Aspect 41, wherein the process of selecting the recipient, the provisioning party's asset, selecting a global ID of the consuming party or setting the limits for using shared access by the consuming party may be conducted by at least one of: automatically, manually or semi automatically.

Aspect 57. An automated digital system to provide or share access to a payment card or similar financial account comprising of: a provisioning party uses a network-accessible device to share access to a consuming party, chooses an asset that provisioning party intends to share access to the consuming party, chooses the consuming party by selecting a global ID of the recipient; and the consuming party uses a network-accessible device to receive the shared access to the provisioning party's asset by receiving a digital token.

Aspect 58. The system of Aspect 57, wherein the provisioning party may use at least one of, network-accessible device such as, smartphone, tablet, smartwatch, laptop configured with Near Field Communication (NFC), to share access to the provisioning party's asset.

Aspect 59. The system of Aspect 57, wherein the consuming party may use at least one of, network-accessible device such as, smartphone, tablet, smartwatch, laptop configured with Near Field Communication (NFC), to receive access to the provisioning party's asset.

Aspect 60. The system of Aspect 57, wherein the provisioning party may use at least one of, network-accessible device such as, smartphone, tablet, smartwatch, laptop not configured with Near Field Communication (NFC), to share access to the provisioning party's asset.

Aspect 61. The system of Aspect 57, wherein the consuming party may use at least one of, network-accessible device such as, smartphone, tablet, smartwatch, laptop not configured with Near Field Communication (NFC), to receive access to the provisioning party's asset.

Aspect 62. The system of Aspect 57, wherein the provisioning party may use at least one of, or a combination of a plurality of, the global ID of the consuming party, a mobile phone number, email, online social media and/or social networking service, EMEI, MAC address, or other global ID to choose the consuming party.

Aspect 63. The system of Aspect 57, wherein the consuming party may use network-accessible device to receive access to the provisioning party's asset from at least one of, the asset applicable identifier.

Aspect 64. The system of Aspect 57, wherein the consuming party may use network-accessible device, to receive access to the provisioning party's asset subject to at least one condition set by the provisioning party.

Aspect 65. The system of Aspect 57, wherein the consuming party may use network-accessible device, to access the provisioning party's asset to make at least one transaction such as, withdrawing money from Automated Teller Machine (ATM), making payments via Point Of Sale (POS) terminal, e-commerce transactions, money transfers or fund disbursements.

Aspect 66. The system of Aspect 57, wherein the consuming party may use network-accessible device, to access the provisioning party's asset for making transactions, using NFC enabled device or at least one of, universal platform, such as QR code.

Aspect 67. The system of Aspect 57, wherein the provisioning party may use network-accessible device, to initiate sharing an access to the provisioning party's asset, resulting in an applicable identifier being sent to the consuming party network-accessible device without an asset custodian facilitating the sharing access and/or sending the applicable identifier.

Aspect 68. The system of Aspect 57, wherein the consuming party may use network-accessible device, to receive access to the provisioning party's asset by receiving an applicable identifier, without an asset custodian facilitating receipt of the applicable identifier.

Aspect 69. The system of Aspect 57, wherein the consuming party may use network-accessible device, to access the provisioning party's asset for real-time payment via contactless or proximity payment for at least one of, transactions such as, withdrawing money from Automated Teller Machine (ATM), payments via Point Of Sale (POS) terminal, e-commerce transactions, money transfers or fund disbursements, via NFC enabled device or at least one of, universal platform, such as QR code with or without access to a network.

Aspect 70. The system of Aspect 57, wherein the consuming party may use network-accessible device using Host Card Emulation (HCE), Near Field Communication (NFC) technology to access the provisioning party's asset, to make for at least one of, transactions such as, withdrawing money from Automated Teller Machine (ATM), payments via Point Of Sale (POS) terminal, e-commerce transactions, money transfers or fund disbursements.

Aspect 71. The system of Aspect 57, wherein the consuming party may use network-accessible device, to access the provisioning party's asset, to make transaction via at least one of, universal platform, such as QR code, if either the recipient's or a merchant's device does not support NFC technology.

Aspect 72. The system of Aspect 57, wherein the process of selecting the recipient, the provisioning party's asset, selecting a global ID of the consuming party or setting the limits for using shared access by the consuming party may be conducted by at least one of: automatically, manually or semi automatically.

Aspect 73. An automated digital method of providing or sharing access to a non-payment card or similar non-financial account, or non-card product comprising steps of: a provisioning party using a network-accessible device for sharing access to a recipient, by choosing a non-payment asset that provisioning party intends to share access to the recipient, choosing the consuming party by selecting a global ID of the recipient; and the consuming party using a network-accessible device for receiving the shared access to the provisioning party's non-payment asset by receiving applicable identifier.

Aspect 74. The method of Aspect 73, wherein the provisioning party may use at least one of, network-accessible device such as, smartphone, tablet, smartwatch, laptop configured with Near Field Communication (NFC), to share access to the provisioning party's non-payment asset.

Aspect 75. The method of Aspect 73, wherein the consuming party may use at least one of, network-accessible device such as, smartphone, tablet, smartwatch, laptop configured with Near Field Communication (NFC), to receive access to the provisioning party's non-payment asset.

Aspect 76. The method of Aspect 73, wherein the provisioning party may use at least one of, network-accessible device such as, smartphone, tablet, smartwatch, laptop not configured with Near Field Communication (NFC), to share access to the provisioning party's non-payment asset.

Aspect 77. The method of Aspect 73, wherein the consuming party may use at least one of, network-accessible device such as, smartphone, tablet, smartwatch, laptop not configured with Near Field Communication (NFC), to receive access to the provisioning party's non-payment asset.

Aspect 78. The method of Aspect 73, wherein the provisioning party may use at least one of, or a combination of a plurality of, the global ID of the consuming party, a mobile phone number, email, online social media and/or social networking service, EMEI, MAC address, or other global ID to choose the consuming party.

Aspect 79. The method of Aspect 73, wherein the consuming party may use network-accessible device to receive access to the provisioning party's non-payment asset from at non-payment asset applicable identifier.

Aspect 80. The method of Aspect 73, wherein the consuming party may use network-accessible device, to receive access to the provisioning party's non-payment asset subject to at least one condition set by the provisioning party.

Aspect 81. The method of Aspect 73, wherein the consuming party may use network-accessible device, to access the provisioning party's non-payment asset to make at least one transaction such as, using discounts, rights or obligations provided by the provisioning party's non-payment asset.

Aspect 82. The method of Aspect 73, wherein the consuming party may use network-accessible device, to access the provisioning party's non-payment asset for making transactions, using NFC enabled device or at least one of, universal platform, such as QR code.

Aspect 83. The method of Aspect 73, wherein the provisioning party may use network-accessible device, to initiate sharing an access to the provisioning party's non-payment asset, resulting in an applicable identifier being sent to the consuming party network-accessible device without an asset custodian facilitating the sharing access and/or sending the applicable identifier.

Aspect 84. The method of Aspect 73, wherein the consuming party may use network-accessible device, to receive access to the provisioning party's non-payment asset by receiving an applicable identifier, without an asset custodian facilitating the receipt of the applicable identifier.

Aspect 85. The method of Aspect 73, wherein the consuming party may use network-accessible device, to access the provisioning party's non-payment asset, to make transaction via at least one of, universal platform, such as QR code, if either the consuming party's or a merchant's device does not support NFC technology.

Aspect 86. The method of Aspect 73, wherein the process of selecting the consuming party, the provisioning party's non-payment asset, selecting a global ID of the consuming party or setting the limits for using shared access by the consuming party may be conducted by at least one of: automatically, manually or semi automatically.

Aspect 87. An automated digital system to provide or share access to a non-payment card and/or similar non-financial account, or non-card product comprising of: a provisioning party uses a network-accessible device to share access with a consuming party, chooses a non-payment asset that provisioning party intends to share access to the consuming party, chooses the consuming party by selecting a global ID of the consuming party; and the consuming party uses a network-accessible device to receive the shared access to the provisioning party's non-payment asset by receiving applicable identifier.

Aspect 88. The system of Aspect 87, wherein the provisioning party may use at least one of, network-accessible device such as, smartphone, tablet, smartwatch, laptop configured with Near Field Communication (NFC), to share access to the provisioning party's non-payment asset.

Aspect 89. The system of Aspect 87, wherein the consuming party may use at least one of, network-accessible devices such as, smartphone, tablet, smartwatch, laptop configured with Near Field Communication (NFC), to receive access to the provisioning party's non-payment asset.

Aspect 90. The system of Aspect 87, wherein the provisioning party may use at least one of, network-accessible device such as, smartphone, tablet, smartwatch, laptop not configured with Near Field Communication (NFC), to share access to the provisioning party's non-payment asset.

Aspect 91. The system of Aspect 87, wherein the consuming party may use at least one of, network-accessible device such as, smartphone, tablet, smartwatch, laptop not configured with Near Field Communication (NFC), to receive access to the provisioning party's non-payment asset.

Aspect 92. The system of Aspect 87, wherein the provisioning party may use at least one of, or a combination of a plurality of, the global ID of the consuming party, a mobile phone number, email, online social media and/or social networking service, EMEI, MAC address, or other global ID to choose the consuming party.

Aspect 93. The system of Aspect 87, wherein the consuming party may use network-accessible device to receive access to the provisioning party's non-payment asset from a non-payment asset applicable identifier.

Aspect 94. The system of Aspect 87, wherein the consuming party may use network-accessible device, to receive access to the provisioning party's non-payment asset subject to at least one condition set by the provisioning party.

Aspect 95. The system of Aspect 87, wherein the consuming party may use network-accessible device, to access the provisioning party's non-payment asset to make at least one transaction such as, using discounts, rights or obligations provided by the provisioning party's non-payment asset.

Aspect 96. The system of Aspect 87, wherein the consuming party may use network-accessible device, to access the provisioning party's non-payment asset for making transactions, using NFC enabled device or at least one of, universal platform, such as QR code.

Aspect 97. The system of Aspect 87, wherein the provisioning party may use network-accessible device, to initiate sharing an access to the provisioning party's non-payment asset, resulting in an applicable identifier being sent to the consuming party network-accessible device without an asset custodian facilitating the sharing access and/or sending the applicable identifier.

Aspect 98. The system of Aspect 87, wherein the consuming party may use network-accessible device, to receive access to the provisioning party's non-payment asset by receiving an applicable identifier, without an asset custodian facilitating the receipt of the applicable identifier.

Aspect 99. The system of Aspect 87, wherein the consuming party may use network-accessible device, to access the provisioning party's non-payment asset, to make transaction via at least one of, universal platform, such as QR code, if either the consuming party's or a merchant's device does not support NFC technology.

Aspect 100. The system of Aspect 87, wherein the process of selecting the recipient, the provisioning party's non-payment asset, selecting a global ID of the consuming party or setting the limits for using shared access by the consuming party may be conducted by at least one of: automatically, manually or semi automatically.

VI. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. An automated digital method of providing or sharing access to a financial asset, the method comprising:
   receiving, at an intermediary server operating independently of an asset custodian, a first request for sharing the asset from a consuming device associated with a consuming party;
   verifying, by an asset access module of the intermediary server in communication with the asset custodian, that the asset has been registered with the asset custodian;
   sending the received first request from the intermediary server to a provisioning device associated with a provisioning party, wherein sending the first request to the provisioning device comprises the following:
      sending transaction details about a financial transaction with a merchant for which sharing the asset has been requested, and
      sending a description of the asset requested for sharing;
   receiving, at the intermediary server, approval for the first request from the provisioning device, wherein receiving the approval for the first request from the provisioning device comprises receiving restriction parameters;

generating, by the intermediary server, a first digital token to be shared with the consuming device, wherein generating the first digital token comprises associating the received restriction parameters with the first digital token;

transmitting a notification from the intermediary server to the consuming device, the notification indicating the approval for the first request;

receiving, at the intermediary server, a request to perform the transaction, from the consuming device;

verifying, by the asset access module of the intermediary server, that the received transaction details do not violate the restriction parameters associated with the first digital token;

responsive to verifying that the received transaction details do not violate the restriction parameters associated with the first digital token, requesting, by the intermediary server and from the asset custodian, a second digital token associated with the asset;

responsive to requesting the second digital token, receiving, at the intermediary server via the asset access module and from the asset custodian, the second digital token associated with the asset;

sending another request to perform the transaction from the intermediary server to the asset custodian via the asset access module, the another request to perform the transaction comprising the second digital token and the transaction details;

receiving, at the intermediary server, a confirmation of successful processing of the transaction, from the asset custodian;

notifying, by the intermediary server, a merchant device associated with the merchant of the successful processing of the transaction;

notifying, by the intermediary server, the consuming device of the successful processing of the transaction; and notifying, by the intermediary server, the provisioning device of the successful processing of the transaction.

2. The method of claim 1, wherein receiving the first request for sharing the asset from the consuming device comprises the consuming party scanning a barcode using the consuming device to generate the request.

3. The method of claim 1, wherein receiving the first request for sharing the asset from the consuming device comprises the consuming device using NFC to generate the request.

4. The method of claim 1, wherein verifying the asset has been registered with the asset custodian comprises verifying, by the asset access module, that the provisioning party has configured the asset to be shared by providing asset access information.

5. The method of claim 4, wherein providing the asset access information comprises at least one of the following:
providing an account number of the asset;
providing a routing number of the asset custodian;
providing a legal name of an asset owner;
providing the asset custodian;
providing a mailing address of the asset owner;
providing a billing address of the asset owner;
providing a zip code of the asset owner;
providing a Card Verification Value (CVV);
providing an address for a digital wallet;
providing an access code for the digital wallet;
providing a Personal Identification Number (PIN);
providing an API key for accessing the asset;
providing a multi-factor code;
providing a device identifier (ID);
providing a username; and
providing a password.

6. The method of claim 1, wherein sending the transaction details about the transaction for which sharing the asset has been requested comprises at least one of the following:
sending information regarding an amount of funds to cover the transaction;
sending information regarding the merchant that the transaction is with;
sending information regarding a time of the transaction; and
sending information regarding a geolocation of the transaction.

7. The method of claim 1, wherein receiving the restriction parameters comprises at least one of the following:
receiving information regarding an amount of funds approved for sharing;
receiving information regarding the merchant approved for the transaction;
receiving a specification of the asset approved for sharing;
receiving information regarding a time during which sharing is approved; and
receiving a geolocation where sharing is approved.

8. The method of claim 1, wherein generating the first digital token to be shared with the consuming device comprises generating the first digital token based on the restriction parameters.

9. The method of claim 8, wherein generating the first digital token further-comprises generating the first digital token that corresponds to the approval for sharing.

10. The method of claim 1, wherein generating the first digital token comprises generating the first digital token to be used by the consuming device to specify the asset.

11. The method of claim 1, wherein transmitting the notification from the intermediary server to-the consuming device, the notification indicating the approval for the first request further comprises providing the first digital token to the consuming device.

12. The method of claim 1, wherein receiving the request to perform the transaction from the consuming device further comprises receiving the first digital token and the transaction details.

13. The method of claim 8 or claim 12, wherein verifying the transaction details do not violate the restriction parameters associated with the first digital token comprises the asset access module comparing the transaction details to the restriction parameters and verifying that the transaction details do not exceed or violate the restriction parameters.

14. The method of claim 5, wherein receiving the second digital token associated with the asset from the asset custodian comprises sending the asset access information from the asset access module to the asset custodian and receiving the second digital token associated with the asset at the asset access module.

15. The method of claim 14, wherein receiving the second digital token associated with the asset from the asset custodian further comprises receiving the second digital token for specifying the asset to the asset custodian in order to process transactions with the asset.

16. The method of claim 1, wherein sending the another request to perform the transaction to the asset custodian for processing comprises sending the second digital token and the transaction details to the asset custodian.

17. The method of claim 1, wherein notifying the merchant device of the successful processing of the transaction comprises at least one of the following:
- sending an Android/iOS/Windows/Linux system notification;
- sending a text message;
- sending a Multimedia Messaging Service (MMS) message;
- sending an email;
- sending an application notification; and
- initiating a phone call.

18. The method of claim 1, wherein notifying the consuming device of the successful processing of the transaction comprises at least one of the following:
- sending an Android/iOS/Windows/Linux system notification;
- sending a text message;
- sending a Multimedia Messaging Service (MMS) message;
- sending an email;
- sending an application notification; and
- initiating a phone call.

19. The method of claim 1, wherein notifying the provisioning device of the successful processing of the transaction comprises at least one of the following:
- sending an Android/iOS/Windows/Linux system notification;
- sending a text message;
- sending a Multimedia Messaging Service (MMS) message;
- sending an email;
- sending an application notification; and
- initiating a phone call.

* * * * *